(12) United States Patent
King et al.

(10) Patent No.: US 11,586,968 B2
(45) Date of Patent: Feb. 21, 2023

(54) SCALABLE NEUTRAL ATOM BASED QUANTUM COMPUTING

(71) Applicant: Atom Computing Inc., Berkeley, CA (US)

(72) Inventors: Jonathan King, Berkeley, CA (US); Benjamin Bloom, Berkeley, CA (US); Krish Kotru, Berkeley, CA (US); Brian Lester, Berkeley, CA (US); Maxwell Parsons, Berkeley, CA (US)

(73) Assignee: ATOM COMPUTING INC., Berkeley, CA (US)

( * ) Notice: Subject to any disclaimer, the term of this patent is extended or adjusted under 35 U.S.C. 154(b) by 0 days.

(21) Appl. No.: 16/676,317

(22) Filed: Nov. 6, 2019

(65) Prior Publication Data

US 2020/0175411 A1 Jun. 4, 2020

Related U.S. Application Data

(63) Continuation of application No. 16/405,877, filed on May 7, 2019, now Pat. No. 10,504,033.

(Continued)

(51) Int. Cl.
*G06N 10/00* (2019.01)
(52) U.S. Cl.
CPC .................... *G06N 10/00* (2019.01)
(58) Field of Classification Search
CPC ........ G06N 10/00; G06N 20/00; G06N 20/20; G06N 3/006; G06N 3/0445; G06N 3/0454;

(Continued)

(56) References Cited

U.S. PATENT DOCUMENTS

| 4,335,938 A | 6/1982 | Giglia et al. |
| 6,548,809 B2 | 4/2003 | Bouyer et al. |

(Continued)

FOREIGN PATENT DOCUMENTS

| EP | 1130949 B1 | 9/2005 |
| EP | 2941659 B1 | 6/2021 |

(Continued)

OTHER PUBLICATIONS

Michael A. Nielsen & Isaac L. Chuang. Quantum Computation and Quantum Information. Cambridge University Presss, 2010. (Year: 2010).*

(Continued)

*Primary Examiner* — Collin X Beatty
(74) *Attorney, Agent, or Firm* — Wilson Sonsini Goodrich & Rosati

(57) ABSTRACT

The present disclosure provides methods and systems for performing non-classical computations. The methods and systems generally use a plurality of spatially distinct optical trapping sites to trap a plurality of atoms, one or more electromagnetic delivery units to apply electromagnetic energy to one or more atoms of the plurality to induce the atoms to adopt one or more superposition states of a first atomic state and a second atomic state, one or more entanglement units to quantum mechanically entangle at least a subset of the one or more atoms in the one or more superposition states with at least another atom of the plurality, and one or more readout optical units to perform measurements of the superposition states to obtain the non-classical computation.

22 Claims, 12 Drawing Sheets

Related U.S. Application Data

(60) Provisional application No. 62/815,985, filed on Mar. 8, 2019, provisional application No. 62/760,781, filed on Nov. 13, 2018.

(58) Field of Classification Search
CPC ...... G06N 3/0472; G06N 5/003; G06N 5/025; G06N 7/005; B82Y 10/00; G02F 1/113; G02F 15/76; G02F 2015/768; H01L 27/18; H01L 39/02
USPC .......................................................... 359/108
See application file for complete search history.

(56) References Cited

U.S. PATENT DOCUMENTS

| | | |
|---|---|---|
| 6,751,009 B2 | 6/2004 | Khoshnevisan et al. |
| 6,930,318 B2 | 8/2005 | Vion et al. |
| 6,943,368 B2 | 9/2005 | Amin et al. |
| 6,979,822 B1 | 12/2005 | Stewart et al. |
| 6,995,840 B2 | 2/2006 | Hagler |
| 7,018,852 B2 | 3/2006 | Wu et al. |
| 7,109,593 B2 | 9/2006 | Freedman et al. |
| 7,126,112 B2 | 10/2006 | Anderson et al. |
| 7,133,173 B2 | 11/2006 | Beausoleil, Jr. et al. |
| 7,277,872 B2 | 10/2007 | Raussendorf et al. |
| 7,364,923 B2 | 4/2008 | Lidar et al. |
| 7,398,162 B2 | 7/2008 | Downs et al. |
| 7,411,181 B2 | 8/2008 | Plewa et al. |
| 7,451,292 B2 | 11/2008 | Routt |
| 7,483,142 B2 | 1/2009 | Kent et al. |
| 7,560,726 B2 | 7/2009 | Beausoleil et al. |
| 7,769,173 B2 | 8/2010 | Munro et al. |
| 7,777,177 B2 | 8/2010 | Klotzer |
| 7,778,951 B2 | 8/2010 | Gilbert et al. |
| 7,791,780 B2 | 9/2010 | Munro et al. |
| 7,836,007 B2 | 11/2010 | Beausoleil et al. |
| 7,955,551 B2 | 6/2011 | McBride et al. |
| 8,080,778 B2 | 12/2011 | McBride |
| 8,174,742 B2 | 5/2012 | Roichman et al. |
| 8,237,105 B1 | 8/2012 | Bulatowicz et al. |
| 8,373,112 B2 | 2/2013 | Bouyer et al. |
| 8,374,994 B2 | 2/2013 | Roshen et al. |
| 8,405,021 B2 | 3/2013 | Anderson et al. |
| 8,415,162 B2 | 4/2013 | Cerda et al. |
| 8,415,612 B2 | 4/2013 | McBride et al. |
| 8,488,232 B2 | 7/2013 | Nakamura et al. |
| 8,817,254 B2 | 8/2014 | Santori et al. |
| 8,832,164 B2 | 9/2014 | Allen et al. |
| 8,849,580 B2 | 9/2014 | Kauffman et al. |
| 8,860,515 B2 | 10/2014 | Aoyama et al. |
| 8,913,900 B2 | 12/2014 | Lukin et al. |
| 8,941,053 B1 | 1/2015 | Biedermann et al. |
| 9,007,088 B2 | 4/2015 | Liao et al. |
| 9,086,429 B1 | 7/2015 | Biedermann et al. |
| 9,117,563 B2 | 8/2015 | Hughes et al. |
| 9,317,473 B2 | 4/2016 | Yao et al. |
| 9,355,750 B2 | 5/2016 | Saffman et al. |
| 9,443,200 B2 | 9/2016 | Schroff |
| 9,506,868 B2 | 11/2016 | Boufendi et al. |
| 9,543,052 B2 | 1/2017 | Jackson |
| 9,564,734 B2 | 2/2017 | Blauvelt et al. |
| 9,841,375 B2 | 12/2017 | Chen et al. |
| 9,858,531 B1 * | 1/2018 | Monroe ................ G06N 10/00 |
| 9,934,469 B1 | 4/2018 | Jau et al. |
| 9,958,710 B1 | 5/2018 | Morse et al. |
| 9,960,025 B1 | 5/2018 | Hughes |
| 9,960,026 B1 | 5/2018 | Hughes |
| 10,056,908 B2 | 8/2018 | Rigetti et al. |
| 10,069,504 B2 | 9/2018 | Maki |
| 10,096,376 B2 | 10/2018 | Benjamin et al. |
| 10,102,479 B2 | 10/2018 | Tucci |
| 10,103,463 B1 | 10/2018 | Hughes |
| 10,192,168 B2 | 1/2019 | Rigetti et al. |
| 10,278,275 B2 | 4/2019 | Imhof |
| 10,311,370 B2 | 6/2019 | Bravyi et al. |
| 10,339,466 B1 | 7/2019 | Ding et al. |
| 10,352,992 B1 | 7/2019 | Zeng et al. |
| 10,460,918 B2 | 10/2019 | Hughes |
| 10,473,943 B1 | 11/2019 | Hughes |
| 10,504,033 B1 | 12/2019 | King et al. |
| 10,531,554 B2 | 1/2020 | Imhof |
| 10,559,392 B1 | 2/2020 | Saffman |
| 10,613,319 B2 | 4/2020 | Mihailovich et al. |
| 10,629,417 B1 | 4/2020 | Hughes et al. |
| 10,648,934 B2 | 5/2020 | Kim et al. |
| 10,676,350 B2 | 6/2020 | Hughes |
| 10,712,406 B2 | 7/2020 | Lukin et al. |
| 10,755,831 B2 | 8/2020 | Anderson |
| 10,809,177 B2 * | 10/2020 | Cooper-Roy ............. G04F 5/14 |
| 10,975,852 B2 | 4/2021 | Hughes |
| 11,002,777 B2 | 5/2021 | Salim et al. |
| 11,069,790 B2 | 7/2021 | Anderson et al. |
| 11,120,360 B2 | 9/2021 | Kim et al. |
| 2006/0179029 A1 * | 8/2006 | Vala ....................... G06N 10/00 |
| | | 706/62 |
| 2010/0140458 A1 | 6/2010 | Meyers et al. |
| 2010/0200739 A1 | 8/2010 | Anderson et al. |
| 2011/0276526 A1 | 11/2011 | Turbin et al. |
| 2012/0319085 A1 | 12/2012 | Gambetta et al. |
| 2015/0000644 A1 | 1/2015 | Freeman |
| 2016/0125311 A1 * | 5/2016 | Fuechsle ................ G06N 20/00 |
| | | 257/31 |
| 2016/0321559 A1 | 11/2016 | Rose et al. |
| 2017/0140298 A1 | 5/2017 | Wabnig et al. |
| 2017/0214410 A1 | 7/2017 | Hincks et al. |
| 2017/0255871 A1 | 9/2017 | MacReady et al. |
| 2017/0323195 A1 | 11/2017 | Crawford et al. |
| 2017/0357539 A1 | 12/2017 | Dadashikelayeh et al. |
| 2018/0096085 A1 | 4/2018 | Rubin |
| 2018/0114138 A1 | 4/2018 | Monroe et al. |
| 2018/0232652 A1 | 8/2018 | Curtis et al. |
| 2018/0246851 A1 | 8/2018 | Zaribafiyan et al. |
| 2018/0247217 A1 | 8/2018 | Heeres et al. |
| 2018/0260730 A1 | 9/2018 | Reagor et al. |
| 2018/0308007 A1 | 10/2018 | Amin et al. |
| 2018/0341874 A1 | 11/2018 | Puri et al. |
| 2019/0087743 A1 | 3/2019 | Heeres et al. |
| 2019/0138928 A1 | 5/2019 | Monroe et al. |
| 2019/0200445 A1 | 6/2019 | Imhof |
| 2019/0205784 A1 | 7/2019 | Monroe et al. |
| 2020/0023462 A1 | 1/2020 | Amini et al. |
| 2020/0103032 A1 | 4/2020 | Hughes |
| 2020/0185120 A1 * | 6/2020 | Keesling Contreras ..................... |
| | | G06N 10/00 |
| 2020/0274554 A1 | 8/2020 | Aspuru-Guzik et al. |
| 2020/0284862 A1 | 9/2020 | Lukin et al. |
| 2020/0395726 A1 | 12/2020 | Lien et al. |
| 2020/0402681 A1 | 12/2020 | Anderson et al. |
| 2021/0049495 A1 | 2/2021 | King et al. |
| 2021/0072139 A1 | 3/2021 | Cooper-Roy et al. |
| 2021/0255228 A1 | 8/2021 | Salim et al. |
| 2021/0272005 A1 | 9/2021 | King et al. |
| 2021/0272006 A1 | 9/2021 | King et al. |
| 2021/0279631 A1 * | 9/2021 | Pichler ..................... G06E 1/00 |

FOREIGN PATENT DOCUMENTS

| | | |
|---|---|---|
| KR | 20120046121 A | 5/2012 |
| WO | WO-2015178992 A2 | 11/2015 |
| WO | WO-2016089711 A1 | 6/2016 |
| WO | WO-2016111441 A1 | 7/2016 |
| WO | WO-2016138378 A1 | 9/2016 |
| WO | WO-20161616935 A1 | 10/2016 |
| WO | WO-2016196005 A1 | 12/2016 |
| WO | WO-2016205330 A1 | 12/2016 |
| WO | WO-2017066695 A1 | 4/2017 |
| WO | WO-2017151200 A1 | 9/2017 |
| WO | WO-2017195114 A1 | 11/2017 |
| WO | WO-2018033823 A1 | 2/2018 |
| WO | WO-2018064535 A1 | 4/2018 |
| WO | WO-2018147208 A1 | 8/2018 |
| WO | WO-2018236922 A1 | 12/2018 |
| WO | WO-2019014589 A1 | 1/2019 |
| WO | WO-2019018544 A1 | 1/2019 |

(56) References Cited

FOREIGN PATENT DOCUMENTS

| | | |
|---|---|---|
| WO | WO-2019021010 A1 | 1/2019 |
| WO | WO-2019055843 A1 | 3/2019 |
| WO | WO-2019092412 A1 | 5/2019 |
| WO | WO-2019094490 A1 | 5/2019 |
| WO | WO-2019117922 A1 | 6/2019 |
| WO | WO-2019117955 A1 | 6/2019 |
| WO | WO-2020102256 A1 | 5/2020 |
| WO | WO-2020172588 A1 | 8/2020 |
| WO | WO-2020236574 A1 | 11/2020 |
| WO | WO-2020253957 A1 | 12/2020 |
| WO | WO-2021007560 A1 | 1/2021 |
| WO | WO-2021048287 A1 | 3/2021 |
| WO | WO-2021165155 A1 | 8/2021 |

OTHER PUBLICATIONS

Line Hjortshøj Pedersen. Neutral Atom Quantum Comuting with Rydberg Blockade. Lundbeck Foundation Theoretical Center for Quantum System Research Department of Physics and Astronomy, University of Aarhus Denmark. PhD Thesis Jul. 2008. (Year: 2008).*

M. Saffman. Quantum computing with atomic qubits and Rydbeg interactions: progess and challenges. J. Phys. B: At. Mol. Opt. Phys. 49 202001 2016 (Year: 2016).*

Akerman et al. Universal gate-set for trapped-ion qubits using a narrow linewidth diode laser. New Journal of Physics 17(11):1-20 (2015).

PCT/US2019/061029 International Search Report and Written Opinion dated Apr. 10, 2020.

Beloy et al. Micromagic clock: microwave clock based on atoms in an engineered optical lattice. Phys. Rev. Lett. 102:120801 (2009).

Bloom et al. An optical lattice clock with accuracy and stability at the 10(-18) level. Nature 506:71-75 (2014).

Butts et al. Efficient broadband Raman pulses for large-area atom interferometry. J. Opt. Soc. Am. B 30:922-927 (2013).

Carpentier et al. Preparation of a single atom in an optical microtrap. Laser Phys. Lett. 10:125501 (2013).

IBM Collaborating With Top Startups to Accelerate Quantum Computing. IBM Blog Research (2015). Available at: http://www.ibm.com/blogs/research/2018/04/ibm-startups-accelerate-quantum/. (10 pgs (Apr. 5, 2018).

Jones et al. Fast quantum state control of a single trapped neutral atom. Phys. Rev. A 75:040301(R) (2007).

Katori et al. Ultrastable Optical Clock with Neutral Atoms in an Engineered Light Shift Trap. Phys. Rev. Lett. 91:173005 (2003).

Kim et al. In situ single-atom array synthesis using dynamic holographic optical tweezers. Nat. Commun. 7:13317 (2016).

King et al. Room-temperature in situ nuclear spin hyperpolarization from optically pumped nitrogen vacancy centres in diamond. Nat. Commun. 6:8965 (2015).

Kotru et al. Large-Area Atom Interferometry with Frequency-Swept Raman Adiabatic Passage. Phys. Rev. Lett. 115:103001 (2015).

Levine et al. High-Fidelity Control and Entanglement of Rydberg-Atom Qubits. Physical Review Letters 121:123603 (2018).

Nogrette et al. Single-Atom Trapping in Holographic 2D Arrays of Microtraps with Arbitrary Geometries. Physical Review X 4:021034 (2014).

Papageorge et al. Coupling to modes of a near-confocal optical resonator using a digital light modulator. Opt. Express 24:11447-11457 (2016).

Parsons et al. Site-resolved imaging of fermionic A{6}Li in an optical lattice. Phys. Rev. Lett. 114:213002 (2015).

Reagor et al. Demonstration of universal parametric entangling gates on a multi-qubit lattice. Sci Adv 4:eaao3603 (2018).

Wang et al. Coherent Addressing of Individual Neutral Atoms in a 3D Optical Lattice. Phys. Rev. Lett. 115:043003 (2015).

Willems et al. Creating long-lived neutral-atom traps in a cryogenic environment. Phys. Rev. A 51:1403-1406 (1995).

Wineland. Nobel Lecture: Superposition, entanglement, and raising Schrodinger's cat. Rev. Mod. Phys. 85:1103-1114 (2013).

Yamaguchi. Metastable State of Ultracold and Quantum Degenerate Ytterbium Atoms: High-Resolution Spectroscopy and Cold Collisions. Thesis Kyoto University (3 pgs.) (2008).

Yamamoto et al. An ytterbium quantum gas microscope with narrow-line laser cooling. New J. Phys. 18:023016 (2016).

Co-pending U.S. Appl. No. 16/900,641, filed Jun. 12, 2020.

Barredo et al. An atom-by-atom assembler of defect-free arbitray 2d atomic arrays. Science 354(6315):1021-1023 (2016).

U.S. Appl. No. 16/900,644 Office Action dated Dec. 24, 2020.

Benseny et al. Spatial non-abiabatic passage using geometric phases. EPJ Quantum 4(3):1-15 (2017).

Berry. Transistionless Quantum Driving. Journal of Physics A: Mathematical and Theroretical 42(36):365303 (2009).

Covey et al. 2000 Times Repeated Imaging of Strontium Atoms in Clock-Magic Tweezer Arrays. Physical Review Letter 122(17):173201 (2019).

Jau et al. Entangling Atomic Spins with a Strong Rydberg-Dressed Interaction. Nature Physics 12(1):71-74 (2016).

Keating et al. Robust Quantum Logic in Neutral Atoms via Abiabatic Rydberg Dressing. Physical Review A 91:012337 (2015).

Khaneja et al. Optimal Control of Coupled Spin Dynamics: Design of NMR Pulse Sequences by Gradient Ascent Algorithms. Journal of Magnetic Resonace 172(2), 296-305 (2005).

Lee et al. Defect-Free Atomic Array Formation Using Hungarian Rearrangement Algorithm. Physical Review A 95:053424 (2017).

Merrill et al. Progress in Compensating Pulse Sequences for Quantume Computation. Advances in Chemical Physics 154:241-294 (2014).

Mittra et al. Robust Mølmer-Sørenson Gate for Neutral Atoms Using Rapid Abiabatic Rydberg Dressing. Phys. Rev A 101:030301 (2020).

Norcia et al. Microscopic control and detection of ultacold strontium in optical-tweezer array. Phys rev. 8:041054 (2018).

PCT/US2020/067721 International Search Report and Written Opinion dated Mar. 25, 2021.

PCT/US2020/067740 International Seach Report and Written Opionion dated Apr. 1, 2021.

Saffman. Quantum computing with atomic qubits and Rydberg interactions: Progress and challenges. Journal of Physics B: Atomic, Molecular and Optical Physics 49(20):202001 (2016).

Theis et al., Counteracting Systems of Diabaticities Using DRAG Control: The Status after 10 Years. Europhysics Letters 123(6):60001 (2018).

U.S. Appl. No. 16/900,644 Office Action dated Jul. 14, 2021.

Bowden et al. An adaptable dual species effusive source and Zeeman slower design demonstrated with Rb and Li. Review of Scientific Instruments 87(4):043111 (2016).

Muldoon et al. Control and manipulation of cold atoms in optical tweezers. New Journal of Physics 14(7):073051 (2012).

U.S. Appl. No. 16/900,641 Office Action dated Jan. 25, 2021.

Bluvstein et al.: A quantum processor based on coherent transport of entangled atom array. arXiv:2112.03923v1 [quant-ph], pp. 1-23 URL: https://arxiv.org/abs/2112.03923v1 (2021).

Brown et al.: Gray-molasses optical-tweezer loading: controlling collisions for scaling atom-array assembly. Phy. Rev. X 9, 011057, pp. 1-8 (2019).

Cai et al.: Monolithic bowtiw cavity traps for ultra-cold gases. pre-Print arXiv:2011.01992v1 [cond-mat-quant-gas], pp. 1-15 DOI:10.1364/JOSAB.401262 (2020).

Deutsch et al.: Quantum computing with neutral atoms in optical lattice. Fortschr. Physics 48(9-11):925-943 (2000).

Graham et al.: Ryberg-Mediated Entanglement in a Two-Dimensional Neutral Atom Qubit Array, Phys Rev Lett. 123(23):230501, pp. 1-21 doi:10.1103/PhysRevLett.123.230501 (2019).

Heinz et al.: Crosssed optical cavities with large mode diameters, pre-Print arXiv:2011.01616v2 [cond-mat-quant-gas], pp. 1-5 DOI:10.1364/OL.414076 (2021).

Lester et al.: Raman cooling imaging: Detecting single atoms near their ground state of motion. Phys. Rev. A 90, 011804(R), pp. 1-5 arXiv:1405.6156v3 [physics.atom-ph] doi:https://arxiv.org/abs/1405.6156 (2014).

(56) References Cited

OTHER PUBLICATIONS

Levine et al.: Parallel Implementation of High-Fidelity Multiqubit Gates with Neutral Atoms. Phy Rev Lett. 123(17):170503, pp. 1-6 doi:10.1103/PhysRevLett.123.170503 (2019).

Madjarov et al.: High-Fidelity Entanglement and Detections of Alkaline-Earth Rydberg Atom. pre-Print arXiv:2001.04455v2 [physics. atom-ph] Nature Physics 16:857-861, pp. 1-16 DOI:10.1038/s41567-020-0903-z (2020).

Nelson et al.: Imaging single atoms in a three-dimensional array. Nature Physics 3(8):556-560 DOI:10.1038/nphys645 (2007).

Schlosser et al.: Collisional blockade in microscopic optical dipole traps. Phys Rev Lett 89(2):023005, pp. 1-4 doi:10-1103/PhysRevLett. 89.023005 (2002).

U.S. Appl. No. 16/900,641 Final Office Action dated Aug. 30, 2021.

Weiss et al.: Quantum computing with neutral atoms. Physics Today 70(7):44-50 doi:10.1063/PT.3.3626 (2017).

Yang et al.: Site-resolved imaging of ultacold fermions in a triangular-lattice quantum gas microscope. PRX Quantum, American Physical Society 2(2):020344, pp. 1-9 DOI:10.1103/PRXQuantum.2.020344 (2021).

EP Application No. 19883636.3 Extended European Search Report dated Aug. 10, 2022.

Lundblad: Designer atom array for quantum computing. Nature 561:43-44 doi:10.1038/d41586-018-06107-8 (2018).

Mitra et al.: Robust Mølmer-Sørenson gate for neutral atoms using rapid adiabatic Rydberg dressing. [arXiv:1911.04045v2 [quant-ph]] American Physical Society 101(3):030301, pp. 1-7 doi:10.1103/physreva.101.030301 (2020).

Schlosser et al.: Scalable architecture for quantum information processing with atoms in optical micro-structures. arXiv:1108.5136v1, Quantum Information Processing 10(6):907-924 doi:10.1007/s11128-011-029-z (2011).

Smith et al.: A practical quantum instruction set architecture. arXiv preprint arXiv:1608.03355, pp. 1-15 (2016).

U.S. Appl. No. 16/900,641 Non-Final Office Action dated Mar. 17, 2022.

U.S. Appl. No. 16/900,644 Non-Final Office Action dated Mar. 18, 2022.

Pagano et al.: Fast and scalable quantum information processing with two-electron atoms in optical tweezer arrays. ArXiv pre-print arXiv:1808.02503v1 [quant-ph], pp. 1-14 doi: 10.48550/arXiv.1808.02503 (2018).

PCT/US2022/031047 International Search Report and Written Opinion dated Sep. 29, 2022.

U.S. Appl. No. 16/900,641, Final Office Action dated Oct. 20, 2022.

* cited by examiner

SCALABLE NEUTRAL ATOM BASED QUANTUM COMPUTING

CROSS-REFERENCE

This application is a continuation of U.S. application Ser. No. 16/405,877, filed May 7, 2019, which claims the benefit of U.S. Provisional Patent Application No. 62/760,781, filed on Nov. 13, 2018, and U.S. Provisional Patent Application No. 62/815,985, filed on Mar. 8, 2019, each of which is entirely incorporated herein by reference for all purposes.

STATEMENT AS TO FEDERALLY SPONSORED RESEARCH

This invention was made with the support of the United States Government under Small Business Innovation Research Grant No. 1843926 awarded by the National Science Foundation. The United States Government has certain rights in this invention.

BACKGROUND

Quantum computers typically make use of quantum-mechanical phenomena, such as superposition and entanglement, to perform operations on data. Quantum computers may be different from digital electronic computers based on transistors. For instance, whereas digital computers require data to be encoded into binary digits (bits), each of which is always in one of two definite states (0 or 1), quantum computation uses quantum bits (qubits), which can be in superpositions of states.

SUMMARY

Recognized herein is the need for methods and systems for performing non-classical computations.

The present disclosure provides systems and methods for utilizing atoms (such as neutral or uncharged atoms) to perform non-classical or quantum computations. The atoms may be optically trapped in large arrays. Quantum mechanical states of the atoms (such as hyperfine states or nuclear spin states of the atoms) may be configured to function as quantum bit (qubit) basis states. The qubit states may be manipulated through interaction with optical, radiofrequency, or other electromagnetic radiation, thereby performing the non-classical or quantum computations.

In an aspect, the present disclosure provides a system for performing a non-classical computation, comprising: one or more optical trapping units configured to generate a plurality of spatially distinct optical trapping sites, the plurality of optical trapping sites configured to trap a plurality of atoms, wherein the plurality of atoms are qubits, and wherein the plurality of atoms comprise greater than 60 atoms; one or more electromagnetic delivery units configured to apply electromagnetic energy to one or more atoms of the plurality of atoms, to induce the one or more atoms to adopt one or more superposition states of a first atomic state and at least a second atomic state that is different from the first atomic state; one or more entanglement units configured to quantum mechanically entangle at least a subset of the one or more atoms in the one or more superposition states with at least another atom of the plurality of atoms; and one or more readout optical units configured to perform one or more measurements of the one or more superposition states to obtain at least a portion of the non-classical computation. The first atomic state may comprise a first hyperfine electronic state and the second atomic state may comprise a second hyperfine electronic state that is different from the first hyperfine electronic state. The first atomic state may comprise a first nuclear spin state and the second atomic state may comprise a second nuclear spin state that is different from the first nuclear spin state. The plurality of atoms may comprise neutral atoms. The plurality of atoms may comprise a Group II element. The first and second atomic states may comprise first and second nuclear spin states of a nucleus comprising a nuclear spin greater than ½. The subset of the one or more atoms in the one or more superposition states and the another atom may be quantum mechanically entangled with a coherence lifetime of at least 1 second. The plurality of atoms may comprise a temperature of at most 10 microkelvin (µK). Each optical trapping site of the plurality of optical trapping sites may be spatially separated from each other optical trapping site by at least 200 nanometers (nm). The one or more optical trapping units may comprise one or more spatial light modulators (SLMs) configured to generate the plurality of optical trapping sites. The one or more SLMs may comprise a digital micromirror device (DMDs) or a liquid crystal on silicon (LCoS) device. The one or more optical trapping units may comprise one or more light sources configured to emit light tuned to one or more magic wavelengths corresponding to the plurality of atoms. The one or more optical trapping units may comprise one or more imaging units configured to obtain one or more images of a spatial configuration of the plurality of atoms trapped within the optical trapping sites. The system may further comprise one or more spatial configuration artificial intelligence (AI) units configured to perform one or more AI operations to determine the spatial configuration of the plurality of atoms trapped within the optical trapping sites based on the one or more images. The one or more optical trapping units may comprise one or more atom rearrangement units configured to impart an altered spatial arrangement of the plurality of atoms trapped with the optical trapping sites based on he one or more images. The system may further comprise one or more spatial arrangement artificial intelligence (AI) units configured to perform one or more AI operations to determine the altered spatial arrangement of the plurality of atoms trapped within the optical trapping sites based on the one or more images. The system may further comprise one or more said state preparation units configured to cool the plurality of atoms to a first distribution of atomic states. The system may further comprise one or more optical pumping units configured to emit light to optically pump one or more atoms of the plurality of atoms from the first distribution of atomic states to a pure or nearly pure atomic state. The system may further comprise one or more coherent driving units configured to coherently drive the one or more atoms from the non-equilibrium atomic state or the non-equilibrium distribution of atomic states to the first or second atomic state. The one or more electromagnetic delivery units may comprise one or more members selected from the group consisting of a spatial light modulator (SLM), an acousto-optic device (AOD), and an acousto-optic modulator (AOM), which one or more members are configured to selectively apply the electromagnetic energy to one or more atoms of the plurality of atoms. The SLM may comprise a digital micromirror device (DMD) or a liquid crystal on silicon (LCoS) device. The one or more electromagnetic delivery units may be configured to implement one or more single-qubit gate operations on the one or more qubits. The system may further comprise one or more atom reservoirs configured to supply one or more replacement atoms to replace one or more atoms at one or more optical trapping sites of the plurality of optical trapping sites upon loss of the one or more atoms from the one or more optical trapping sites. The system may further comprise one or more atom movement units configured to move the one or more replacement atoms to the one or more optical trapping sites. The subset of the one or more atoms in the one or more superposition states and the another atom may be quantum mechanically entangled through a magnetic dipole interaction, an electric dipole interaction, or an induced electric dipole interaction. The one or more entanglement units may comprise one or more Rydberg excitation units configured to electronically excite the subset of one or more atoms in the one or more superposition states to a Rydberg state, thereby forming one or more Rydberg atoms, or to continuously drive the one or more atoms in the one or more superposition states via a transition to a Rydberg state, thereby forming one or more dressed Rydberg atoms. The one or more Rydberg excitation units may be configured to induce one or more quantum mechanical entanglements between the one or more Rydberg atoms or dressed Rydberg atoms and the another atom, the another atom located at a distance of no more than 10 micrometers (μm) from the one or more Rydberg atoms or dressed Rydberg atoms. The one or more Rydberg units may be configured to drive the one or more Rydberg atoms or dressed Rydberg atoms to a lower-energy atomic state, thereby forming one or more two-qubit units. The one or more electromagnetic delivery units may be configured to implement one or more two-qubit gate operations on the one or more two-qubit units. The system may be operatively coupled to a digital computer over a cloud computing network.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
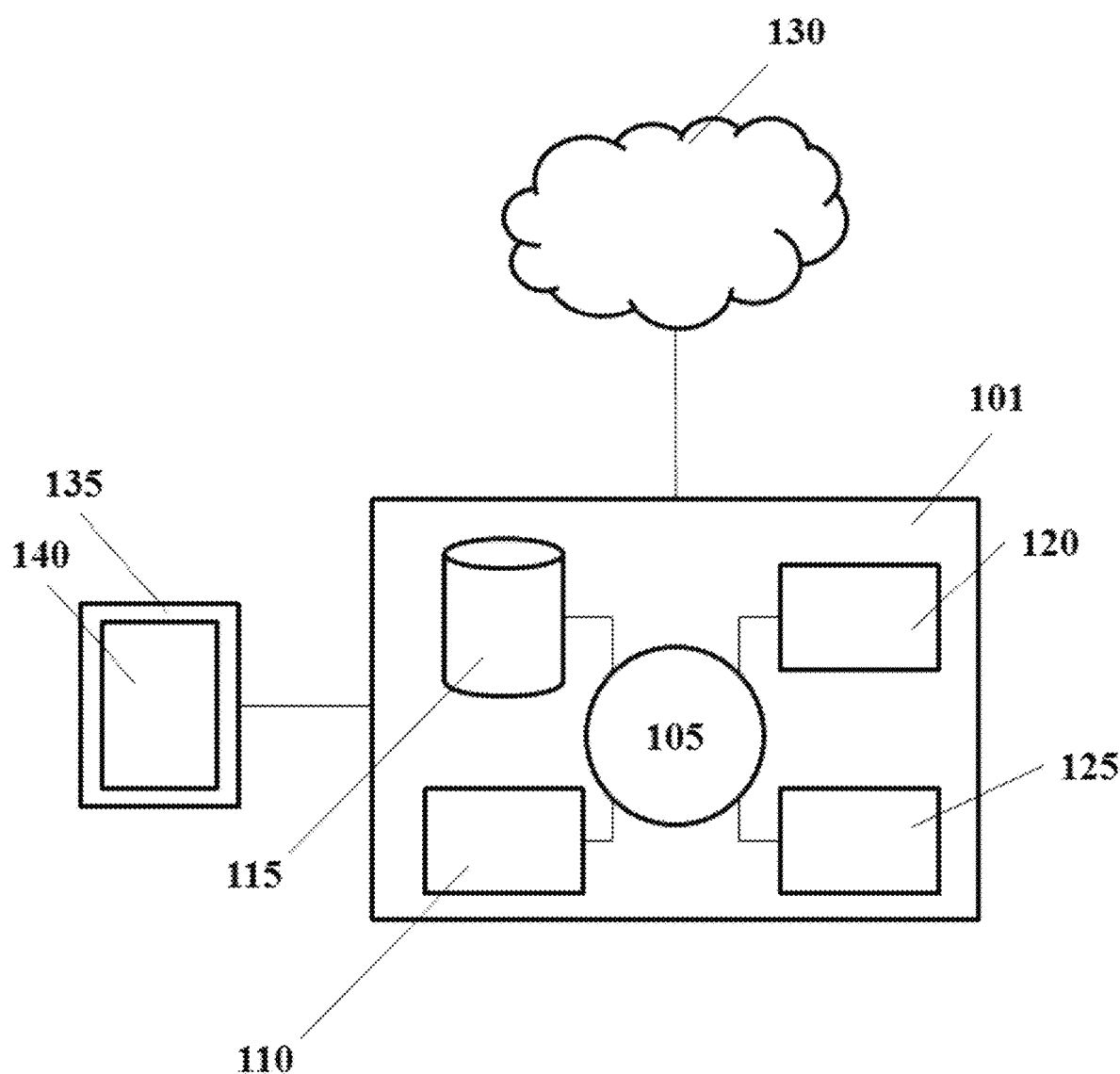
FIG. 1 shows a computer control system that is programmed or otherwise configured to implement methods provided herein.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," "less than or equal to," or "at most" precedes the first numerical value in a series of two or more numerical values, the term "no more than," "less than," "less than or equal to," or "at most" applies to each of the numerical values in that series of numerical values. For example, less than or equal to 3, 2, or 1 is equivalent to less than or equal to 3, less than or equal to 2, or less than or equal to 1.

Where values are described as ranges, it will be understood that such disclosure includes the disclosure of all possible sub-ranges within such ranges, as well as specific numerical values that fall within such ranges irrespective of whether a specific numerical value or specific sub-range is expressly stated.

As used herein, the terms "artificial intelligence," "artificial intelligence procedure", "artificial intelligence operation," and "artificial intelligence algorithm" generally refer to any system or computational procedure that may take one or more actions to enhance or maximize a chance of achieving a goal. The term "artificial intelligence" may include "generative modeling," "machine learning" (ML), and/or "reinforcement learning" (RL).

As used herein, the terms "machine learning," "machine learning procedure," "machine learning operation," and "machine learning algorithm" generally refer to any system or analytical and/or statistical procedure that may progressively improve computer performance of a task. Machine learning may include a machine learning algorithm. The machine learning algorithm may be a trained algorithm. Machine learning (ML) may comprise one or more supervised, semi-supervised, or unsupervised machine learning techniques. For example, an ML algorithm may be a trained algorithm that is trained through supervised learning (e.g., various parameters are determined as weights or scaling factors). ML may comprise one or more of regression analysis, regularization, classification, dimensionality reduction, ensemble learning, meta learning, association rule learning, cluster analysis, anomaly detection, deep learning, or ultra-deep learning. ML may comprise, but is not limited to: k-means, k-means clustering, k-nearest neighbors, learning vector quantization, linear regression, non-linear regression, least squares regression, partial least squares regression, logistic regression, stepwise regression, multivariate adaptive regression splines, ridge regression, principle component regression, least absolute shrinkage and selection operation, least angle regression, canonical correlation analysis, factor analysis, independent component analysis, linear discriminant analysis, multidimensional scaling, non-negative matrix factorization, principal components analysis, principal coordinates analysis, projection pursuit, Sammon mapping, t-distributed stochastic neighbor embedding, AdaBoosting, boosting, gradient boosting, bootstrap aggregation, ensemble averaging, decision trees, conditional decision trees, boosted decision trees, gradient boosted decision trees, random forests, stacked generalization, Bayesian networks, Bayesian belief networks, naïve Bayes, Gaussian naïve Bayes, multinomial naïve Bayes, hidden Markov models, hierarchical hidden Markov models, support vector machines, encoders, decoders, auto-encoders, stacked auto-encoders, perceptrons, multi-layer perceptrons, artificial neural networks, feedforward neural networks, convolutional neural networks, recurrent neural networks, long short-term memory, deep belief networks, deep Boltzmann machines, deep convolutional neural networks, deep recurrent neural networks, or generative adversarial networks.

As used herein, the terms "reinforcement learning," "reinforcement learning procedure," "reinforcement learning operation," and "reinforcement learning algorithm" generally refer to any system or computational procedure that may take one or more actions to enhance or maximize some notion of a cumulative reward to its interaction with an environment. The agent performing the reinforcement learning (RL) procedure may receive positive or negative reinforcements, called an "instantaneous reward", from taking one or more actions in the environment and therefore placing itself and the environment in various new states.

A goal of the agent may be to enhance or maximize some notion of cumulative reward. For instance, the goal of the agent may be to enhance or maximize a "discounted reward function" or an "average reward function". A "Q-function" may represent the maximum cumulative reward obtainable from a state and an action taken at that state. A "value function" and a "generalized advantage estimator" may represent the maximum cumulative reward obtainable from a state given an optimal or best choice of actions. RL may utilize any one of more of such notions of cumulative reward. As used herein, any such function may be referred to as a "cumulative reward function". Therefore, computing a best or optimal cumulative reward function may be equivalent to finding a best or optimal policy for the agent.

The agent and its interaction with the environment may be formulated as one or more Markov Decision Processes (MDPs), for example. The RL procedure may not assume knowledge of an exact mathematical model of the MDPs. The MDPs may be completely unknown, partially known, or completely known to the agent. The RL procedure may sit in a spectrum between the two extents of "model-based" or "model-free" with respect to prior knowledge of the MDPs. As such, the RL procedure may target large MDPs where exact methods may be infeasible or unavailable due to an unknown or stochastic nature of the MDPs.

The RL procedure may be implemented using one or more computer processors described herein. The digital processing unit may utilize an agent that trains, stores, and later on deploys a "policy" to enhance or maximize the cumulative reward. The policy may be sought (for instance, searched for) for a period of time that is as long as possible or desired. Such an optimization problem may be solved by storing an approximation of an optimal policy, by storing an approximation of the cumulative reward function, or both. In some cases, RL procedures may store one or more tables of approximate values for such functions. In other cases, RL procedure may utilize one or more "function approximators".

Examples of function approximators may include neural networks (such as deep neural networks) and probabilistic graphical models (e.g. Boltzmann machines, Helmholtz machines, and Hopfield networks). A function approximator may create a parameterization of an approximation of the cumulative reward function. Optimization of the function approximator with respect to its parameterization may consist of perturbing the parameters in a direction that enhances or maximizes the cumulative rewards and therefore enhances or optimizes the policy (such as in a policy gradient method), or by perturbing the function approximator to get closer to satisfy Bellman's optimality criteria (such as in a temporal difference method).

During training, the agent may take actions in the environment to obtain more information about the environment and about good or best choices of policies for survival or better utility. The actions of the agent may be randomly generated (for instance, especially in early stages of training) or may be prescribed by another machine learning paradigm (such as supervised learning, imitation learning, or any other machine learning procedure described herein). The actions of the agent may be refined by selecting actions closer to the agent's perception of what an enhanced or optimal policy is. Various training strategies may sit in a spectrum between the two extents of off-policy and on-policy methods with respect to choices between exploration and exploitation.

As used herein, the terms "non-classical computation," "non-classical procedure," "non-classical operation," any "non-classical computer" generally refer to any method or system for performing computational procedures outside of the paradigm of classical computing. A non-classical computation, non-classical procedure, non-classical operation, or non-classical computer may comprise a quantum computation, quantum procedure, quantum operation, or quantum computer.

As used herein, the terms "quantum computation," "quantum procedure," "quantum operation," and "quantum computer" generally refer to any method or system for performing computations using quantum mechanical operations (such as unitary transformations or completely positive trace-preserving (CPTP) maps on quantum channels) on a Hilbert space represented by a quantum device. As such, quantum and classical (or digital) computation may be similar in the following aspect: both computations may comprise sequences of instructions performed on input information to then provide an output. Various paradigms of quantum computation may break the quantum operations down into sequences of basic quantum operations that affect a subset of qubits of the quantum device simultaneously. The quantum operations may be selected based on, for instance, their locality or their ease of physical implementation. A quantum procedure or computation may then consist of a sequence of such instructions that in various applications may represent different quantum evolutions on the quantum device. For example, procedures to compute or simulate quantum chemistry may represent the quantum states and the annihilation and creation operators of electron spin-orbitals by using qubits (such as two-level quantum systems) and a universal quantum gate set (such as the Hadamard, controlled-not (CNOT), and $\pi/8$ rotation) through the so-called Jordan-Wigner transformation or Bravyi-Kitaev transformation.

Additional examples of quantum procedures or computations may include procedures for optimization such as quantum approximate optimization algorithm (QAOA) or quantum minimum finding. QAOA may comprise performing rotations of single qubits and entangling gates of multiple qubits. In quantum adiabatic computation, the instructions may carry stochastic or non-stochastic paths of evolution of an initial quantum system to a final one.

Quantum-inspired procedures may include simulated annealing, parallel tempering, master equation solver, Monte Carlo procedures and the like. Quantum-classical or hybrid algorithms or procedures may comprise such procedures as variational quantum eigensolver (VQE) and the variational and adiabatically navigated quantum eigensolver (VanQver).

A quantum computer may comprise one or more adiabatic quantum computers, quantum gate arrays, one-way quantum computers, topological quantum computers, quantum Turing machines, quantum annealers, Ising solvers, or gate models of quantum computing.

Systems for Performing a Non-Classical Computation

In an aspect, the present disclosure provides a system for performing a non-classical computation. The system may comprise one or more optical trapping units configured to generate a plurality of spatially distinct optical trapping sites. The plurality of optical trapping sites may be configured to trap a plurality of atoms. The plurality of atoms may comprise greater than 60 atoms. The system may also comprise one or more electromagnetic delivery units configured to apply electromagnetic energy to one or more atoms of the plurality of atoms, thereby inducing the one or more atoms to adopt one or more superposition states of a first atomic state and at least a second atomic state that is different from the first atomic state The system may also include one or more entanglement units configured to quantum mechanically entangle at least a subset of the one or more atoms in the one or more superposition states with at least another atom of the plurality of atoms, and one or more readout optical units configured to perform one or more measurements of the one or more superposition state to obtain the non-classical computation.

Reference will now be made to the figures, wherein like numerals refer to like parts throughout. It will be appreciated that the figures are not necessarily drawn to scale.

Figure 2:
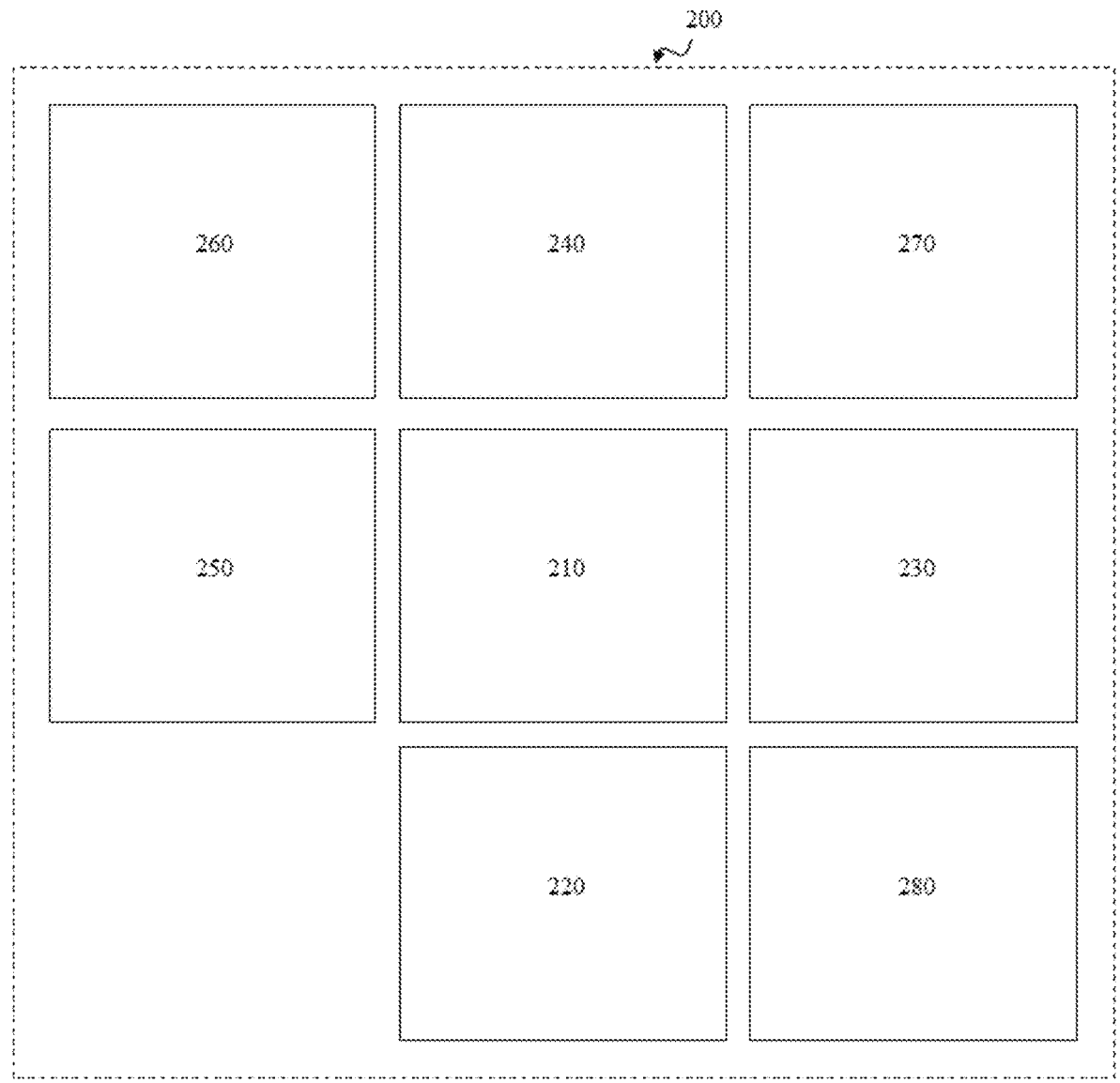
FIG. 2 shows an example of a system for performing a non-classical computation.

FIG. 2 shows an example of a system 200 for performing a non-classical computation. The non-classical computation may comprise a quantum computation. The quantum computation may comprise a gate-model quantum computation.

The system 200 may comprise one or more optical trapping units 210. The optical trapping units may comprise any optical trapping unit described herein, such as an optical trapping unit described herein with respect to FIG. 3A. The optical trapping units may be configured to generate a plurality of spatially distinct optical trapping sites. For instance, the optical trapping units may be configured to generate at least about 10, 20, 30, 40, 50, 60, 70, 80, 90, 100, 200, 300, 400, 500, 600, 700, 800, 900, 1,000, 2,000, 3,000, 4,000, 5,000, 6,000, 7,000, 8,000, 9,000, 10,000, 20,000, 30,000, 40,000, 50,000, 60,000, 70,000, 80,000, 90,000, 100,000, 200,000, 300,000, 400,000, 500,000, 600,000, 700,000, 800,000, 900,000, 1,000,000, or more optical trapping sites. The optical trapping units may be configured to generate at most about 1,000,000, 900,000, 800,000, 700,000, 600,000, 500,000, 400,000, 300,000, 200,000, 100,000, 90,000, 80,000, 70,000, 60,000, 50,000, 40,000, 30,000, 20,000, 10,000, 9,000, 8,000, 7,000, 6,000, 5,000, 4,000, 3,000, 2,000, 1,000, 900, 800, 700, 600, 500, 400, 300, 200, 100, 90, 80, 70, 60, 50, 40, 30, 20, 10, or fewer optical trapping sites. The optical trapping units may be configured to trap a number of optical trapping sites that is within a range defined by any two of the preceding values.

The optical trapping units may be configured to trap a plurality of atoms. For instance, the optical trapping units may be configured to trap at least about 10, 20, 30, 40, 50, 60, 70, 80, 90, 100, 200, 300, 400, 500, 600, 700, 800, 900, 1,000, 2,000, 3,000, 4,000, 5,000, 6,000, 7,000, 8,000, 9,000, 10,000, 20,000, 30,000, 40,000, 50,000, 60,000, 70,000, 80,000, 90,000, 100,000, 200,000, 300,000, 400,000, 500,000, 600,000, 700,000, 800,000, 900,000, 1,000,000, or more atoms. The optical trapping units may be configured to trap at most about 1,000,000, 900,000, 800,000, 700,000, 600,000, 500,000, 400,000, 300,000, 200,000, 100,000, 90,000, 80,000, 70,000, 60,000, 50,000, 40,000, 30,000, 20,000, 10,000, 9,000, 8,000, 7,000, 6,000, 5,000, 4,000, 3,000, 2,000, 1,000, 900, 800, 700, 600, 500, 400, 300, 200, 100, 90, 80, 70, 60, 50, 40, 30, 20, 10, or fewer atoms. The optical trapping units may be configured to trap a number of atoms that is within a range defined by any two of the preceding values.

Each optical trapping site of the optical trapping units may be configured to trap at least about 1, 2, 3, 4, 5, 6, 7, 8, 9, 10, or more atoms. Each optical trapping site may be configured to trap at most about 10, 9, 8, 7, 6, 5, 4, 3, 2, 1, or fewer atoms. Each optical trapping site may be configured to trap a number of atoms that is within a range defined by any two of the preceding values. Each optical trapping site may be configured to trap a single atom.

Figure 4:
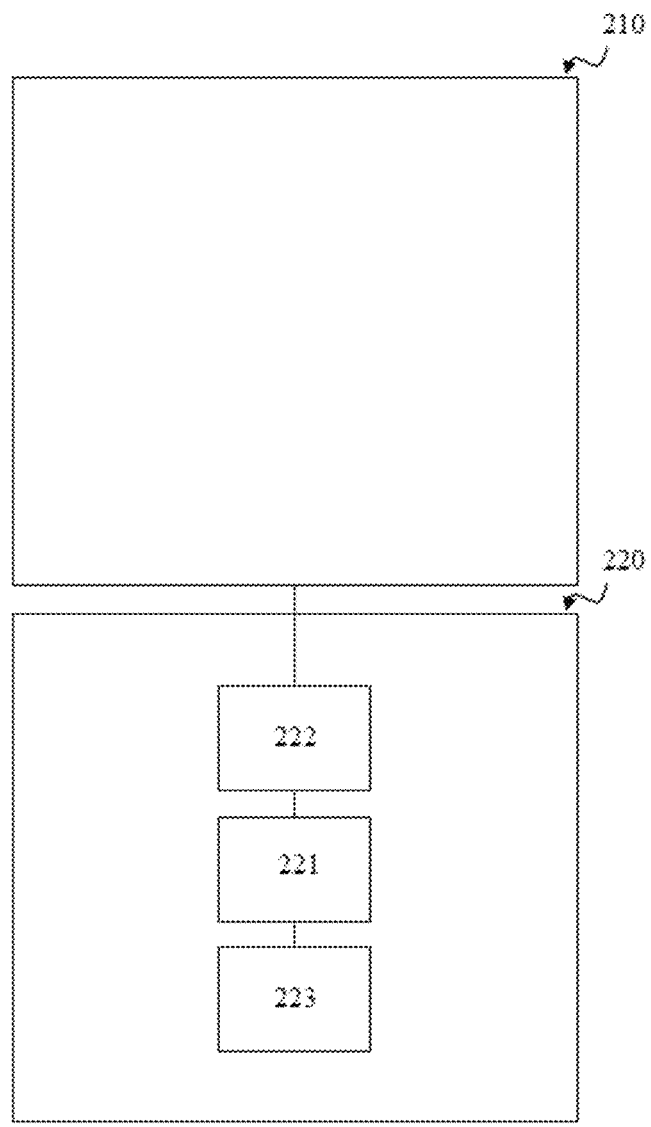
FIG. 4 shows an example of an electromagnetic delivery unit.

One or more atoms of the plurality of atoms may comprise or correspond to one more qubits (or non-classical bit), as described herein (for instance, with respect to FIG. 4). For example, one atom may comprise or correspond to one qubit. Two or more atoms of the plurality may be quantum mechanically entangled. Two or more atoms of the plurality may be quantum mechanically entangled with a coherence lifetime of at least about 1 microsecond (µs), 2 µs, 3 µs, 4 µs, 5 µs, 6 µs, 7 µs, 8 µs, 9 µs, 10 µs, 20 µs, 30 µs, 40 µs, 50 µs, 60 µs, 70 µs, 80 µs, 90 µs, 100 µs, 200 µs, 300 µs, 400 µs, 500 µs, 600 µs, 700 µs, 800 µs, 900 µs, 1 millisecond (ms), 2 ms, 3 ms, 4 ms, 5 ms, 6 ms, 7 ms, 8 ms, 9 ms, 10 ms, 20 ms, 30 ms, 40 ms, 50 ms, 60 ms, 70 ms, 80 ms, 90 ms, 100 ms, 200 ms, 300 ms, 400 ms, 500 ms, 600 ms, 700 ms, 800 ms, 900 ms, 1 second (s), 2 s, 3 s, 4 s, 5 s, 6 s, 7 s, 8 s, 9 s, 10 s, or more. Two or more atoms of the plurality may be quantum mechanically entangled with a coherence lifetime of at most about 10 s, 9 s, 8 s, 7 s, 6 s, 5 s, 4 s, 3 s, 2 s, 1 s, 900 ms, 800 ms, 700 ms, 600 ms, 500 ms, 400 ms, 300 ms, 200 ms, 100 ms, 90 ms, 80 ms, 70 ms, 60 ms, 50 ms, 40 ms, 30 ms, 20 ms, 10 ms, 9 ms, 8 ms, 7 ms, 6 ms, 5 ms, 4 ms, 3 ms, 2 ms, 1 ms, 900 µs, 800 µs, 700 µs, 600 µs, 500 µs, 400 µs, 300 µs, 200 µs, 100 µs, 90 µs, 80 µs, 70 µs, 60 µs, 50 µs, 40 µs, 30 µs, 20 µs, 10 µs, 9 µs, 8 µs, 7 µs, 6 µs, 5 µs, 4 µs, 3 µs, 2 µs, 1 µs, or less. Two or more atoms of the plurality may be quantum mechanically entangled with a coherence lifetime that is within a range defined by any two of the preceding values. One or more atoms of the plurality may comprise neutral atoms. One or more atoms of the plurality may comprise uncharged atoms.

One or more atoms of the plurality may comprise alkali atoms. The alkali atoms may comprise one or more Group I elements. For example, one or more atoms of the plurality may comprise lithium (Li) atoms, sodium (Na) atoms, potassium (K) atoms, rubidium (Rb) atoms, or caesium (Cs) atoms. One or more atoms of the plurality may comprise lithium-6 atoms, lithium-7 atoms, sodium-23 atoms, potassium-39 atoms, potassium-40 atoms, potassium-41 atoms, rubidium-85 atoms, rubidium-87 atoms, or caesium-133 atoms. One or more atoms of the plurality may comprise alkaline earth atoms. The alkaline earth atoms may comprise one or more Group II elements (e.g., Be or Mg). For example, one or more atoms of the plurality may comprise beryllium (Be) atoms, magnesium (Mg) atoms, calcium (Ca) atoms, strontium (Sr) atoms, or barium (Ba) atoms. One or more atoms may comprise beryllium-9 atoms, magnesium-24 atoms, magnesium-25 atoms, magnesium-26 atoms, calcium-40 atoms, calcium-42 atoms, calcium-43 atoms, calcium-44 atoms, calcium-46 atoms, calcium-48 atoms, strontium-84 atoms, strontium-86 atoms, strontium-87 atoms, strontium-88 atoms, barium-130 atoms, barium-132 atoms, barium-134 atoms, barium-135 atoms, barium-136 atoms, barium-137 atoms, or barium-138 atoms. One or more atoms of the plurality may comprise rare earth atoms. One or more atoms of the plurality may comprise scandium (Sc) atoms, yttrium (Y) atoms, lanthanum (La) atoms, cerium (Ce) atoms, praseodymium (Pr) atoms, neodymium (Nd) atoms, samarium (Sm) atoms, europium (Eu) atoms, gadolinium (Gd) atoms, terbium (Tb) atoms, dysprosium (Dy) atoms, holmium (Ho) atoms, erbium (Er) atoms, thulium (Tm) atoms, ytterbium (Yb) atoms, or lutetium (Lu) atoms. One or more atoms of the plurality may comprise scandium-45 atoms, yttrium-89 atoms, lanthanum-139 atoms, cerium-136 atoms, cerium-138 atoms, cerium-140 atoms, cerium-142 atoms, praseodymium-141 atoms, neodymium-142 atoms, neodymium-143 atoms, neodymium-145 atoms, neodymium-146 atoms, neodymium-148 atoms, samarium-144 atoms, samarium-149 atoms, samarium-150 atoms, samarium-152 atoms, samarium-154 atoms, europium-151 atoms, europium-153 atoms, gadolinium-154 atoms, gadolinium-155 atoms, gadolinium-156 atoms, gadolinium-157 atoms, gadolinium-158 atoms, gadolinium-160 atoms, terbium-159 atoms, dysprosium-156 atoms, dysprosium-158 atoms, dysprosium-160 atoms, dysprosium-161 atoms, dysprosium-162 atoms, dysprosium-163 atoms, dysprosium-164 atoms, erbium-162 atoms, erbium-164 atoms, erbium-166 atoms, erbium-167 atoms, erbium-168 atoms, erbium-170 atoms, holmium-165 atoms, thulium-169 atoms, ytterbium-168 atoms, ytterbium-170 atoms, ytterbium-171 atoms, ytterbium-172 atoms, ytterbium-173 atoms, ytterbium-174 atoms, ytterbium-176 atoms, lutetium-175 atoms, or lutetium-176 atoms.

The plurality of atoms may comprise a single element selected from the group consisting of Li, Na, K, Rb, Cs, Be, Mg, Ca, Sr, and Ba. The plurality of atoms may comprise a mixture of elements selected from the group consisting of Li, Na, K, Rb, Cs, Be, Mg, Ca, Sr, and Ba. The plurality of atoms may comprise a natural isotopic mixture of one or more elements selected from the group consisting of Li, Na, K, Rb, Cs, Be, Mg, Ca, Sr, and Ba. The plurality of atoms may comprise an isotopically enriched mixture of one or more elements selected from the group consisting of Li, Na, K, Rb, Cs, Be, Mg, Ca, Sr, and Ba. The plurality of atoms may comprise a natural isotopic mixture of one or more elements selected from the group consisting of Sc, Y, La, Ce, Pr, Nd, Sm, Eu, Gd, Tb, Dy, Ho, Er, Tm, Yb, and Lu. The plurality of atoms may comprise an isotopically enriched mixture of one or more elements selected from the group consisting of Sc, Y, La, Ce, Pr, Nd, Sm, Eu, Gd, Tb, Dy, Ho, Er, Tm, Yb, and Lu. atoms may comprise rare earth atoms. For instance, the plurality of atoms may comprise lithium-6 atoms, lithium-7 atoms, sodium-23 atoms, potassium-39 atoms, potassium-40 atoms, potassium-41 atoms, rubidium-85 atoms, rubidium-87 atoms, caesium-133 atoms, beryllium-9 atoms, magnesium-24 atoms, magnesium-25 atoms, magnesium-26 atoms, calcium-40 atoms, calcium-42 atoms, calcium-43 atoms, calcium-44 atoms, calcium-46 atoms, calcium-48 atoms, strontium-84 atoms, strontium-86 atoms, strontium-87 atoms, strontium-88 atoms, barium-130 atoms, barium-132 atoms, barium-134 atoms, barium-135 atoms, barium-136 atoms, barium-137 atoms, barium-138 atoms, scandium-45 atoms, yttrium-89 atoms, lanthanum-139 atoms, cerium-136 atoms, cerium-138 atoms, cerium-140 atoms, cerium-142 atoms, praseodymium-141 atoms, neodymium-142 atoms, neodymium-143 atoms, neodymium-145 atoms, neodymium-146 atoms, neodymium-148 atoms, samarium-144 atoms, samarium-149 atoms, samarium-150 atoms, samarium-152 atoms, samarium-154 atoms, europium-151 atoms, europium-153 atoms, gadolinium-154 atoms, gadolinium-155 atoms, gadolinium-156 atoms, gadolinium-157 atoms, gadolinium-158 atoms, gadolinium-160 atoms, terbium-159 atoms, dysprosium-156 atoms, dysprosium-158 atoms, dysprosium-160 atoms, dysprosium-161 atoms, dysprosium-162 atoms, dysprosium-163 atoms, dysprosium-164 atoms, erbium-162 atoms, erbium-164 atoms, erbium-166 atoms, erbium-167 atoms, erbium-168 atoms, erbium-170 atoms, holmium-165 atoms, thulium-169 atoms, ytterbium-168 atoms, ytterbium-170 atoms, ytterbium-171 atoms, ytterbium-172 atoms, ytterbium-173 atoms, ytterbium-174 atoms, ytterbium-176 atoms, lutetium-175 atoms, or lutetium-176 atoms enriched to an isotopic abundance of at least about 50%, 60%, 70%, 80%, 90%, 91%, 92%, 93%, 94%, 95%, 96%, 97%, 98%, 99%, 99.1%, 99.2%, 99.3%, 99.4%, 99.5%, 99.6%, 99.7%, 99.8%, 99.9%, 99.91%, 99.92%, 99.93%, 99.94%, 99.95%, 99.96%, 99.97%, 99.98%, 99.99%, or more. The plurality of atoms may comprise lithium-6 atoms, lithium-7 atoms, sodium-23 atoms, potassium-39 atoms, potassium-40 atoms, potassium-41 atoms, rubidium-85 atoms, rubidium-87 atoms, caesium-133 atoms, beryllium-9 atoms, magnesium-24 atoms, magnesium-25 atoms, magnesium-26 atoms, calcium-40 atoms, calcium-42 atoms, calcium-43 atoms, calcium-44 atoms, calcium-46 atoms, calcium-48 atoms, strontium-84 atoms, strontium-86 atoms, strontium-87 atoms, strontium-88 atoms, barium-130 atoms, barium-132 atoms, barium-134 atoms, barium-135 atoms, barium-136 atoms, barium-137 atoms, barium-138 atoms, scandium-45 atoms, yttrium-89 atoms, lanthanum-139 atoms, cerium-136 atoms, cerium-138 atoms, cerium-140 atoms, cerium-142 atoms, praseodymium-141 atoms, neodymium-142 atoms, neodymium-143 atoms, neodymium-145 atoms, neodymium-146 atoms, neodymium-148 atoms, samarium-144 atoms, samarium-149 atoms, samarium-150 atoms, samarium-152 atoms, samarium-154 atoms, europium-151 atoms, europium-153 atoms, gadolinium-154 atoms, gadolinium-155 atoms, gadolinium-156 atoms, gadolinium-157 atoms, gadolinium-158 atoms, gadolinium-160 atoms, terbium-159 atoms, dysprosium-156 atoms, dysprosium-158 atoms, dysprosium-160 atoms, dysprosium-161 atoms, dysprosium-162 atoms, dysprosium-163 atoms, dysprosium-164 atoms, erbium-162 atoms, erbium-164 atoms, erbium-166 atoms, erbium-167 atoms, erbium-168 atoms, erbium-170 atoms, holmium-165 atoms, thulium-169 atoms, ytterbium-168 atoms, ytterbium-170 atoms, ytterbium-171 atoms, ytterbium-172 atoms, ytterbium-173 atoms, ytterbium-174 atoms, ytterbium-176 atoms, lutetium-175 atoms, or lutetium-176 atoms enriched to an isotopic abundance of at most about 99.99%, 99.98%, 99.97%, 99.96%, 99.95%, 99.94%, 99.93%, 99.92%, 99.91%, 99.9%, 99.8%, 99.7%, 99.6%, 99.5%, 99.4%, 99.3%, 99.2%, 99.1%, 99%, 98%, 97%, 96%, 95%, 94%, 93%, 92%, 91%, 90%, 80%, 70%, 60%, 50%, or less. The plurality of atoms may comprise lithium-6 atoms, lithium-7 atoms, sodium-23 atoms, potassium-39 atoms, potassium-40 atoms, potassium-41 atoms, rubidium-85 atoms, rubidium-87 atoms, caesium-133 atoms, beryllium-9 atoms, magnesium-24 atoms, magnesium-25 atoms, magnesium-26 atoms, calcium-40 atoms, calcium-42 atoms, calcium-43 atoms, calcium-44 atoms, calcium-46 atoms, calcium-48 atoms, strontium-84 atoms, strontium-86 atoms, strontium-87 atoms, strontium-88 atoms, barium-130 atoms, barium-132 atoms, barium-134 atoms, barium-135 atoms, barium-136 atoms, barium-137 atoms, barium-138 atoms, scandium-45 atoms, yttrium-89 atoms, lanthanum-139 atoms, cerium-136 atoms, cerium-138 atoms, cerium-140 atoms, cerium-142 atoms, praseodymium-141 atoms, neodymium-142 atoms, neodymium-143 atoms, neodymium-145 atoms, neodymium-146 atoms, neodymium-148 atoms, samarium-144 atoms, samarium-149 atoms, samarium-150 atoms, samarium-152 atoms, samarium-154 atoms, europium-151 atoms, europium-153 atoms, gadolinium-154 atoms, gadolinium-155 atoms, gadolinium-156 atoms, gadolinium-157 atoms, gadolinium-158 atoms, gadolinium-160 atoms, terbium-159 atoms, dysprosium-156 atoms, dysprosium-158 atoms, dysprosium-160 atoms, dysprosium-161 atoms, dysprosium-162 atoms, dysprosium-163 atoms, dysprosium-164 atoms, erbium-162 atoms, erbium-164 atoms, erbium-166 atoms, erbium-167 atoms, erbium-168 atoms, erbium-170 atoms, holmium-165 atoms, thulium-169 atoms, ytterbium-168 atoms, ytterbium-170 atoms, ytterbium-171 atoms, ytterbium-172 atoms, ytterbium-173 atoms, ytterbium-174 atoms, ytterbium-176 atoms, lutetium-175 atoms, or lutetium-176 atoms enriched to an isotopic abundance that is within a range defined by any two of the preceding values.

The system 200 may comprise one or more electromagnetic delivery units 220. The electromagnetic delivery units may comprise any electromagnetic delivery unit described herein, such as an electromagnetic delivery unit described herein with respect to FIG. 4. The electromagnetic delivery units may be configured to apply electromagnetic energy to one or more atoms of the plurality of atoms. Applying the electromagnetic energy may induce the atoms to adopt one or more superposition states of a first atomic state and a second atomic state that is different from the first atomic state.

The first atomic state may comprise a first single-qubit state. The second atomic state may comprise a second single-qubit state. The first atomic state or second atomic state may be elevated in energy with respect to a ground atomic state of the atoms. The first atomic state or second atomic state may be equal in energy with respect to the ground atomic state of the atoms.

The first atomic state may comprise a first hyperfine electronic state and the second atomic state may comprise a second hyperfine electronic state that is different from the first hyperfine electronic state. For instance, the first and second atomic states may comprise first and second hyperfine states on a multiplet manifold, such as a triplet manifold. The first and second atomic states may comprise first and second hyperfine states, respectively, on a $^3P_1$ or $^3P_2$ manifold. The first and second atomic states may comprise first and second hyperfine states, respectively, on a $^3P_1$ or $^3P_2$ manifold of any atom described herein, such as a strontium-87 $^3P_1$ manifold or a strontium-87 $^3P_2$ manifold.

Figure 9:
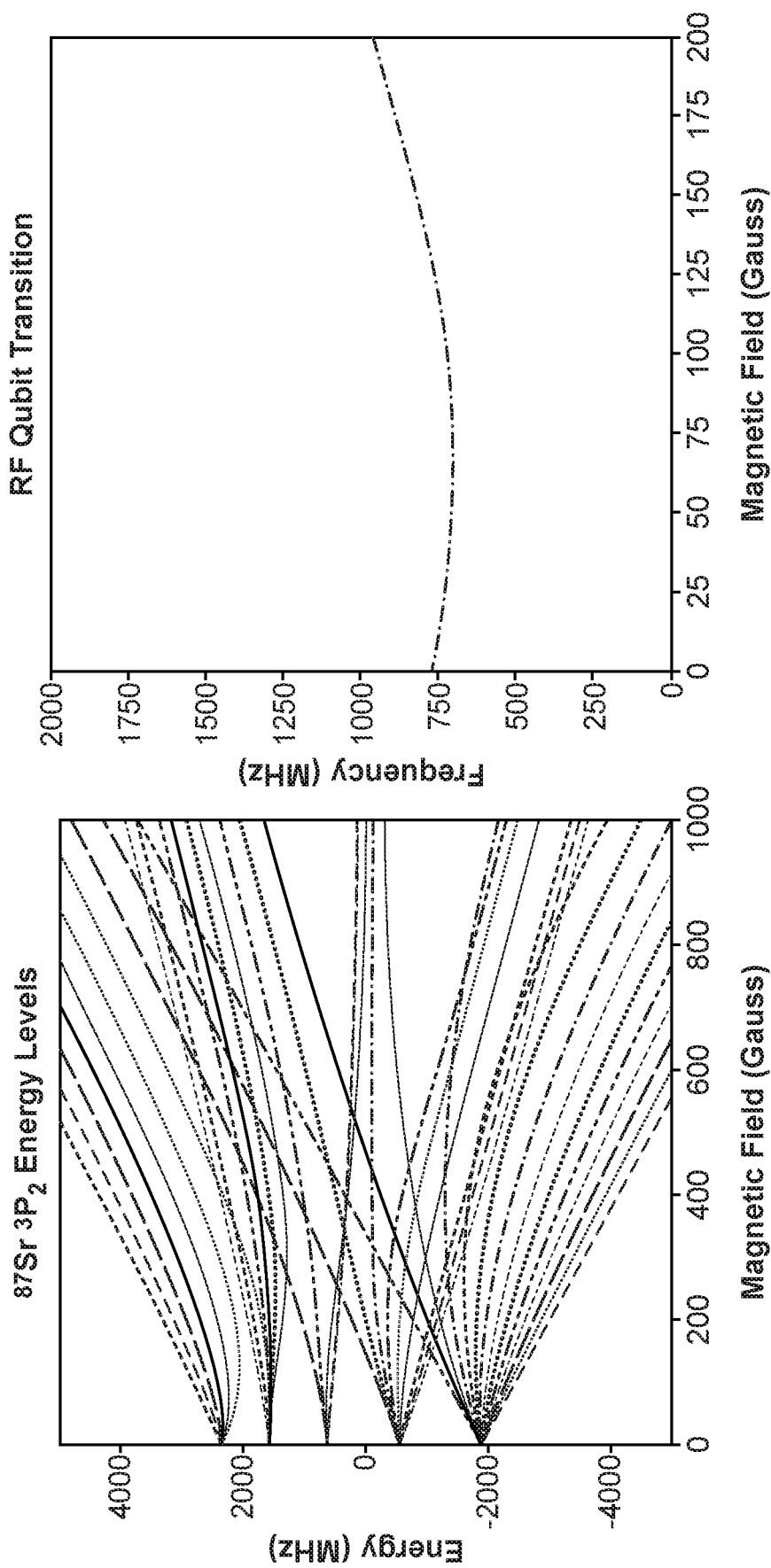
FIG. 9 shows an example of a qubit comprising a 3P2 state of strontium-87.

FIG. 9 shows an example of a qubit comprising a $^3P_2$ state of strontium-87. The left panel of FIG. 9 shows the rich energy level structure of the $^3P_2$ state of strontium-87. The right panel of FIG. 9 shows a potential qubit transition within the $^3P_2$ state of strontium-87 which is insensitive (to first order) to changes in magnetic field around 70 Gauss.

The first atomic state may comprise a first nuclear spin state and the second atomic state may comprise a second nuclear spin state that is different from the first nuclear spin state. The first and second atomic states may comprise first and second nuclear spin states, respectively, of a nucleus comprising a nuclear spin greater than-½. The first and second atomic states may comprise first and second nuclear spin states, respectively, of a spin-1, spin-3/2, spin-2, spin-5/2, spin-3, spin-7/2, spin-4, or spin-9/2 nucleus. The first and second atomic states may comprise first and second nuclear spin states, respectively, of any atom described herein, such as first and second spin states of strontium-87.

For first and second nuclear spin states associated with a nucleus comprising a nuclear spin greater than ½ (such as a spin-1, spin-3/2, spin-2, spin-5/2, spin-3, spin-7/2, spin-4, or spin-9/2 nucleus), transitions between the first and second nuclear spin states may be accompanied by transitions between other spin states on the nuclear spin manifold. For instance, for a spin-9/2 nucleus in the presence of a uniform magnetic field, all of the nuclear spin levels may be separated by equal energy. Thus, a transition (such as a Raman transition) designed to transfer atoms from, for instance, an $m_N=9/2$ spin state to an $m_N=7/2$ spin state, may also drive $m_N=7/2$ to $m_N=5/2$, $m_N=5/2$ to $m_N=3/2$, $m_N=3/2$ to $m_N=1/2$, $m_N=1/2$ to $m_N=-1/2$, $m_N=-1/2$ to $m_N=-3/2$, $m_N=-3/2$ to $m_N=-5/2$, $m_N=-5/2$ to $m_N=-7/2$, and $m_N=-7/2$ to $m_N=-9/2$, where $m_N$ is the nuclear spin state. Similarly, a transition (such as a Raman transition) designed to transfer atoms from, for instance, an $m_N=9/2$ spin state to an $m_N=5/2$ spin state, may also drive $m_N=7/2$ to $m_N=3/2$, $m_N=5/2$ to $m_N=1/2$, $m_N=3/2$ to $m_N=-1/2$, $m_N=1/2$ to $m_N=-3/2$, $m_N=-1/2$ to $m_N=-5/2$, $m_N=-3/2$ to $m_N=-7/2$, and $m_N=-5/2$ to $m_N=-9/2$. Such a transition may thus not be selective for inducing transitions between particular spin states on the nuclear spin manifold. It may be desirable to instead implement selective transitions between particular first and second spins states on the nuclear spin manifold. This may be accomplished by providing light from a light source that provides an AC Stark shift and pushes neighboring nuclear spin states out of resonance with a transition between the desired transition between the first and second nuclear spin states. For instance, if a transition from first and second nuclear spin states having $m_N=-9/2$ and $m_N=-7/2$ is desired, the light may provide an AC Stark shift to the $m_N=-5/2$ spin state, thereby greatly reducing transitions between the $m_N=-7/2$ and $m_N=-5/2$ states. Similarly, if a transition from first and second nuclear spin states having $m_N=-9/2$ and $m_N=-5/2$ is desired, the light may provide an AC Stark shift to the $m_N=-1/2$ spin state, thereby greatly reducing transitions between the $m_N=-5/2$ and $m_N=-1/2$ states. This may effectively create a two-level subsystem within the nuclear spin manifold that is decoupled from the remainder of the nuclear spin manifold, greatly simplifying the dynamics of the qubit systems. It may be advantageous to use nuclear spin states near the edge of the nuclear spin manifold (e.g., $m_N=-9/2$ and $m_N=-7/2$, $m_N=7/2$ and $m_N=9/2$, $m_N=-9/2$ and $m_N=-5/2$, or $m_N=5/2$ and $m_N=9/2$ for a spin-9/2 nucleus) such that only one AC Stark shift is required. Alternatively, nuclear spin states farther from the edge of the nuclear spin manifold (e.g., $m_N=-5/2$ and $m_N=-3/2$ or $m_N=-5/2$ and $m_N=-1/2$) may be used and two AC Stark shifts may be implemented (e.g., at $m_N=-7/2$ and $m_N=-1/2$ or $m_N=-9/2$ and $m_N=3/2$).

Qubits based on nuclear spin states in the electronic ground state may allow exploitation of long-lived metastable excited electronic states (such as a $^3P_0$ state in strontium-87) for qubit storage. Atoms may be selectively transferred into such a state to reduce cross-talk or to improve gate or detection fidelity. Such a storage or shelving process may be atom-selective using the SLMs or AODs described herein.

The system 200 may comprise one or more readout optical units 230. The readout optical units may be configured to perform one or more measurements of the one or more superposition states to obtain the non-classical computation. The readout optical units may comprise one or more optical detectors. The detectors may comprise one or more photomultiplier tubes (PMTs), photodiodes, avalanche diodes, single-photon avalanche diodes, single-photon avalanche diode arrays, phototransistors, reverse-biased light emitting diodes (LEDs), charge coupled devices (CCDs), or complementary metal oxide semiconductor (CMOS) cameras. The optical detectors may comprise one or more fluorescence detectors. The readout optical unit may comprise one or more objectives, such as one or more objective having a numerical aperture (NA) of at least about 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, or more. The objective may have an NA of at most about 1, 0.95, 0.9, 0.85, 0.8, 0.75, 0.7, 0.65, 0.6, 0.55, 0.5, 0.45, 0.4, 0.35, 0.3, 0.25, 0.2, 0.15, 0.1, or less. The objective may have an NA that is within a range defined by any two of the preceding values.

The system 200 may comprise one or more vacuum units 240. The one or more vacuum units may comprise one or more vacuum pumps. The vacuum units may comprise one or more roughing vacuum pumps, such as one or more rotary pumps, rotary vane pumps, rotary piston pumps, diaphragm pumps, piston pumps, reciprocating piston pumps, scroll pumps, or screw pumps. The one or more roughing vacuum pumps may comprise one or more wet (for instance, oil-sealed) or dry roughing vacuum pumps. The vacuum units may comprise one or more high-vacuum pumps, such as one or more cryosorption pumps, diffusion pumps, turbomolecular pumps, molecular drag pumps, turbo-drag hybrid pumps, cryogenic pumps, ions pumps, or getter pumps.

The vacuum units may comprise any combination of vacuum pumps described herein. For instance, the vacuum units may comprise one or more roughing pumps (such as a scroll pump) configured to provide a first stage of rough vacuum pumping. The roughing vacuum pumps may be configured to pump gases out of the system 200 to achieve a low vacuum pressure condition. For instance, the roughing pumps may be configured to pump gases out of the system 200 to achieve a low vacuum pressure of at most about $10^3$ Pascals (Pa). The vacuum units may further comprise one or more high-vacuum pumps (such as one or more ion pumps, getter pumps, or both) configured to provide a second stage of high vacuum pumping or ultra-high vacuum pumping. The high-vacuum pumps may be configured to pump gases out of the system 200 to achieve a high vacuum pressure of at most about $10^{-3}$ Pa or an ultra-high vacuum pressure of at most about $10^{-6}$ Pa once the system 200 has reached the low vacuum pressure condition provided by the one or more roughing pumps.

The vacuum units may be configured to maintain the system 200 at a pressure of at most about $10^{-6}$ Pa, $9\times10^{-7}$ Pa, $8\times10^{-7}$ Pa, $7\times10^{-7}$ Pa, $6\times10^{-7}$ Pa, $5\times10^{-7}$ Pa, $4\times10^{-7}$ Pa, $3\times10^{-7}$ Pa, $2\times10^{-7}$ Pa, $10^{-7}$ Pa, $9\times10^{-8}$ Pa, $8\times10^{-8}$ Pa, $7\times10^{-8}$ Pa, $6\times10^{-8}$ Pa, $5\times10^{-8}$ Pa, $4\times10^{-8}$ Pa, $3\times10^{-8}$ Pa, $2\times10^{-8}$ Pa, $10^{-8}$ Pa, $9\times10^{-9}$ Pa, $8\times10^{-9}$ Pa, $7\times10^{-9}$ Pa, $6\times10^{-9}$ Pa, $5\times10^{-9}$ Pa, $4\times10^{-9}$ Pa, $3\times10^{-9}$ Pa, $2\times10^{-9}$ Pa, $10^{-9}$ Pa, $9\times10^{-10}$ Pa, $8\times10^{-10}$ Pa, $7\times10^{-10}$ Pa, $6\times10^{-10}$ Pa, $5\times10^{-10}$ Pa, $4\times10^{-10}$ Pa, $3\times10^{-10}$ Pa, $2\times10^{-10}$ Pa, $10^{-10}$ Pa, $9\times10^{-11}$ Pa, $8\times10^{-11}$ Pa, $7\times10^{-11}$ Pa, $6\times10^{-11}$ Pa, $5\times10^{-11}$ Pa, $4\times10^{-11}$ Pa, $3\times10^{-11}$ Pa, $2\times10^{-11}$ Pa, $10^{-11}$ Pa, $9\times10^{-12}$ Pa, $8\times10^{-12}$ Pa, $7\times10^{-12}$ Pa, $6\times10^{-12}$ Pa, $5\times10^{-12}$ Pa, $4\times10^{-12}$ Pa, $3\times10^{-12}$ Pa, $2\times10^{-12}$ Pa, $10^{-12}$ Pa, or lower. The vacuum units may be configured to maintain the system 200 at a pressure of at least about $10^{-12}$ Pa, $2\times10^{-12}$ Pa, $3\times10^{-12}$ Pa, $4\times10^{-12}$ Pa, $5\times10^{-12}$ Pa, $6\times10^{-12}$ Pa, $7\times10^{-12}$ Pa, $8\times10^{-12}$ Pa, $9\times10^{-12}$ Pa, $10^{-11}$ Pa, $2\times10^{-11}$ Pa, $3\times10^{-11}$ Pa, $4\times10^{-11}$ Pa, $5\times10^{-11}$ Pa, $6\times10^{-11}$ Pa, $7\times10^{-11}$ Pa, $8\times10^{-11}$ Pa, $9\times10^{-11}$ Pa, $10^{-10}$ Pa, $2\times10^{-10}$ Pa, $3\times10^{-10}$ Pa, $4\times10^{-10}$ Pa, $5\times10^{-10}$ Pa, $6\times10^{-10}$ Pa, $7\times10^{-10}$ Pa, $8\times10^{-10}$ Pa, $9\times10^{-10}$ Pa, $10^{-9}$ Pa, $2\times10^{-9}$ Pa, $3\times10^{-9}$ Pa, $4\times10^{-9}$ Pa, $5\times10^{-9}$ Pa, $6\times10^{-9}$ Pa, $7\times10^{-9}$ Pa, $8\times10^{-9}$ Pa, $9\times10^{-9}$ Pa, $10^{-8}$ Pa, $2\times10^{-8}$ Pa, $3\times10^{-8}$ Pa, $4\times10^{-8}$ Pa, $5\times10^{-8}$ Pa, $6\times10^{-8}$ Pa, $7\times10^{-8}$ Pa, $8\times10^{-8}$ Pa, $9\times10^{-8}$ Pa, $10^{-7}$ Pa, $2\times10^{-7}$ Pa, $3\times10^{-7}$ Pa, $4\times10^{-7}$ Pa, $5\times10^{-7}$ Pa, $6\times10^{-7}$ Pa, $7\times10^{-7}$ Pa, $8\times10^{-7}$ Pa, $9\times10^{-7}$ Pa, $10^{-6}$ Pa, or higher. The vacuum units may be configured to maintain the system 200 at a pressure that is within a range defined by any two of the preceding values.

The system 200 may comprise one or more state preparation units 250. The state preparation units may comprise any state preparation unit described herein, such as a state preparation unit described herein with respect to FIG. 5. The state preparation units may be configured to prepare a state of the plurality of atoms.

The system 200 may comprise one or more atom reservoirs 260. The atom reservoirs may be configured to supply one or more replacement atoms to replace one or more atoms at one or more optical trapping sites upon loss of the atoms from the optical trapping sites.

The system 200 may comprise one or more atom movement units 270. The atom movement units may be configured to move the one or more replacement atoms to the one or more optical trapping sites. For instance, the one or more atom movement units may comprise one or more electrically tunable lenses, acousto-optic deflectors (AODs), or spatial light modulators (SLMs).

The system 200 may comprise one or more entanglement units 280. The entanglement units may be configured to quantum mechanically entangle at least a first atom of the plurality of atoms with at least a second atom of the plurality of atoms. The first or second atom may be in a superposition state at the time of quantum mechanical entanglement. Alternatively or in combination, the first or second atom may not be in a superposition state at the time of quantum mechanical entanglement. The first atom and the second atom may be quantum mechanically entangled through one or more magnetic dipole interactions, electric dipole interactions, or induced electric dipole interactions. The entanglement units may be configured to quantum mechanically entangle any number of atoms described herein.

The entanglement units may comprise one or more Rydberg excitation units. The Rydberg excitation units may be configured to electronically excite the subset of the one or more atoms in the one or more superposition states to a Rydberg state, thereby forming one or more Rydberg atoms. Alternatively or in combination, the Rydberg excitation units may be configured to continuously drive the one or more atoms in the one or more superposition states via a transition to a Rydberg state, thereby forming one or more dressed Rydberg atoms. The Rydberg excitation units may be configured to induce one or more quantum mechanical entanglements between the Rydberg atoms or dressed Rydberg atoms and the second atom. The second atom may be located at a distance of at least about 200 nanometers (nm), 300 nm, 400 nm, 500 nm, 600 nm, 700 nm, 800 nm, 900 nm, 1 micrometer ($\mu$m), 2 $\mu$m, 3 $\mu$m, 4 $\mu$m, 5 $\mu$m, 6 $\mu$m, 7 $\mu$m, 8 $\mu$m, 9 $\mu$m, 10 $\mu$m, or more from the Rydberg atoms or dressed Rydberg atoms. The second atom may be located at a distance of at most about 10 $\mu$m, 9 $\mu$m, 8 $\mu$m, 7 $\mu$m, 6 $\mu$m, 5 $\mu$m, 4 $\mu$m, 3 $\mu$m, 2 $\mu$m, 1 $\mu$m, 900 nm, 800 nm, 700 nm, 600 nm, 500 nm, 400 nm, 300 nm, 200 nm, or less from the Rydberg atoms or dressed Rydberg atoms. The second atom may be located at a distance from the Rydberg atoms or dressed Rydberg atoms that is within a range defined by any two of the preceding values. The Rydberg excitation units may be configured to allow the Rydberg atoms or dressed Rydberg atoms to relax to a lower-energy atomic state, thereby forming one or more two-qubit units. The Rydberg excitation units may be configured to induce the Rydberg atoms or dressed Rydberg atoms to relax to a lower-energy atomic state, thereby forming one or more two-qubit units. The Rydberg excitation units may be configured to drive the Rydberg atoms or dressed Rydberg atoms to a lower-energy atomic state, thereby forming one or more two-qubit units. For instance, the Rydberg excitation units may be configured to apply electromagnetic radiation (such as RF radiation or optical radiation) to drive the Rydberg atoms or dressed Rydberg atoms to a lower-energy atomic state. The Rydberg excitation units may be configured to induce any number of quantum mechanical entanglements between any number of atoms of the plurality of atoms.

The Rydberg excitation units may comprise one or more light sources (such as any light source described herein) configured to emit light having one or more ultraviolet (UV) wavelengths. The UV wavelengths may be selected to correspond to a wavelength that forms the Rydberg atoms or dressed Rydberg atoms. For instance, the light may comprise one or more wavelengths of at least about 200 nm, 210 nm, 220 nm, 230 nm, 240 nm, 250 nm, 260 nm, 270 nm, 280 nm, 290 nm, 300 nm, 310 nm, 320 nm, 330 nm, 340 nm, 350 nm, 360 nm, 370 nm, 380 nm, 390 nm, 400 nm, or more. The light may comprise one or more wavelengths of at most about 400 nm, 390 nm, 380 nm, 370 nm, 360 nm, 350 nm, 340 nm, 330 nm, 320 nm, 310 nm, 300 nm, 290 nm, 280 nm, 270 nm, 260 nm, 250 nm, 240 nm, 230 nm, 220 nm, 210 nm, 200 nm, or less. The light may comprise one or more wavelengths that are within a range defined by any two of the preceding values. For instance, the light may comprise one or more wavelengths that are within a range from 300 nm to 400 nm.

The Rydberg excitation units may be configured to induce a two-photon transition to generate an entanglement. The Rydberg excitation units may be configured to induce a two-photon transition to generate an entanglement between two atoms. The Rydberg excitation units may be configured to selectively induce a two-photon transition to selectively generate an entanglement between two atoms. For instance, the Rydberg excitation units may be configured to direct electromagnetic energy (such as optical energy) to particular optical trapping sites to selectively induce a two-photon transition to selectively generate the entanglement between the two atoms. The two atoms may be trapped in nearby optical trapping sites. For instance, the two atoms may be trapped in adjacent optical trapping sites. The two-photon transition may be induced using first and second light from first and second light sources, respectively. The first and second light sources may each comprise any light source described herein (such as any laser described herein). The first light source may be the same or similar to a light source used to perform a single-qubit operation described herein. Alternatively, different light sources may be used to perform a single-qubit operation and to induce a two-photon transition to generate an entanglement. The first light source may emit light comprising one or more wavelengths in the visible region of the optical spectrum (e.g., within a range from 400 nm to 800 nm or from 650 nm to 700 nm). The second light source may emit light comprising one or more wavelengths in the ultraviolet region of the optical spectrum (e.g., within a range from 200 nm to 400 nm or from 300 nm to 350 nm). The first and second light sources may emit light having substantially equal and opposite spatially-dependent frequency shifts.

The Rydberg atoms or dressed Rydberg atoms may comprise a Rydberg state that may have sufficiently strong interatomic interactions with nearby atoms (such as nearby atoms trapped in nearby optical trapping sites) to enable the implementation of two-qubit operations. The Rydberg states may comprise a principal quantum number of at least about 50, 60, 70, 80, 90, 100, or more. The Rydberg states may comprise a principal quantum number of at most about 100, 90, 80, 70, 60, 50, or less. The Rydberg states may comprise a principal quantum number that is within a range defined by any two of the preceding values. The Rydberg states may interact with nearby atoms through van der Waals interactions. The van der Waals interactions may shift atomic energy levels of the atoms.

State selective excitation of atoms to Rydberg levels may enable the implementation of two-qubit operations. Two-photon transitions may be used to excite atoms from a ground state (such as a $^1S_0$ ground state) to a Rydberg state (such as an $n^3S_1$ state, wherein n is a principal quantum number described herein). State selectivity may be accomplished by a combination of laser polarization and spectral selectivity. The two-photon transitions may be implemented using first and second laser sources, as described herein. The first laser source may emit pi-polarized light, which may not change the projection of atomic angular momentum along a magnetic field. The second laser may emit circularly polarized light, which may change the projection of atomic angular momentum along the magnetic field by one unit. The first and second qubit levels may be excited to Rydberg level using this polarization. However, the Rydberg levels may be more sensitive to magnetic fields than the ground state so large splittings (for instance, on the order of 100s of MHz) may be readily obtained. This spectral selectivity may allow state selective excitation to Rydberg levels.

Two-qubit operations may rely on energy shifts of levels due to Van der Waals interactions described herein. Such shifts may either prevent the excitation of one atom conditional on the state of the other or change the coherent dynamics of excitation of the two-atom system to enact a two-qubit operation. In some cases, "dressed states" may be generated under continuous driving to enact two-qubit operations without requiring full excitation to a Rydberg level (for instance, as described in https://arxiv.org/abs/1605.05207, which is incorporated herein by reference in its entirety for all purposes).

Cloud Computing

The system 200 may be operatively coupled to a digital computer described herein (such as a digital computer described herein with respect to FIG. 1) over a network described herein (such as a network described herein with respect to FIG. 1). The network may comprise a cloud computing network.

Optical Trapping Units

Figure 3A:
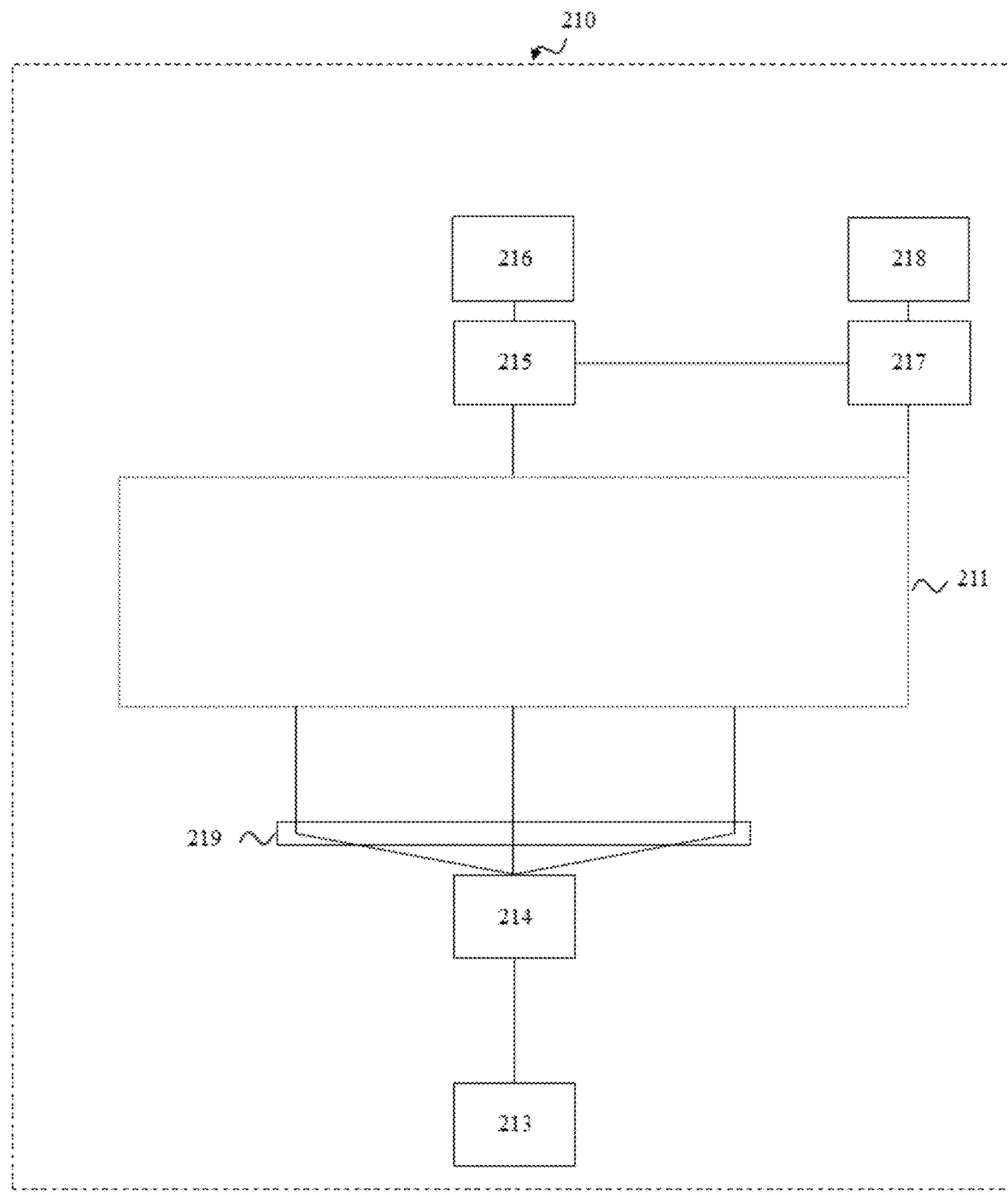
FIG. 3A shows an example of an optical trapping unit.
Figure 3B:
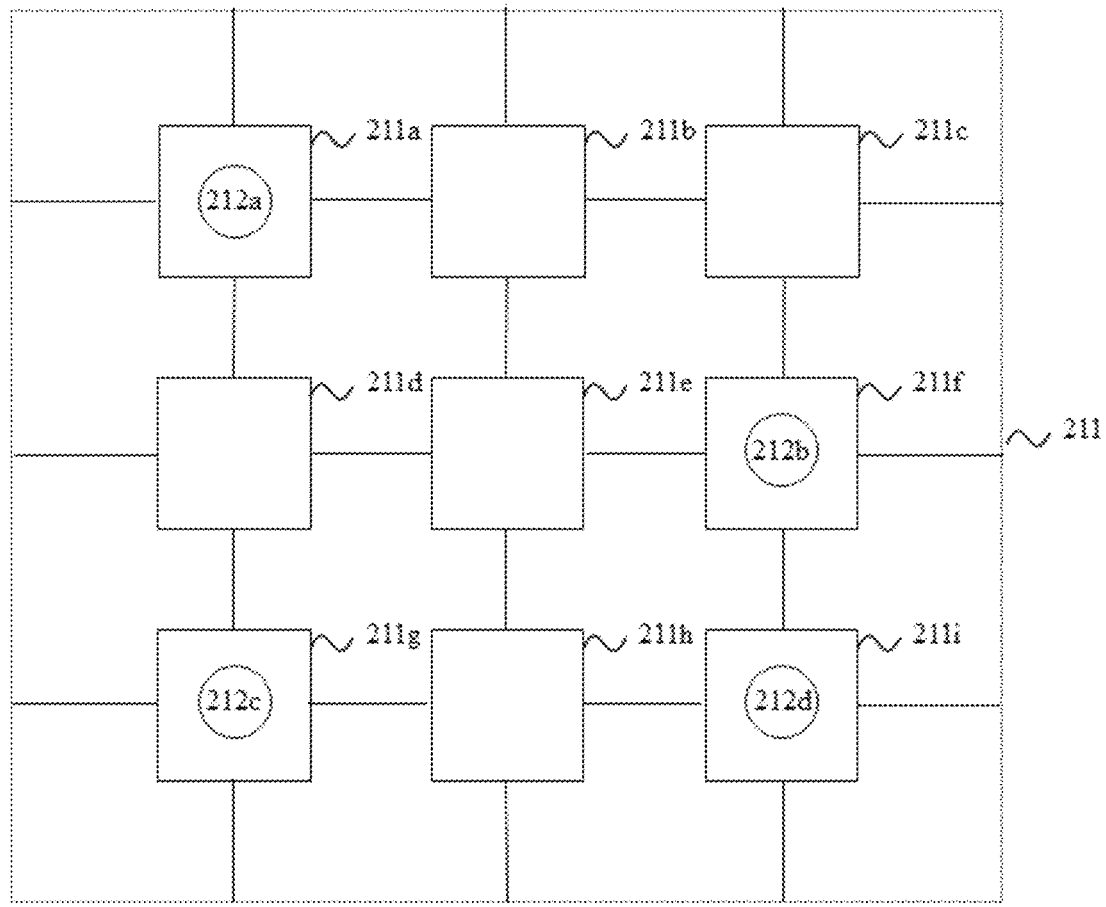
FIG. 3B shows an example of a plurality of optical trapping sites.

FIG. 3A shows an example of an optical trapping unit 210. The optical trapping unit may be configured to generate a plurality 211 of spatially distinct optical trapping sites, as described herein. For instance, as shown in FIG. 3B, the optical trapping unit may be configured to generate a first optical trapping site 211a, second optical trapping site 211b, third optical trapping site 211c, fourth optical trapping site 211d, fifth optical trapping site 211e, sixth optical trapping site 211f, seventh optical trapping site 211g, eighth optical trapping site 211h, and ninth optical trapping site 211i, as depicted in FIG. 3A. The plurality of spatially distinct optical trapping sites may be configured to trap a plurality of atoms, such as first atom 212a, second atom 212b, third atom 212c, and fourth atom 212d, as depicted in FIG. 3A. As depicted in FIG. 3B, each optical trapping site may be configured to trap a single atom. As depicted in FIG. 3B, some of the optical trapping sites may be empty (i.e., not trap an atom).

As shown in FIG. 3B, the plurality of optical trapping sites may comprise a two-dimensional (2D) array. The 2D array may be perpendicular to the optical axis of optical components of the optical trapping unit depicted in FIG. 3A. Alternatively, the plurality of optical trapping sites may comprise a one-dimensional (1D) array or a three-dimensional (3D) array.

Although depicted as comprising nine optical trapping sites filled by four atoms in FIG. 3B, the optical trapping unit 210 may be configured to generate any number of spatially distinct optical trapping sites described herein and may be configured to trap any number of atoms described herein.

Each optical trapping site of the plurality of optical trapping sites may be spatially separated from each other optical trapping site by a distance of at least about 200 nm, 300 nm, 400 nm, 500 nm, 600 nm, 700 nm, 800 nm, 900 nm, 1 μm, 2 μm, 3 μm, 4 μm, 5 μm, 6 μm, 7 μm, 8 μm, 9 μm, 10 μm, or more. Each optical trapping site may be spatially separated from each other optical trapping site by a distance of at most about 10 μm, 9 μm, 8 μm, 7 μm, 6 μm, 5 μm, 4 μm, 3 μm, 2 μm, 1 μm, 900 nm, 800 nm, 700 nm, 600 nm, 500 nm, 400 nm, 300 nm, 200 nm, or less. Each optical trapping site maybe spatially separated from each other optical trapping site by a distance that is within a range defined by any two of the preceding values.

The optical trapping sites may comprise one or more optical tweezers. Optical tweezers may comprise one or more focused laser beams to provide an attractive or repulsive force to hold or move the one or more atoms. The beam waist of the focused laser beams may comprise a strong electric field gradient. The atoms may be attracted or repelled along the electric field gradient to the center of the laser beam, which may contain the strongest electric field. The optical trapping sites may comprise one or more optical lattice sites of one or more optical lattices. The optical trapping sites may comprise one or more optical lattice sites of one or more one-dimensional (1D) optical lattices, two-dimensional (2D) optical lattices, or three-dimensional (3D) optical lattices. For instance, the optical trapping sites may comprise one or more optical lattice sites of a 2D optical lattice, as depicted in FIG. 3B.

The optical lattices may be generated by interfering counter-propagating light (such as counter-propagating laser light) to generate a standing wave pattern having a periodic succession of intensity minima and maxima along a particular direction. A 1D optical lattice may be generated by interfering a single pair of counter-propagating light beams. A 2D optical lattice may be generated by interfering two pairs of counter-propagating light beams. A 3D optical lattice may be generated by interfering three pairs of counter-propagating lights beams. The light beams may be generated by different light sources or by the same light source. Therefore, an optical lattice may be generated by at least about 1, 2, 3, 4, 5, 6, or more light sources or at most about 6, 5, 4, 3, 2, or 1 light sources.

Returning to the description of FIG. 3A, the optical trapping unit may comprise one or more light sources configured to emit light to generate the plurality of optical trapping sites as described herein. For instance, the optical trapping unit may comprise a single light source 213, as depicted in FIG. 3A. Though depicted as comprising a single light source in FIG. 3A, the optical trapping unit may comprise any number of light sources, such as at least about 1, 2, 3, 4, 5, 6, 7, 8, 9, 10, or more light sources or at most about 10, 9, 8, 7, 6, 5, 4, 3, 2, or 1 light sources. The light sources may comprise one or more lasers.

The lasers may comprise one or more continuous wave lasers. The lasers may comprise one or more pulsed lasers. The lasers may comprise one or more gas lasers, such as one or more helium-neon (HeNe) lasers, argon (Ar) lasers, krypton (Kr) lasers, xenon (Xe) ion lasers, nitrogen ($N_2$) lasers, carbon dioxide ($CO_2$) lasers, carbon monoxide (CO) lasers, transversely excited atmospheric (TEA) lasers, or excimer lasers. For instance, the lasers may comprise one or more argon dimer ($Ar_2$) excimer lasers, krypton dimer ($Kr_2$) excimer lasers, fluorine dimer ($F_2$) excimer lasers, xenon dimer ($Xe_2$) excimer lasers, argon fluoride (ArF) excimer lasers, krypton chloride (KrCl) excimer lasers, krypton fluoride (KrF) excimer lasers, xenon bromide (XeBr) excimer lasers, xenon chloride (XeCl) excimer lasers, or xenon fluoride (XeF) excimer lasers. The laser may comprise one or more dye lasers.

The lasers may comprise one or more metal-vapor lasers, such as one or more helium-cadmium (HeCd) metal-vapor lasers, helium-mercury (HeHg) metal-vapor lasers, helium-selenium (HeSe) metal-vapor lasers, helium-silver (HeAg) metal-vapor lasers, strontium (Sr) metal-vapor lasers, neon-copper (NeCu) metal-vapor lasers, copper (Cu) metal-vapor lasers, gold (Au) metal-vapor lasers, manganese (Mn) metal-vapor laser, or manganese chloride ($MnCl_2$) metal-vapor lasers.

The lasers may comprise one or more solid-state lasers, such as one or more ruby lasers, metal-doped crystal lasers, or metal-doped fiber lasers. For instance, the lasers may comprise one or more neodymium-doped yttrium aluminum garnet (Nd:YAG) lasers, neodymium/chromium doped yttrium aluminum garnet (Nd/Cr:YAG) lasers, erbium-doped yttrium aluminum garnet (Er:YAG) lasers, neodymium-doped yttrium lithium fluoride (Nd:YLF) lasers, neodymium-doped yttrium orthovanadate ($ND:YVO_4$) lasers, neodymium-doped yttrium calcium oxoborate (Nd:YCOB) lasers, neodymium glass (Nd:glass) lasers, titanium sapphire (Ti:sapphire) lasers, thulium-doped ytrrium aluminum garnet (Tm:YAG) lasers, ytterbium-doped ytrrium aluminum garnet (Yb:YAG) lasers, ytterbium-doped glass (Yt:glass) lasers, holmium ytrrium aluminum garnet (Ho:YAG) lasers, chromium-doped zinc selenide (Cr:ZnSe) lasers, cerium-doped lithium strontium aluminum fluoride (Ce:LiSAF) lasers, cerium-doped lithium calcium aluminum fluoride (Ce:LiCAF) lasers, erbium-doped glass (Er:glass) lasers, erbium-ytterbium-codoped glass (Er/Yt:glass) lasers, uranium-doped calcium fluoride ($U:CaF_2$) lasers, or samarium-doped calcium fluoride ($Sm:CaF_2$) lasers.

The lasers may comprise one or more semiconductor lasers or diode lasers, such as one or more gallium nitride (GaN) lasers, indium gallium nitride (InGaN) lasers, aluminum gallium indium phosphide (AlGaInP) lasers, aluminum gallium arsenide (AlGaAs) lasers, indium gallium arsenic phosphide (InGaAsP) lasers, vertical cavity surface emitting lasers (VCSELs), or quantum cascade lasers.

The lasers may emit continuous wave laser light. The lasers may emit pulsed laser light. The lasers may have a pulse length of at least about 1 femtoseconds (fs), 2 fs, 3 fs, 4 fs, 5 fs, 6 fs, 7 fs, 8 fs, 9 fs, 10 fs, 20 fs, 30 fs, 40 fs, 50 fs, 60 fs, 70 fs, 80 fs, 90 fs, 100 fs, 200 fs, 300 fs, 400 fs, 500 fs, 600 fs, 700 fs, 800 fs, 900 fs, 1 picosecond (ps), 2 ps, 3 ps, 4 ps, 5 ps, 6 ps, 7 ps, 8 ps, 9 ps, 10 ps, 20 ps, 30 ps, 40 ps, 50 ps, 60 ps, 70 ps, 80 ps, 90 ps, 100 ps, 200 ps, 300 ps, 400 ps, 500 ps, 600 ps, 700 ps, 800 ps, 900 ps, 1 nanosecond (ns), 2 ns, 3 ns, 4 ns, 5 ns, 6 ns, 7 ns, 8 ns, 9 ns, 10 ns, 20 ns, 30 ns, 40 ns, 50 ns, 60 ns, 70 ns, 80 ns, 90 ns, 100 ns, 200 ns, 300 ns, 400 ns, 500 ns, 600 ns, 700 ns, 800 ns, 900 ns, 1,000 ns, or more. The lasers may have a pulse length of at most about 1,000 ns, 900 ns, 800 ns, 700 ns, 600 ns, 500 ns, 400 ns, 300 ns, 200 ns, 100 ns, 90 ns, 80 ns, 70 ns, 60 ns, 50 ns, 40 ns, 30 ns, 20 ns, 10 ns, 9 ns, 8 ns, 7 ns, 6 ns, 5 ns, 4 ns, 3 ns, 2 ns, 1 ns, 900 ps, 800 ps, 700 ps, 600 ps, 500 ps, 400 ps, 300 ps, 200 ps, 100 ps, 90 ps, 80 ps, 70 ps, 60 ps, 50 ps, 40 ps, 30 ps, 20 ps, 10 ps, 9 ps, 8 ps, 7 ps, 6 ps, 5 ps, 4 ps, 3 ps, 2 ps, 1 ps, 900 fs, 800 fs, 700 fs, 600 fs, 500 fs, 400 fs, 300 fs, 200 fs, 100 fs, 90 fs, 80 fs, 70 fs, 60 fs, 50 fs, 40 fs, 30 fs, 20 fs, 10 fs, 9 fs, 8 fs, 7 fs, 6 fs, 5 fs, 4 fs, 3 fs, 2 fs, 1 fs, or less. The lasers may have a pulse length that is within a range defined by any two of the preceding values.

The lasers may have a repetition rate of at least about 1 hertz (Hz), 2 Hz, 3 Hz, 4 Hz, 5 Hz, 6 Hz, 7 Hz, 8 Hz, 9 Hz, 10 Hz, 20 Hz, 30 Hz, 40 Hz, 50 Hz, 60 Hz, 70 Hz, 80 Hz, 90 Hz, 100 Hz, 200 Hz, 300 Hz, 400 Hz, 500 Hz, 600 Hz, 700 Hz, 800 Hz, 900 Hz, 1 kilohertz (kHz), 2 kHz, 3 kHz, 4 kHz, 5 kHz, 6 kHz, 7 kHz, 8 kHz, 9 kHz, 10 kHz, 20 kHz, 30 kHz, 40 kHz, 50 kHz, 60 kHz, 70 kHz, 80 kHz, 90 kHz, 100 kHz, 200 kHz, 300 kHz, 400 kHz, 500 kHz, 600 kHz, 700 kHz, 800 kHz, 900 kHz, 1 megahertz (MHz), 2 MHz, 3 MHz, 4 MHz, 5 MHz, 6 MHz, 7 MHz, 8 MHz, 9 MHz, 10 MHz, 20 MHz, 30 MHz, 40 MHz, 50 MHz, 60 MHz, 70 MHz, 80 MHz, 90 MHz, 100 MHz, 200 MHz, 300 MHz, 400 MHz, 500 MHz, 600 MHz, 700 MHz, 800 MHz, 900 MHz, 1,000 MHz, or more. The lasers may have a repetition rate of at most about 1,000 MHz, 900 MHz, 800 MHz, 700 MHz, 600 MHz, 500 MHz, 400 MHz, 300 MHz, 200 MHz, 100 MHz, 90 MHz, 80 MHz, 70 MHz, 60 MHz, 50 MHz, 40 MHz, 30 MHz, 20 MHz, 10 MHz, 9 MHz, 8 MHz, 7 MHz, 6 MHz, 5 MHz, 4 MHz, 3 MHz, 2 MHz, 1 MHz, 900 kHz, 800 kHz, 700 kHz, 600 kHz, 500 kHz, 400 kHz, 300 kHz, 200 kHz, 100 kHz, 90 kHz, 80 kHz, 70 kHz, 60 kHz, 50 kHz, 40 kHz, 30 kHz, 20 kHz, 10 kHz, 9 kHz, 8 kHz, 7 kHz, 6 kHz, 5 kHz, 4 kHz, 3 kHz, 2 kHz, 1 kHz, 900 Hz, 800 Hz, 700 Hz, 600 Hz, 500 Hz, 400 Hz, 300 Hz, 200 Hz, 100 Hz, 90 Hz, 80 Hz, 70 Hz, 60 Hz, 50 Hz, 40 Hz, 30 Hz, 20 Hz, 10 Hz, 9 Hz, 8 Hz, 7 Hz, 6 Hz, 5 Hz, 4 Hz, 3 Hz, 2 Hz, 1 Hz, or less. The lasers may have a repetition rate that is within a range defined by any two of the preceding values.

The lasers may emit light having a pulse energy of at least about 1 nanojoule (nJ), 2 nJ, 3 nJ, 4 nJ, 5 nJ, 6 nJ, 7 nJ, 8 nJ, 9 nJ, 10 nJ, 20 nJ, 30 nJ, 40 nJ, 50 nJ, 60 nJ, 70 nJ, 80 nJ, 90 nJ, 100 nJ, 200 nJ, 300 nJ, 400 nJ, 500 nJ, 600 nJ, 700 nJ, 800 nJ, 900 nJ, 1 microjoule (μJ), 2 μJ, 3 μJ, 4 μJ, 5 μJ, 6 μJ, 7 μJ, 8 μJ, 9 μJ, 10 μJ, 20 μJ, 30 μJ, 40 μJ, 50 μJ, 60 μJ, 70 μJ, 80 μJ, 90 μJ, 100 μJ, 200 μJ, 300 μJ, 400 μJ, 500 μJ, 600 μJ, 700 μJ, 800 μJ, 900 μJ, a least 1 millijoule (mJ), 2 mJ, 3 mJ, 4 mJ, 5 mJ, 6 mJ, 7 mJ, 8 mJ, 9 mJ, 10 mJ, 20 mJ, 30 mJ, 40 mJ, 50 mJ, 60 mJ, 70 mJ, 80 mJ, 90 mJ, 100 mJ, 200 mJ, 300 mJ, 400 mJ, 500 mJ, 600 mJ, 700 mJ, 800 mJ, 900 mJ, a least 1 Joule (J), or more. The lasers may emit light having a pulse energy of at most about 1 J, 900 mJ, 800 mJ, 700 mJ, 600 mJ, 500 mJ, 400 mJ, 300 mJ, 200 mJ, 100 mJ, 90 mJ, 80 mJ, 70 mJ, 60 mJ, 50 mJ, 40 mJ, 30 mJ, 20 mJ, 10 mJ, 9 mJ, 8 mJ, 7 mJ, 6 mJ, 5 mJ, 4 mJ, 3 mJ, 2 mJ, 1 mJ, 900 μJ, 800 μJ, 700 μJ, 600 μJ, 500 μJ, 400 μJ, 300 μJ, 200 μJ, 100 μJ, 90 μJ, 80 μJ, 70 μJ, 60 μJ, 50 μJ, 40 μJ, 30 μJ, 20 μJ, 10 μJ, 9 μJ, 8 μJ, 7 μJ, 6 μJ, 5 μJ, 4 μJ, 3 μJ, 2 μJ, 1 μJ, 900 nJ, 800 nJ, 700 nJ, 600 nJ, 500 nJ, 400 nJ, 300 nJ, 200 nJ, 100 nJ, 90 nJ, 80 nJ, 70 nJ, 60 nJ, 50 nJ, 40 nJ, 30 nJ, 20 nJ, 10 nJ, 9 nJ, 8 nJ, 7 nJ, 6 nJ, 5 nJ, 4 nJ, 3 nJ, 2 nJ, 1 nJ, or less. The lasers may emit light having a pulse energy that is within a range defined by any two of the preceding values.

The lasers may emit light having an average power of at least about 1 microwatt (μW), 2 μW, 3 μW, 4 μW, 5 μW, 6 μW, 7 μW, 8 μW, 9 μW, 10 μW, 20 μW, 30 μW, 40 μW, 50 μW, 60 μW, 70 μW, 80 μW, 90 μW, 100 μW, 200 μW, 300 μW, 400 μW, 500 μW, 600 μW, 700 μW, 800 μW, 900 μW, 1 milliwatt (mW), 2 mW, 3 mW, 4 mW, 5 mW, 6 mW, 7 mW, 8 mW, 9 mW, 10 mW, 20 mW, 30 mW, 40 mW, 50 mW, 60 mW, 70 mW, 80 mW, 90 mW, 100 mW, 200 mW, 300 mW, 400 mW, 500 mW, 600 mW, 700 mW, 800 mW, 900 mW, 1 watt (W), 2 W, 3 W, 4 W, 5 W, 6 W, 7 W, 8 W, 9 W, 10 W, 20 W, 30 W, 40 W, 50 W, 60 W, 70 W, 80 W, 90 W, 100 W, 200 W, 300 W, 400 W, 500 W, 600 W, 700 W, 800 W, 900 W, 1,000 W, or more. The lasers may emit light having an average power of at most about 1,000 W, 900 W, 800 W, 700 W, 600 W, 500 W, 400 W, 300 W, 200 W, 100 W, 90 W, 80 W, 70 W, 60 W, 50 W, 40 W, 30 W, 20 W, 10 W, 9 W, 8 W, 7 W, 6 W, 5 W, 4 W, 3 W, 2 W, 1 W, 900 mW, 800 mW, 700 mW, 600 mW, 500 mW, 400 mW, 300 mW, 200 mW, 100 mW, 90 mW, 80 mW, 70 mW, 60 mW, 50 mW, 40 mW, 30 mW, 20 mW, 10 mW, 9 mW, 8 mW, 7 mW, 6 mW, 5 mW, 4 mW, 3 mW, 2 mW, 1 mW, 900 μW, 800 μW, 700 μW, 600 μW, 500 μW, 400 μW, 300 μW, 200 μW, 100 μW, 90 μW, 80 μW, 70 μW, 60 μW, 50 μW, 40 μW, 30 μW, 20 μW, 10 μW, 9 μW, 8 μW, 7 μW, 6 μW, 5 μW, 4 μW, 3 μW, 2 μW, 1 μW, or more. The lasers may emit light having a power that is within a range defined by any two of the preceding values.

The lasers may emit light comprising one or more wavelengths in the ultraviolet (UV), visible, or infrared (IR) portions of the electromagnetic spectrum. The lasers may emit light comprising one or more wavelengths of at least about 200 nm, 210 nm, 220 nm, 230 nm, 240 nm, 250 nm, 260 nm, 270 nm, 280 nm, 290 nm, 300 nm, 310 nm, 320 nm, 330 nm, 340 nm, 350 nm, 360 nm, 370 nm, 380 nm, 390 nm, 400 nm, 410 nm, 420 nm, 430 nm, 440 nm, 450 nm, 460 nm, 470 nm, 480 nm, 490 nm, 500 nm, 510 nm, 520 nm, 530 nm, 540 nm, 550 nm, 560 nm, 570 nm, 580 nm, 590 nm, 600 nm, 610 nm, 620 nm, 630 nm, 640 nm, 650 nm, 660 nm, 670 nm, 680 nm, 690 nm, 700 nm, 710 nm, 720 nm, 730 nm, 740 nm, 750 nm, 760 nm, 770 nm, 780 nm, 790 nm, 800 nm, 810 nm, 820 nm, 830 nm, 840 nm, 850 nm, 860 nm, 870 nm, 880 nm, 890 nm, 900 nm, 910 nm, 920 nm, 930 nm, 940 nm, 950 nm, 960 nm, 970 nm, 980 nm, 990 nm, 1,000 nm, 1,010 nm, 1,020 nm, 1,030 nm, 1,040 nm, 1,050 nm, 1,060 nm, 1,070 nm, 1,080 nm, 1,090 nm, 1,100 nm, 1,110 nm, 1,120 nm, 1,130 nm, 1,140 nm, 1,150 nm, 1,160 nm, 1,170 nm, 1,180 nm, 1,190 nm, 1,200 nm, 1,210 nm, 1,220 nm, 1,230 nm, 1,240 nm, 1,250 nm, 1,260 nm, 1,270 nm, 1,280 nm, 1,290 nm, 1,300 nm, 1,310 nm, 1,320 nm, 1,330 nm, 1,340 nm, 1,350 nm, 1,360 nm, 1,370 nm, 1,380 nm, 1,390 nm, 1,400 nm, or more. The lasers may emit light comprising one or more wavelengths of at most about 1,400 nm, 1,390 nm, 1,380 nm, 1,370 n, 1,360 nm, 1,350 nm, 1,340 nm, 1,330 nm, 1,320 nm, 1,310 nm, 1,300 nm, 1,290 nm, 1,280 nm, 1,270 n, 1,260 nm, 1,250 nm, 1,240 nm, 1,230 nm, 1,220 nm, 1,210 nm, 1,200 nm, 1,190 nm, 1,180 nm, 1,170 n, 1,160 nm, 1,150 nm, 1,140 nm, 1,130 nm, 1,120 nm, 1,110 nm, 1,100 nm, 1,090 nm, 1,080 nm, 1,070 n, 1,060 nm, 1,050 nm, 1,040 nm, 1,030 nm, 1,020 nm, 1,010 nm, 1,000 nm, 990 nm, 980 nm, 970 nm, 960 nm, 950 nm, 940 nm, 930 nm, 920 nm, 910 nm, 900 nm, 890 nm, 880 nm, 870 nm, 860 nm, 850 nm, 840 nm, 830 nm, 820 nm, 810 nm, 800 nm, 790 nm, 780 nm, 770 nm, 760 nm, 750 nm, 740 nm, 730 nm, 720 nm, 710 nm, 700 nm, 690 nm, 680 nm, 670 nm, 660 nm, 650 nm, 640 nm, 630 nm, 620 nm, 610 nm, 600 nm, 590 nm, 580 nm, 570 nm, 560 nm, 550 nm, 540 nm, 530 nm, 520 nm, 510 nm, 500 nm, 490 nm, 480 nm, 470 nm, 460 nm, 450 nm, 440 nm, 430 nm, 420 nm, 410 nm, 400 nm, 390 nm, 380 nm, 370 nm, 360 nm, 350 nm, 340 nm, 330 nm, 320 nm, 310 nm, 300 nm, 290 nm, 280 nm, 270 nm, 260 nm, 250 nm, 240 nm, 230 nm, 220 nm, 210 nm, 200 nm. The lasers may emit light comprising one or more wavelengths that are within a range defined by any two of the preceding values.

The lasers may emit light having a bandwidth of at least about $1\times10^{-15}$ nm, $2\times10^{-15}$ nm, $3\times10^{-15}$ nm, $4\times10^{-15}$ nm, $5\times10^{-15}$ nm, $6\times10^{-15}$ nm, $7\times10^{-15}$ nm, $8\times10^{-15}$ nm, $9\times10^{-15}$ nm, $1\times10^{-14}$ nm, $2\times10^{-14}$ nm, $3\times10^{-14}$ nm, $4\times10^{-14}$ nm, $5\times10^{-14}$ nm, $6\times10^{-14}$ nm, $7\times10^{-14}$ nm, $8\times10^{-14}$ nm, $9\times10^{-14}$ nm, $1\times10^{-13}$ nm, $2\times10^{-13}$ nm, $3\times10^{-13}$ nm, $4\times10^{-13}$ nm, $5\times10^{-13}$ nm, $6\times10^{-13}$ nm, $7\times10^{-13}$ nm, $8\times10^{-13}$ nm, $9\times10^{-13}$ nm, $1\times10^{-12}$ nm, $2\times10^{-12}$ nm, $3\times10^{-12}$ nm, $4\times10^{-12}$ nm, $5\times10^{-12}$ nm, $6\times10^{-12}$ nm, $7\times10^{-12}$ nm, $8\times10^{-12}$ nm, $9\times10^{-12}$ nm, $1\times10^{-11}$ nm, $2\times10^{-11}$ nm, $3\times10^{-11}$ nm, $4\times10^{-11}$ nm, $5\times10^{-11}$ nm, $6\times10^{-11}$ nm, $7\times10^{-11}$ nm, $8\times10^{-11}$ nm, $9\times10^{-11}$ nm, $1\times10^{-10}$ nm, $2\times10^{-10}$ nm, $3\times10^{-10}$ nm, $4\times10^{-10}$ nm, $5\times10^{-10}$ nm, $6\times10^{-10}$ nm, $7\times10^{-10}$ nm, $8\times10^{-10}$ nm, $9\times10^{-10}$ nm, $1\times10^{-9}$ nm, $2\times10^{-9}$ nm, $3\times10^{-9}$ nm, $4\times10^{-9}$ nm, $5\times10^{-9}$ nm, $6\times10^{-9}$ nm, $7\times10^{-9}$ nm, $8\times10^{-9}$ nm, $9\times10^{-9}$ nm, $1\times10^{-8}$ nm, $2\times10^{-8}$ nm, $3\times10^{-8}$ nm, $4\times10^{-8}$ nm, $5\times10^{-8}$ nm, $6\times10^{-8}$ nm, $7\times10^{-8}$ nm, $8\times10^{-8}$ nm, $9\times10^{-8}$ nm, $1\times10^{-7}$ nm, $2\times10^{-7}$ nm, $3\times10^{-7}$ nm, $4\times10^{-7}$ nm, $5\times10^{-7}$ nm, $6\times10^{-7}$ nm, $7\times10^{-7}$ nm, $8\times10^{-7}$ nm, $9\times10^{-7}$ nm, $1\times10^{-6}$ nm, $2\times10^{-6}$ nm, $3\times10^{-6}$ nm, $4\times10^{-6}$ nm, $5\times10^{-6}$ nm, $6\times10^{-6}$ nm, $7\times10^{-6}$ nm, $8\times10^{-6}$ nm, $9\times10^{-6}$ nm, $1\times10^{-5}$ nm, $2\times10^{-5}$ nm, $3\times10^{-5}$ nm, $4\times10^{-5}$ nm, $5\times10^{-5}$ nm, $6\times10^{-5}$ nm, $7\times10^{-5}$ nm, $8\times10^{-5}$ nm, $9\times10^{-5}$ nm, $1\times10^{-4}$ nm, $2\times10^{-4}$ nm, $3\times10^{-4}$ nm, $4\times10^{-4}$ nm, $5\times10^{-4}$ nm, $6\times10^{-4}$ nm, $7\times10^{-4}$ nm, $8\times10^{-4}$ nm, $9\times10^{-4}$ nm, $1\times10^{-3}$ nm, or more. The lasers may emit light having a bandwidth of at most about $1\times10^{-3}$ nm, $9\times10^{-4}$ nm, $8\times10^{-4}$ nm, $7\times10^{-4}$ nm, $6\times10^{-4}$ nm, $5\times10^{-4}$ nm, $4\times10^{-4}$ nm, $3\times10^{-4}$ nm, $2\times10^{-4}$ nm, $1\times10^{-4}$ nm, $9\times10^{-5}$ nm, $8\times10^{-5}$ nm, $7\times10^{-5}$ nm, $6\times10^{-5}$ nm, $5\times10^{-5}$ nm, $4\times10^{-5}$ nm, $3\times10^{-5}$ nm, $2\times10^{-5}$ nm, $1\times10^{-5}$ nm, $9\times10^{-6}$ nm, $8\times10^{-6}$ nm, $7\times10^{-6}$ nm, $6\times10^{-6}$ nm, $5\times10^{-6}$ nm, $4\times10^{-6}$ nm, $3\times10^{-6}$ nm, $2\times10^{-6}$ nm, $1\times10^{-6}$ nm, $9\times10^{-7}$ nm, $8\times10^{-7}$ nm, $7\times10^{-7}$ nm, $6\times10^{-7}$ nm, $5\times10^{-7}$ nm, $4\times10^{-7}$ nm, $3\times10^{-7}$ nm, $2\times10^{-7}$ nm, $1\times10^{-7}$ nm, $9\times10^{-8}$ nm, $8\times10^{-8}$ nm, $7\times10^{-8}$ nm, $6\times10^{-8}$ nm, $5\times10^{-8}$ nm, $4\times10^{-8}$ nm, $3\times10^{-8}$ nm, $2\times10^{-8}$ nm, $1\times10^{-8}$ nm, $9\times10^{-9}$ nm, $8\times10^{-9}$ nm, $7\times10^{-9}$ nm, $6\times10^{-9}$ nm, $5\times10^{-9}$ nm, $4\times10^{-9}$ nm, $3\times10^{-9}$ nm, $2\times10^{-9}$ nm, $1\times10^{-9}$ nm, $9\times10^{-10}$ nm, $8\times10^{-10}$ nm, $7\times10^{-10}$ nm, $6\times10^{-10}$ nm, $5\times10^{-10}$ nm, $4\times10^{-10}$ nm, $3\times10^{-10}$ nm, $2\times10^{-10}$ nm, $1\times10^{-10}$ nm, $9\times10^{-11}$ nm, $8\times10^{-11}$ nm, $7\times10^{-11}$ nm, $6\times10^{-11}$ nm, $5\times10^{-11}$ nm, $4\times10^{-11}$ nm, $3\times10^{-11}$ nm, $2\times10^{-11}$ nm, $1\times10^{-11}$ nm, $9\times10^{-12}$ nm, $8\times10^{-12}$ nm, $7\times10^{-12}$ nm, $6\times10^{-12}$ nm, $5\times10^{-12}$ nm, $4\times10^{-12}$ nm, $3\times10^{-12}$ nm, $2\times10^{-12}$ nm, $1\times10^{-12}$ nm, $9\times10^{-13}$ nm, $8\times10^{-13}$ nm, $7\times10^{-13}$ nm, $6\times10^{-13}$ nm, $5\times10^{-13}$ nm, $4\times10^{-13}$ nm, $3\times10^{-13}$ nm, $2\times10^{-13}$ nm, $1\times10^{-13}$ nm, $9\times10^{-14}$ nm, $8\times10^{-14}$ nm, $7\times10^{-14}$ nm, $6\times10^{-14}$ nm, $5\times10^{-14}$ nm, $4\times10^{-14}$ nm, $3\times10^{-14}$ nm, $2\times10^{-14}$ nm, $1\times10^{-14}$ nm, $9\times10^{-15}$ nm, $8\times10^{-15}$ nm, $7\times10^{-15}$ nm, $6\times10^{-15}$ nm, $5\times10^{-15}$ nm, $4\times10^{-15}$ nm, $3\times10^{-15}$ nm, $2\times10^{-15}$ nm, $1\times10^{-15}$ nm, or less. The lasers may emit light having a bandwidth that is within a range defined by any two of the preceding values.

The light sources may be configured to emit light tuned to one or more magic wavelengths corresponding to the plurality of atoms. A magic wavelength corresponding to an atom may comprise any wavelength of light that gives rise to equal or nearly equal polarizabilities of the first and second atomic states. The magic wavelengths for a transition between the first and second atomic states may be determined by calculating the wavelength-dependent polarizabilities of the first and second atomic states and finding crossing points. Light tuned to such a magic wavelength may give rise to equal or nearly equal differential light shifts in the first and second atomic states, regardless of the intensity of the light emitted by the light sources. This may effectively decouple the first and second atomic states from motion of the atoms. The magic wavelengths may utilize one or more scalar or tensor light shifts. The scalar or tensor light shifts may depend on magnetic sublevels within the first and second atomic states.

For instance, Group II atoms and metastable states of alkaline earth or alkaline earth-like atoms may possess relatively large tensor shifts whose angle relative to an applied magnetic field may be tuned to cause a situation in which scalar and tensor shifts balance and give a zero or near zero differential light shift between the first and second atomic states. The angle $\theta$ may be tuned by selecting the polarization of the emitted light. For instance, when the emitted light is linearly polarized, the total polarizability $\alpha$ may be written as a sum of the scalar component $\alpha_{scalar}$ and the tensor component $\alpha_{tensor}$:

$$\alpha = \alpha_{scalar} + (3\cos^2\theta - 1)\alpha_{tensor}$$

By choosing $\theta$ appropriately, the polarizability of the first and second atomic states may be chosen to be equal or nearly equal, corresponding to a zero or near zero differential light shift, and the motion of the atoms may be decoupled.

The light sources may be configured to direct light to one or more optical modulators (OMs) configured to generate the plurality of optical trapping sites. For instance, the optical trapping unit may comprise an OM 214 configured to generate the plurality of optical trapping sites. Although depicted as comprising one OM in FIG. 3A, the optical trapping unit may comprise any number of OMs, such as at least about 1, 2, 3, 4, 5, 6, 7, 8, 9, 10, or more OMs or at most about 10, 9, 8, 7, 6, 5, 4, 3, 2, or 1 OMs. The OMs may comprise one or more digital micromirror devices (DMDs). The OMs may comprise one or more liquid crystal devices, such as one or more liquid crystal on silicon (LCoS) devices. The OMs may comprise one or more spatial light modulators (SLMs). The OMs may comprise one or more acousto-optic deflectors (AODs) or acousto-optic modulators (AOMs). The OMs may comprise one or more electro-optic deflectors (EODs) or electro-optic modulators (EOMs).

The OM may be optically coupled to one or more optical element to generate a regular array of optical trapping sites. For instance, the OM may be optically coupled to optical element 219, as shown in FIG. 3A. The optical elements may comprise lenses or microscope objectives configured to re-direct light from the OMs to form a regular rectangular grid of optical trapping sites.

For instance, as shown in FIG. 3A, the OM may comprise an SLM, DMD, or LCoS device. The SLM, DMD, or LCoS device may be imaged onto the back focal plane of the microscope objectives. This may allow for the generation of an arbitrary configuration of optical trapping sites in two or three dimensions.

Alternatively or in combination, the OMs may comprise first and second AODs. The active regions of the first and second AODs may be imaged onto the back focal plane of the microscope objectives. The output of the first AOD may be optically coupled to the input of the second AOD. In this manner, the second AOD may make a copy of the optical output of the first AOD. This may allow for the generation of optical trapping sites in two or three dimensions.

Alternatively or in combination, the OMs may comprise static optical elements, such as one or more microlens arrays or holographic optical elements. The static optical elements may be imaged onto the back focal plane of the microscope objectives. This may allow for the generation of an arbitrary configuration of optical trapping sites in two or three dimensions.

The optical trapping unit may comprise one or more imaging units configured to obtain one or more images of a spatial configuration of the plurality of atoms trapped within the optical trapping sites. For instance, the optical trapping unit may comprise imaging unit 215. Although depicted as comprising a single imaging unit in FIG. 3A, the optical trapping unit may comprise any number of imaging units, such as at least about 1, 2, 3, 4, 5, 6, 7, 8, 9, 10, or more imaging units or at most about 10, 9, 8, 7, 6, 5, 4, 3, 2, or 1 imaging units. The imaging units may comprise one or more lens or objectives. The imaging units may comprise one or more PMTs, photodiodes, avalanche photodiodes, phototransistors, reverse-biased LEDs, CCDs, or CMOS cameras. The imaging unit may comprise one or more fluorescence detectors. The images may comprise one or more fluorescence images, single-atom fluorescence images, absorption images, single-atom absorption images, phase contrast images, or single-atom phase contrast images.

The optical trapping unit may comprise one or more spatial configuration artificial intelligence (AI) units configured to perform one or more AI operations to determine the spatial configuration of the plurality of atoms trapped within the optical trapping sites based on the images obtained by the imaging unit. For instance, the optical trapping unit may comprise spatial configuration AI unit 216. Although depicted as comprising a single spatial configuration AI unit in FIG. 3A, the optical trapping unit may comprise any number of spatial configuration AI units, such as at least about 1, 2, 3, 4, 5, 6, 7, 8, 9, 10, or more spatial configuration AI units or at most about 10, 9, 8, 7, 6, 5, 4, 3, 2, or 1 spatial configuration AI units. The AI operations may comprise any machine learning (ML) or reinforcement learning (RL) operations described herein.

The optical trapping unit may comprise one or more atom rearrangement units configured to impart an altered spatial arrangement of the plurality of atoms trapped with the optical trapping sites based on the one or more images obtained by the imaging unit. For instance, the optical trapping unit may comprise atom rearrangement unit 217. Although depicted as comprising a single atom rearrangement unit in FIG. 3A, the optical trapping unit may comprise any number of atom rearrangement units, such as at least about 1, 2, 3, 4, 5, 6, 7, 8, 9, 10, or more atom rearrangement units or at most about 10, 9, 8, 7, 6, 5, 4, 3, 2, or 1 atom rearrangement units.

The optical trapping unit may comprise one or more spatial arrangement artificial intelligence (AI) units configured to perform one or more AI operations to determine the altered spatial arrangement of the plurality of atoms trapped within the optical trapping sites based on the images obtained by the imaging unit. For instance, the optical trapping unit may comprise spatial arrangement AI unit 218. Although depicted as comprising a single spatial arrangement AI unit in FIG. 3A, the optical trapping unit may comprise any number of spatial arrangement AI units, such as at least about 1, 2, 3, 4, 5, 6, 7, 8, 9, 10, or more spatial arrangement AI units or at most about 10, 9, 8, 7, 6, 5, 4, 3, 2, or 1 spatial arrangement AI units. The AI operations may comprise any machine learning (ML) or reinforcement learning (RL) operations described herein.

In some cases, the spatial configuration AI units and the spatial arrangement AI units may be integrated into an integrated AI unit. The optical trapping unit may comprise any number of integrated AI units, such as at least about 1, 2, 3, 4, 5, 6, 7, 8, 9, 10, or more integrated AI units, or at most about 10, 9, 8, 7, 6, 5, 4, 3, 2, or 1 integrated AI units.

The atom rearrangement unit may be configured to alter the spatial arrangement in order to obtain an increase in a filling factor of the plurality of optical trapping sites. A filling factor may be defined as a ratio of the number of optical trapping sites occupied by one or more atoms to the total number of optical trapping sites available in the optical trapping unit or in a region of the optical trapping unit. For instance, initial loading of atoms within the optical trapping sites may give rise to a filling factor of less than 100%, 90%, 80%, 70%, 60%, 50%, or less, such that atoms occupy fewer than 100%, 90%, 70%, 60%, 50%, or less of the available optical trapping sites, respectively. It may be desirable to rearrange the atoms to achieve a filling factor of at least about 50%, 60%, 70%, 80%, 90%, or 100%. By analyzing the imaging information obtained by the imaging unit, the atom rearrangement unit may attain a filling factor of at least about 50%, 60%, 70%, 80%, 90%, 91%, 92%, 93%, 94%, 95%, 96%, 97%, 98%, 99%, 99.1%, 99.2%, 99.3%, 99.4%, 99.5%, 99.6%, 99.7%, 99.8%, 99.9%, 99.91%, 99.92%, 99.93%, 99.94%, 99.95%, 99.96%, 99.97%, 99.98%, 99.99%, or more. The atom rearrangement unit may attain a filling factor of at most about 99.99%, 99.98%, 99.97%, 99.96%, 99.95%, 99.94%, 99.93%, 99.92%, 99.91%, 99.9%, 99.8%, 99.7%, 99.6%, 99.5%, 99.4%, 99.3%, 99.2%, 99.1%, 99%, 98%, 97%, 96%, 95%, 94%, 93%, 92%, 91%, 90%, 80%, 70%, 60%, 50%, or less. The atom rearrangement unit may attain a filling factor that is within a range defined by any two of the preceding values.

Figure 3C:
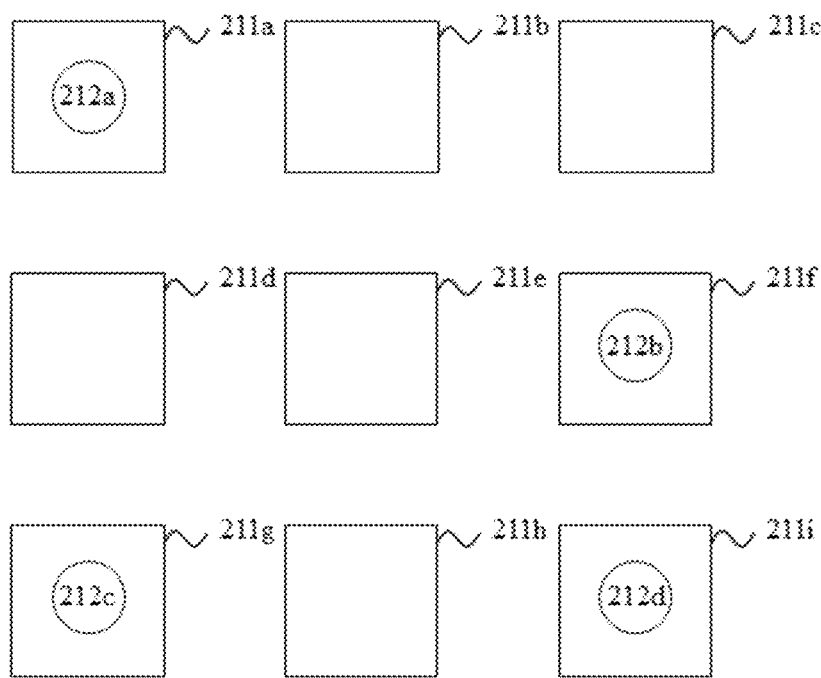
FIG. 3C shows an example of an optical trapping unit that is partially filled with atoms.

By way of example, FIG. 3C shows an example of an optical trapping unit that is partially filled with atoms. As depicted in FIG. 3C, initial loading of atoms within the optical trapping sites may give rise to a filling factor of 44.4% (4 atoms filling 9 available optical trapping sites). By moving atoms from different regions of the optical trapping unit (not shown in FIG. 3C) to unoccupied optical trapping sites or by moving atoms from an atom reservoir described herein, a much higher filling factor may be obtained, as shown in FIG. 3D.

Figure 3D:
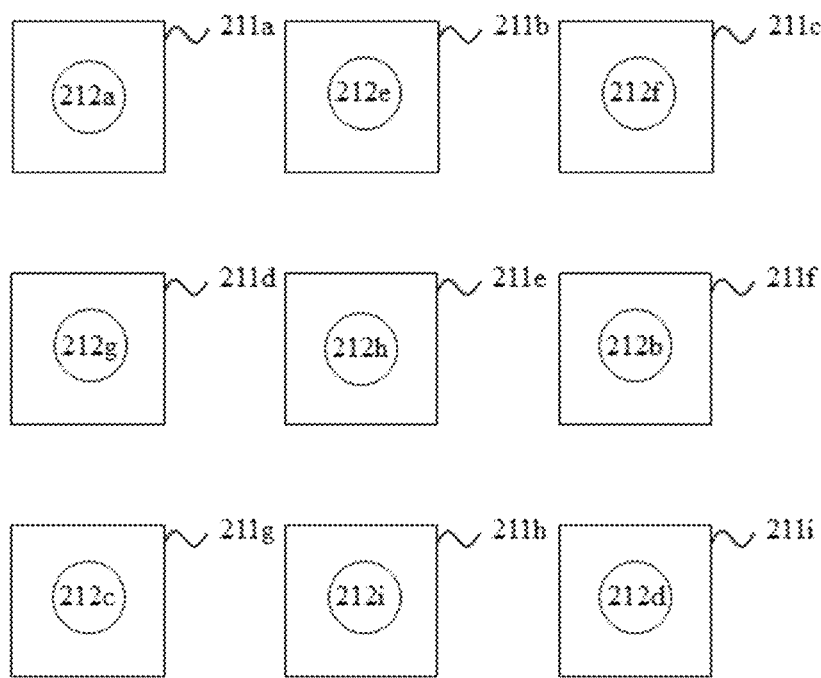
FIG. 3D shows an example of an optical trapping unit that is completely filled with atoms.

FIG. 3D shows an example of an optical trapping unit that is completely filled with atoms. As depicted in FIG. 3D, fifth atom 212e, sixth atom 212f, seventh atom 212g, eighth atom 212h, and ninth atom 212i may be moved to fill unoccupied optical trapping sites. The fifth, sixth, seventh, eighth, and ninth atoms may be moved from different regions of the optical trapping unit (not shown in FIG. 3C) or by moving atoms from an atom reservoir described herein. Thus, the filling factor may be substantially improved following rearrangement of atoms within the optical trapping sites. For instance, a filling factor of up to 100% (such 9 atoms filling 9 available optical trapping sites, as shown in FIG. 3D) may be attained.

Electromagnetic Delivery Units

FIG. 4 shows an example of an electromagnetic delivery unit 220. The electromagnetic delivery unit may be configured to apply electromagnetic energy to one or more atoms of the plurality of atoms, as described herein. The electromagnetic delivery unit may comprise one or more light sources, such as any light source described herein. The electromagnetic energy may comprise optical energy. The optical energy may comprise any repetition rate, pulse energy, average power, wavelength, or bandwidth described herein.

The electromagnetic delivery unit may comprise one or more microwave or radio-frequency (RF) energy sources, such as one or more magnetrons, klystrons, traveling-wave tubes, gyrotrons, field-effect transistors (FETs), tunnel diodes, Gunn diodes, impact ionization avalanche transit-time (IMPATT) diodes, or masers. The electromagnetic energy may comprise microwave energy or RF energy. The RF energy may comprise one or more wavelengths of at least about 1 millimeter (mm), 2 mm, 3 mm, 4 mm, 5 mm, 6 mm, 7 mm, 8 mm, 9 mm, 10 mm, 20 mm, 30 mm, 40 mm, 50 mm, 60 mm, 70 mm, 80 mm, 90 mm, 100 mm, 200 mm, 300 mm, 400 mm, 500 mm, 600 mm, 700 mm, 800 mm, 900 mm, 1 meter (m), 2 m, 3 m, 4 m, 5 m, 6 m, 7 m, 8 m, 9 m, 10 m, 20 m, 30 m, 40 m, 50 m, 60 m, 70 m, 80 m, 90 m, 100 m, 200 m, 300 m, 400 m, 500 m, 600 m, 700 m, 800 m, 900 m, 1 kilometer (km), 2 km, 3 km, 4 km, 5 km, 6 km, 7 km, 8 km, 9 km, 10 km, or more. The RF energy may comprise one or more wavelengths of at most about 10 km, 9 km, 8 km, 7 km, 6 km, 5 km, 4 km, 3 km, 2 km, 1 km, 900 m, 800 m, 700 m, 600 m, 500 m, 400 m, 300 m, 200 m, 100 m, 90 m, 80 m, 70 m, 60 m, 50 m, 40 m, 30 m, 20 m, 10 m, 9 m, 8 m, 7 m, 6 m, 5 m, 4 m, 3 m, 2 m, 1 m, 900 mm, 800 mm, 700 mm, 600 mm, 500 mm, 400 mm, 300 mm, 200 mm, 100 mm, 90 mm, 80 mm, 70 mm, 60 mm, 50 mm, 40 mm, 30 mm, 20 mm, 10 mm, 9 mm, 8 mm, 7 mm, 6 mm, 5 mm, 4 mm, 3 mm, 2 mm, 1 mm, or less. The RF energy may comprise one or more wavelengths that are within a range defined by any two of the preceding values.

The RF energy may comprise an average power of at least about 1 microwatt ($\mu W$), 2 $\mu W$, 3 $\mu W$, 4 $\mu W$, 5 $\mu W$, 6 $\mu W$, 7 $\mu W$, 8 $\mu W$, 9 $\mu W$, 10 $\mu W$, 20 $\mu W$, 30 $\mu W$, 40 $\mu W$, 50 $\mu W$, 60 $\mu W$, 70 $\mu W$, 80 $\mu W$, 90 $\mu W$, 100 $\mu W$, 200 $\mu W$, 300 $\mu W$, 400 $\mu W$, 500 $\mu W$, 600 $\mu W$, 700 $\mu W$, 800 $\mu W$, 900 $\mu W$, 1 milliwatt (mW), 2 mW, 3 mW, 4 mW, 5 mW, 6 mW, 7 mW, 8 mW, 9 mW, 10 mW, 20 mW, 30 mW, 40 mW, 50 mW, 60 mW, 70 mW, 80 mW, 90 mW, 100 mW, 200 mW, 300 mW, 400 mW, 500 mW, 600 mW, 700 mW, 800 mW, 900 mW, 1 Watt (W), 2 W, 3 W, 4 W, 5 W, 6 W, 7 W, 8 W, 9 W, 10 W, 20 W, 30 W, 40 W, 50 W, 60 W, 70 W, 80 W, 90 W, 100 W, 200 W, 300 W, 400 W, 500 W, 600 W, 700 W, 800 W, 900 W, 1,000 W, or more. The RF energy may comprise an average power of at most about 1,000 W, 900 W, 800 W, 700 W, 600 W, 500 W, 400 W, 300 W, 200 W, 100 W, 90 W, 80 W, 70 W, 60 W, 50 W, 40 W, 30 W, 20 W, 10 W, 9 W, 8 W, 7 W, 6 W, 5 W, 4 W, 3 W, 2 W, 1 W, 900 mW, 800 mW, 700 mW, 600 mW, 500 mW, 400 mW, 300 mW, 200 mW, 100 mW, 90 mW, 80 mW, 70 mW, 60 mW, 50 mW, 40 mW, 30 mW, 20 mW, 10 mW, 9 mW, 8 mW, 7 mW, 6 mW, 5 mW, 4 mW, 3 mW, 2 mW, 1 mW, 900 $\mu W$, 800 $\mu W$, 700 $\mu W$, 600 $\mu W$, 500 $\mu W$, 400 $\mu W$, 300 $\mu W$, 200 $\mu W$, 100 $\mu W$, 90 $\mu W$, 80 $\mu W$, 70 $\mu W$, 60 $\mu W$, 50 $\mu W$, 40 $\mu W$, 30 $\mu W$, 20 $\mu W$, 10 $\mu W$, 9 $\mu W$, 8 $\mu W$, 7 $\mu W$, 6 $\mu W$, 5 $\mu W$, 4 $\mu W$, 3 $\mu W$, 2 $\mu W$, 1 $\mu W$, or less. The RF energy may comprise an average power that is within a range defined by any two of the preceding values.

The electromagnetic delivery unit may comprise one or more light sources, such as any light source described herein. For instance, the electromagnetic delivery unit may comprise light source 221. Although depicted as comprising a single light source in FIG. 4, the electromagnetic delivery unit may comprise any number of light sources, such as at least about 1, 2, 3, 4, 5, 6, 7, 8, 9, 10, or more light sources or at most about 10, 9, 8, 7, 6, 5, 4, 3, 2, or 1 light sources.

The light sources may be configured to direct light to one or more OMs configured to selectively apply the electromagnetic energy to one or more atoms of the plurality of atoms. For instance, the electromagnetic delivery unit may comprise OM 222. Although depicted as comprising a single OM in FIG. 4, the electromagnetic delivery unit may comprise any number of OMs, such as at least about 1, 2, 3, 4, 5, 6, 7, 8, 9, 10, or more OMs or at most about 10, 9, 8, 7, 6, 5, 4, 3, 2, or 1 OMs. The OMs may comprise one or more SLMs, AODs, or AOMs. The OMs may comprise one or more DMDs. The OMs may comprise one or more liquid crystal devices, such as one or more LCoS devices.

The electromagnetic delivery unit may comprise one or more electromagnetic energy artificial intelligence (AI) units configured to perform one or more AI operations to selectively apply the electromagnetic energy to the atoms. For instance, the electromagnetic delivery unit may comprise AI unit 223. Although depicted as comprising a single AI unit in FIG. 4, the electromagnetic delivery unit may comprise any number of AI units, such as at least about 1, 2, 3, 4, 5, 6, 7, 8, 9, 10, or more AI units or at most about 10, 9, 8, 7, 6, 5, 4, 3, 2, or 1 AI units. The AI operations may comprise any machine learning (ML) or reinforcement learning (RL) operations described herein.

The electromagnetic delivery unit may be configured to apply one or more single-qubit operations (such as one or more single-qubit gate operations) on the qubits described herein. The electromagnetic delivery unit may be configured to apply one or more two-qubit operations (such as one or more two-qubit gate operations) on the two-qubit units described herein. Each single-qubit or two-qubit operation may comprise a duration of at least about 10 nanoseconds (ns), 20 ns, 30 ns, 40 ns, 50 ns, 60 ns, 70 ns, 80 ns, 90 ns, 100 ns, 200 ns, 300 ns, 400 ns, 500 ns, 600 ns, 700 ns, 800 ns, 900 ns, 1 microsecond (µs), 2 µs, 3 µs, 4 µs, 5 µs, 6 µs, 7 µs, 8 µs, 9 µs, 10 µs, 20 µs, 30 µs, 40 µs, 50 µs, 60 µs, 70 µs, 80 µs, 90 µs, 100 µs, or more. Each single-qubit or two-qubit operation may comprise a duration of at most about 100 µs, 90 µs, 80 µs, 70 µs, 60 µs, 50 µs, 40 µs, 30 µs, 20 µs, 10 µs, 9 µs, 8 µs, 7 µs, 6 µs, 5 µs, 4 µs, 3 µs, 2 µs, 1 µs, 900 ns, 800 ns, 700 ns, 600 ns, 500 ns, 400 ns, 300 ns, 200 ns, 100 ns, 90 ns, 80 ns, 70 ns, 60 ns, 50 ns, 40 ns, 30 ns, 20 ns, 10 ns, or less. Each single-qubit or two-qubit operation may comprise a duration that is within a range defined by any two of the preceding values. The single-qubit or two-qubit operations may be applied with a repetition frequency of at least 1 kilohertz (kHz), 2 kHz, 3 kHz, 4 kHz, 5 kHz, 6 kHz, 7 kHz, 8 kHz, 9 kHz, 10 kHz, 20 kHz, 30 kHz, 40 kHz, 50 kHz, 60 kHz, 70 kHz, 80 kHz, 90 kHz, 100 kHz, 200 kHz, 300 kHz, 400 kHz, 500 kHz, 600 kHz, 700 kHz, 800 kHz, 900 kHz, 1,000 kHz, or more. The single-qubit or two-qubit operations may be applied with a repetition frequency of at most 1,000 kHz, 900 kHz, 800 kHz, 700 kHz, 600 kHz, 500 kHz, 400 kHz, 300 kHz, 200 kHz, 100 kHz, 90 kHz, 80 kHz, 70 kHz, 60 kHz, 50 kHz, 40 kHz, 30 kHz, 20 kHz, 10 kHz, 9 kHz, 8 kHz, 7 kHz, 6 kHz, 5 kHz, 4 kHz, 3 kHz, 2 kHz, 1 kHz, or less. The single-qubit or two-qubit operations may be applied with a repetition frequency that is within a range defined by any two of the preceding values.

The electromagnetic delivery unit may be configured to apply one or more single-qubit operations by inducing one or more Raman transitions between a first qubit state and a second qubit state described herein. The Raman transitions may be detuned from a $^3P_0$ or $^3P_1$ line described herein. For instance, the Raman transitions may be detuned by at least about 1 kHz, 2 kHz, 3 kHz, 4 kHz, 5 kHz, 6 kHz, 7 kHz, 8 kHz, 9 kHz, 10 kHz, 20 kHz, 30 kHz, 40 kHz, 50 kHz, 60 kHz, 70 kHz, 80 kHz, 90 kHz, 100 kHz, 200 kHz, 300 kHz, 400 kHz, 500 kHz, 600 kHz, 700 kHz, 800 kHz, 900 kHz, 1 MHz, 2 MHz, 3 MHz, 4 MHz, 5 MHz, 6 MHz, 7 MHz, 8 MHz, 9 MHz, 10 MHz, 20 MHz, 30 MHz, 40 MHz, 50 MHz, 60 MHz, 70 MHz, 80 MHz, 90 MHz, 100 MHz, 200 MHz, 300 MHz, 400 MHz, 500 MHz, 600 MHz, 700 MHz, 800 MHz, 900 MHz, 1 GHz, or more. The Raman transitions may be detuned by at most about 1 GHz, 900 MHz, 800 MHz, 700 MHz, 600 MHz, 500 MHz, 400 MHz, 300 MHz, 200 MHz, 100 MHz, 90 MHz, 80 MHz, 70 MHz, 60 MHz, 50 MHz, 40 MHz, 30 MHz, 20 MHz, 10 MHz, 9 MHz, 8 MHz, 7 MHz, 6 MHz, 5 MHz, 4 MHz, 3 MHz, 2 MHz, 1 MHz, 900 kHz, 800 kHz, 700 kHz, 600 kHz, 500 kHz, 400 kHz, 300 kHz, 200 kHz, 100 kHz, 90 kHz, 80 kHz, 70 kHz, 60 kHz, 50 kHz, 40 kHz, 30 kHz, 20 kHz, 10 kHz, 9 kHz, 8 kHz, 7 kHz, 6 kHz, 5 kHz, 4 kHz, 3 kHz, 2 kHz, 1 kHz, or less. The Raman transitions may be detuned by a value that is within a range defined by any two of the preceding values.

Raman transitions may be induced on individually selected atoms using one or more spatial light modulators (SLMs) or acousto-optic deflectors (AODs) to impart a deflection angle and/or a frequency shift to a light beam based on an applied radio-frequency (RF) signal. The SLM or AOD may be combined with an optical conditioning system that images the SLM or AOD active region onto the back focal plane of a microscope objective. The microscope objective may perform a spatial Fourier transform on the optical field at the position of the SLM or AOD. As such, angle (which may be proportional to RF frequency) may be converted into position. For example, applying a comb of radio frequencies to an AOD may generate a linear array of spots at a focal plane of the objective, with each spot having a finite extent determined by the characteristics of the optical conditioning system (such as the point spread function of the optical conditioning system).

To perform a Raman transition on a single atom with a single SLM or AOD, a pair of frequencies may be applied to the SLM or AOD simultaneously. The two frequencies of the pair may have a frequency difference that matches or nearly matches the splitting energy between the first and second qubit states. For instance, the frequency difference may differ from the splitting energy by at most about 1 MHz, 900 kHz, 800 kHz, 700 kHz, 600 kHz, 500 kHz, 400 kHz, 300 kHz, 200 kHz, 100 kHz, 90 kHz, 80 kHz, 70 kHz, 60 kHz, 50 kHz, 40 kHz, 30 kHz, 20 kHz, 10 kHz, 9 kHz, 8 kHz, 7 kHz, 6 kHz, 5 kHz, 4 kHz, 3 kHz, 2 kHz, 1 kHz, 900 Hz, 800 Hz, 700 Hz, 600 Hz, 500 Hz, 400 Hz, 300 Hz, 200 Hz, 100 Hz, 90 Hz, 80 Hz, 70 Hz, 60 Hz, 50 Hz, 40 Hz, 30 Hz, 20 Hz, 10 Hz, 9 Hz, 8 Hz, 7 Hz, 6 Hz, 5 Hz, 4 Hz, 3 Hz, 2 Hz, 1 Hz, or less. The frequency difference may differ from the splitting energy by at least about 1 Hz, 2 Hz, 3 Hz, 4 Hz, 5 Hz, 6 Hz, 7 Hz, 8 Hz, 9 Hz, 10 Hz, 20 Hz, 30 Hz, 40 Hz, 50 Hz, 60 Hz, 70 Hz, 80 Hz, 90 Hz, 100 Hz, 200 Hz, 300 Hz, 400 Hz, 500 Hz, 600 Hz, 700 Hz, 800 Hz, 900 Hz, 1 kHz, 2 kHz, 3 kHz, 4 kHz, 5 kHz, 6 kHz, 7 kHz, 8 kHz, 9 kHz, 10 kHz, 20 kHz, 30 kHz, 40 kHz, 50 kHz, 60 kHz, 70 kHz, 80 kHz, 90 kHz, 100 kHz, 200 kHz, 300 kHz, 400 kHz, 500 kHz, 600 kHz, 700 kHz, 800 kHz, 900 kHz, 1 MHz, or more. The frequency difference may differ from the splitting energy by about 0 Hz. The frequency difference may differ from the splitting energy by a value that is within a range defined by any two of the preceding values. The optical system may be configured such that the position spacing corresponding to the frequency difference is not resolved and such that light at both of the two frequencies interacts with a single atom.

Integrated Optical Trapping Units and Electromagnetic Delivery Units

The optical trapping units and electromagnetic delivery units described herein may be integrated into a single optical system. A microscope objective may be used to deliver electromagnetic radiation generated by an electromagnetic delivery unit described herein and to deliver light for trapping atoms generated by an optical trapping unit described herein. Alternatively or in combination, different objectives may be used to deliver electromagnetic radiation generated by an electromagnetic delivery unit and to deliver light from trapping atoms generated by an optical trapping unit.

A single SLM or AOD may allow the implementation of qubit operations (such as any single-qubit or two-qubit operations described herein) on a linear array of atoms. Alternatively or in combination, two separate SLMs or AODs may be configured to each handle light with orthogonal polarizations. The light with orthogonal polarizations may be overlapped before the microscope objective. In such a scheme, each photon used in a two-photon transition described herein may be passed to the objective by a separate SLM or AOD, which may allow for increased polarization control. Qubit operations may be performed on a two-dimensional arrangement of atoms by bringing light from a first SLM or AOD into a second SLM or AOD that is oriented substantially orthogonally to the first SLM or AOD via an optical relay. Alternatively or in combination, qubit operations may be performed on a two-dimensional arrangement of atoms by using a one-dimensional array of SLMs or AODs.

The stability of qubit gate fidelity may be improved by maintaining overlap of light from the various light sources described herein (such as light sources associated with the optical trapping units or electromagnetic delivery units described herein). Such overlap may be maintained by an optical subsystem that measures the direction of light emitted by the various light sources, allowing closed-loop control of the direction of light emission. The optical subsystem may comprise a pickoff mirror located before the microscope objective. The pickoff mirror may be configured to direct a small amount of light to a lens, which may focus a collimated beam and convert angular deviation into position deviation. A position-sensitive optical detector, such as a lateral-effect position sensor or quadrant photodiode, may convert the position deviation into an electronic signal and information about the deviation may be fed into a compensation optic, such as an active mirror.

The stability of qubit gate manipulation may be improved by controlling the intensity of light from the various light sources described herein (such as light sources associated with the optical trapping units or electromagnetic delivery units described herein). Such intensity control may be maintained by an optical subsystem that measures the intensity of light emitted by the various light sources, allowing closed-loop control of the intensity. Each light source may be coupled to an intensity actuator, such as an intensity servo control. The actuator may comprise an acousto-optic modulator (AOM) or electro-optic modulator (EOM). The intensity may be measured using an optical detector, such as a photodiode or any other optical detector described herein. Information about the intensity may be integrated into a feedback loop to stabilize the intensity.

State Preparation Units

Figure 5:
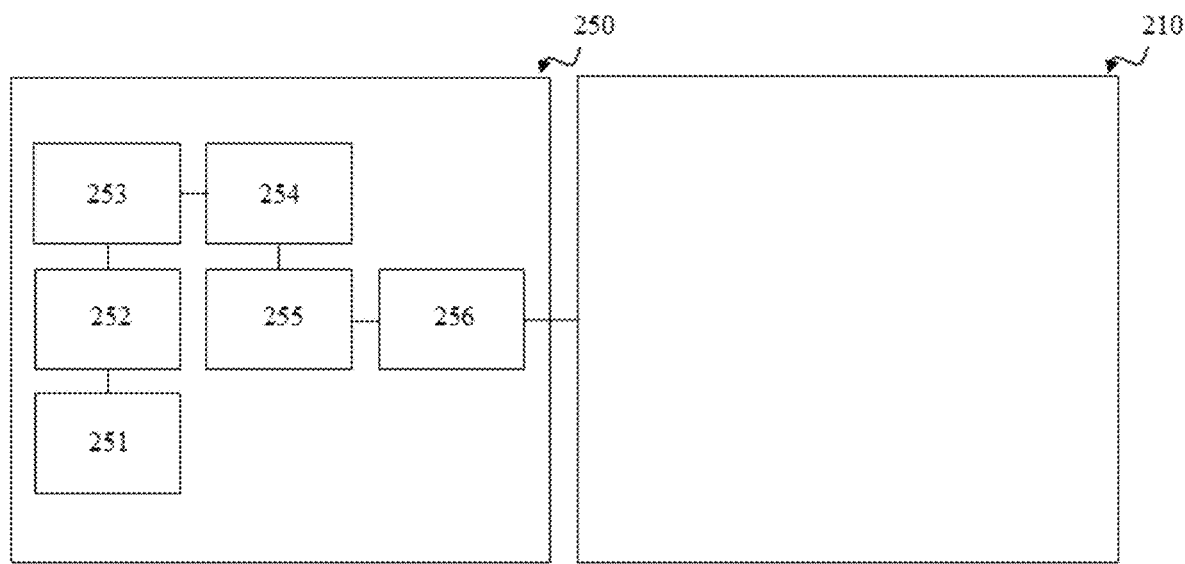
FIG. 5 shows an example of a state preparation unit.

FIG. 5 shows an example of a state preparation unit 250. The state preparation unit may be configured to prepare a state of the plurality of atoms, as described herein. The state preparation unit may be coupled to the optical trapping unit and may direct atoms that have been prepared by the state preparation unit to the optical trapping unit. The state preparation unit may be configured to cool the plurality of atoms. The state preparation unit may be configured to cool the plurality of atoms prior to trapping the plurality of atoms at the plurality of optical trapping sites. The atoms may be cooled to a first distribution of atomic states. The first distribution of atomic states may be a non-equilibrium distribution of atomic states.

The state preparation unit may comprise one or more Zeeman slowers. For instance, the state preparation unit may comprise a Zeeman slower 251. Although depicted as comprising a single Zeeman slower in FIG. 5, the state preparation may comprise any number of Zeeman slowers, such as at least about 1, 2, 3, 4, 5, 6, 7, 8, 9, 10, or more Zeeman slowers or at most about 10, 9, 8, 7, 6, 5, 4, 3, 2, or 1 Zeeman slowers. The Zeeman slowers may be configured to cool one or more atoms of the plurality of atoms from a first velocity or distribution of velocities (such an emission velocity from an of an atom source, room temperature, liquid nitrogen temperature, or any other temperature) to a second velocity that is lower than the first velocity or distribution of velocities.

The first velocity or distribution of velocities may be associated with a temperature of at least about 50 Kelvin (K), 60 K, 70 K, 80 K, 90 K, 100 K, 200 K, 300 K, 400 K, 500 K, 600 K, 700 K, 800 K, 900 K, 1,000 K, or more. The first velocity or distribution of velocities may be associated with a temperature of at most about 1,000 K, 900 K, 800 K, 700 K, 600 K, 500 K, 400 K, 300 K, 200 K, 100 K, 90 K, 80 K, 70 K, 60 K, 50 K, or less. The first velocity or distribution of velocities may be associated with a temperature that is within a range defined by any two of the preceding values. The second velocity may be at least about 1 meter per second (m/s), 2 m/s, 3 m/s, 4 m/s, 5 m/s, 6 m/s, 7 m/s, 8 m/s, 9 m/s, 10 m/s, or more. The second velocity may be at most about 10 m/s, 9 m/s, 8 m/s, 7 m/s, 6 m/s, 5 m/s, 4 m/s, 3 m/s, 2 m/s, 1 m/s, or less. The second velocity may be within a range defined by any two of the preceding values. The Zeeman slowers may comprise 1D Zeeman slowers.

The state preparation unit may comprise a first magneto-optical trap (MOT) 252. The first MOT may be configured to cool the atoms to a first temperature. The first temperature may be at most about 10 millikelvin (mK), 9 mK, 8 mK, 7 mK, 6 mK, 5 mK, 4 mK, 3 mK, 2 mK, 1 mK, 0.9 mK, 0.8 mK, 0.7 mK, 0.6 mK, 0.5 mK, 0.4 mK, 0.3 mK, 0.2 mK, 0.1 mK, or less. The first temperature may be at least about 0.1 mK, 0.2 mK, 0.3 mK, 0.4 mK, 0.5 mK, 0.6 mK, 0.7 mK, 0.8 mK, 0.9 mK, 1 mK, 2 mK, 3 mK, 4 mK, 5 mK, 6 mK, 7 mK, 8 mK, 9 mK, 10 mK, or more. The first temperature may be within a range defined by any two of the preceding values. The first MOT may comprise a 1D, 2D, or 3D MOT.

The first MOT may comprise one or more light sources (such as any light source described herein) configured to emit light. The light may comprise one or more wavelengths of at least about 400 nm, 410 nm, 420 nm, 430 nm, 440 nm, 450 nm, 460 nm, 470 nm, 480 nm, 490 nm, 500 nm, 510 nm, 520 nm, 530 nm, 540 nm, 550 nm, 560 nm, 570 nm, 580 nm, 590 nm, 600 nm, 610 nm, 620 nm, 630 nm, 640 nm, 650 nm, 660 nm, 670 nm, 680 nm, 690 nm, 700 nm, 710 nm, 720 nm, 730 nm, 740 nm, 750 nm, 760 nm, 770 nm, 780 nm, 790 nm, 800 nm, 810 nm, 820 nm, 830 nm, 840 nm, 850 nm, 860 nm, 870 nm, 880 nm, 890 nm, 900 nm, 910 nm, 920 nm, 930 nm, 940 nm, 950 nm, 960 nm, 970 nm, 980 nm, 990 nm, 1,000 nm, or more. The light may comprise one or more wavelengths of at most about 1,000 nm, 990 nm, 980 nm, 970 nm, 960 nm, 950 nm, 940 nm, 930 nm, 920 nm, 910 nm, 900 nm, 890 nm, 880 nm, 870 nm, 860 nm, 850 nm, 840 nm, 830 nm, 820 nm, 810 nm, 800 nm, 790 nm, 780 nm, 770 nm, 760 nm, 750 nm, 740 nm, 730 nm, 720 nm, 710 nm, 700 nm, 690 nm, 680 nm, 670 nm, 660 nm, 650 nm, 640 nm, 630 nm, 620 nm, 610 nm, 600 nm, 590 nm, 580 nm, 570 nm, 560 nm, 550 nm, 540 nm, 530 nm, 520 nm, 510 nm, 500 nm, 490 nm, 480 nm, 470 nm, 460 nm, 450 nm, 440 nm, 430 nm, 420 nm, 410 nm, 400 nm, or less. The light may comprise one or more wavelengths that are within a range defined by any two of the preceding values. For instance, the light may comprise one or more wavelengths that are within a range from 400 nm to 1,000 nm, 500 nm to 1,000 nm, 600 nm to 1,000 nm, 650 nm to 1,000 nm, 400 nm to 900 nm, 400 nm to 800 nm, 400 nm to 700 nm, 400 nm to 600 nm, 400 nm to 500 nm, 500 nm to 700 nm, or 650 nm to 700 nm.

The state preparation unit may comprise a second MOT 253. The second MOT may be configured to cool the atoms from the first temperature to a second temperature that is lower than the first temperature. The second temperature may be at most about 100 microkelvin (μK), 90 μK, 80 μK, 70 μK, 60 μK, 50 μK, 40 μK, 30 μK, 20 μK, 10 μK, 9 μK, 8 μK, 7 μK, 6 μK, 5 μK, 4 μK, 3 μK, 2 μK, 1 μK, 900 nanokelvin (nK), 800 nK, 700 nK, 600 nK, 500 nK, 400 nK, 300 nK, 200 nK, 100 nK, or less. The second temperature may be at least about 100 nK, 200 nK, 300 nK, 400 nK, 500 nK, 600 nK, 700 nK, 800 nK, 900 nK, 1 μK, 2 μK, 3 μK, 4

μK, 5 μK, 6 μK, 7 μK, 8 μK, 9 μK, 10 μK, 20 μK, 30 μK, 40 μK, 50 μK, 60 μK, 70 μK, 80 μK, 90 μK, 100 μK, or more. The second temperature may be within a range defined by any two of the preceding values. The second MOT may comprise a 1D, 2D, or 3D MOT.

The second MOT may comprise one or more light sources (such as any light source described herein) configured to emit light. The light may comprise one or more wavelengths of at least about 400 nm, 410 nm, 420 nm, 430 nm, 440 nm, 450 nm, 460 nm, 470 nm, 480 nm, 490 nm, 500 nm, 510 nm, 520 nm, 530 nm, 540 nm, 550 nm, 560 nm, 570 nm, 580 nm, 590 nm, 600 nm, 610 nm, 620 nm, 630 nm, 640 nm, 650 nm, 660 nm, 670 nm, 680 nm, 690 nm, 700 nm, 710 nm, 720 nm, 730 nm, 740 nm, 750 nm, 760 nm, 770 nm, 780 nm, 790 nm, 800 nm, 810 nm, 820 nm, 830 nm, 840 nm, 850 nm, 860 nm, 870 nm, 880 nm, 890 nm, 900 nm, 910 nm, 920 nm, 930 nm, 940 nm, 950 nm, 960 nm, 970 nm, 980 nm, 990 nm, 1,000 nm, or more. The light may comprise one or more wavelengths of at most about 1,000 nm, 990 nm, 980 nm, 970 nm, 960 nm, 950 nm, 940 nm, 930 nm, 920 nm, 910 nm, 900 nm, 890 nm, 880 nm, 870 nm, 860 nm, 850 nm, 840 nm, 830 nm, 820 nm, 810 nm, 800 nm, 790 nm, 780 nm, 770 nm, 760 nm, 750 nm, 740 nm, 730 nm, 720 nm, 710 nm, 700 nm, 690 nm, 680 nm, 670 nm, 660 nm, 650 nm, 640 nm, 630 nm, 620 nm, 610 nm, 600 nm, 590 nm, 580 nm, 570 nm, 560 nm, 550 nm, 540 nm, 530 nm, 520 nm, 510 nm, 500 nm, 490 nm, 480 nm, 470 nm, 460 nm, 450 nm, 440 nm, 430 nm, 420 nm, 410 nm, 400 nm, or less. The light may comprise one or more wavelengths that are within a range defined by any two of the preceding values. For instance, the light may comprise one or more wavelengths that are within a range from 400 nm to 1,000 nm, 500 nm to 1,000 nm, 600 nm to 1,000 nm, 650 nm to 1,000 nm, 400 nm to 900 nm, 400 nm to 800 nm, 400 nm to 700 nm, 400 nm to 600 nm, 400 nm to 500 nm, 500 nm to 700 nm, or 650 nm to 700 nm.

Although depicted as comprising two MOTs in FIG. 5, the state preparation unit may comprise any number of MOTs, such as at least about 1, 2, 3, 4, 5, 6, 7, 8, 9, 10, or more MOTs or at most about 10, 9, 8, 7, 6, 5, 4, 3, 2, or 1 MOTs.

The state preparation unit may comprise one or more sideband cooling units or Sisyphus cooling units (such as a sideband cooling unit described in https://arxiv.org/abs/1810.06626 or a Sisyphus cooling unit described in https://arxiv.org/abs/1811.06014, each of which is incorporated herein by reference in its entirety for all purposes). For instance, the state preparation unit may comprise sideband cooling unit or Sisyphus cooling unit 254. Although depicted as comprising a single sideband cooling unit or Sisyphus cooling unit in FIG. 5, the state preparation may comprise any number of sideband cooling units or Sisyphus cooling units, such as at least about 1, 2, 3, 4, 5, 6, 7, 8, 9, 10, or more sideband cooling units or Sisyphus cooling units, or at most about 10, 9, 8, 7, 6, 5, 4, 3, 2, or 1 sideband cooling units or Sisyphus cooling units. The sideband cooling units or Sisyphus cooling units may be configured to use sideband cooling to cool the atoms from the second temperature to a third temperature that is lower than the second temperature. The third temperature may be at most about 10 μK, 9 μK, 8 μK, 7 μK, 6 μK, 5 μK, 4 μK, 3 μK, 2 μK, 1 μK, 900 nK, 800 nK, 700 nK, 600 nK, 500 nK, 400 nK, 300 nK, 200 nK, 100 nK, 90 nK, 80 nK, 70 nK, 60 nK, 50 nK, 40 nK, 30 nK, 20 nK, 10 nK, or less. The third temperature may be at most about 10 nK, 20 nK, 30 nK, 40 nK, 50 nK, 60 nK, 70 nK, 80 nK, 90 nK, 100 nK, 200 nK, 300 nK, 400 nK, 500 nK, 600 nK, 700 nK, 800 nK, 900 nK, 1 μK, 2 μK, 3 μK, 4 μK, 5 μK, 6 μK, 7 μK, 8 μK, 9 μK, 10 μK, or more. The third temperature may be within a range defined by any two of the preceding values.

The sideband cooling units or Sisyphus cooling units may comprise one or more light sources (such as any light source described herein) configured to emit light. The light may comprise one or more wavelengths of at least about 400 nm, 410 nm, 420 nm, 430 nm, 440 nm, 450 nm, 460 nm, 470 nm, 480 nm, 490 nm, 500 nm, 510 nm, 520 nm, 530 nm, 540 nm, 550 nm, 560 nm, 570 nm, 580 nm, 590 nm, 600 nm, 610 nm, 620 nm, 630 nm, 640 nm, 650 nm, 660 nm, 670 nm, 680 nm, 690 nm, 700 nm, 710 nm, 720 nm, 730 nm, 740 nm, 750 nm, 760 nm, 770 nm, 780 nm, 790 nm, 800 nm, 810 nm, 820 nm, 830 nm, 840 nm, 850 nm, 860 nm, 870 nm, 880 nm, 890 nm, 900 nm, 910 nm, 920 nm, 930 nm, 940 nm, 950 nm, 960 nm, 970 nm, 980 nm, 990 nm, 1,000 nm, or more. The light may comprise one or more wavelengths of at most about 1,000 nm, 990 nm, 980 nm, 970 nm, 960 nm, 950 nm, 940 nm, 930 nm, 920 nm, 910 nm, 900 nm, 890 nm, 880 nm, 870 nm, 860 nm, 850 nm, 840 nm, 830 nm, 820 nm, 810 nm, 800 nm, 790 nm, 780 nm, 770 nm, 760 nm, 750 nm, 740 nm, 730 nm, 720 nm, 710 nm, 700 nm, 690 nm, 680 nm, 670 nm, 660 nm, 650 nm, 640 nm, 630 nm, 620 nm, 610 nm, 600 nm, 590 nm, 580 nm, 570 nm, 560 nm, 550 nm, 540 nm, 530 nm, 520 nm, 510 nm, 500 nm, 490 nm, 480 nm, 470 nm, 460 nm, 450 nm, 440 nm, 430 nm, 420 nm, 410 nm, 400 nm, or less. The light may comprise one or more wavelengths that are within a range defined by any two of the preceding values. For instance, the light may comprise one or more wavelengths that are within a range from 400 nm to 1,000 nm, 500 nm to 1,000 nm, 600 nm to 1,000 nm, 650 nm to 1,000 nm, 400 nm to 900 nm, 400 nm to 800 nm, 400 nm to 700 nm, 400 nm to 600 nm, 400 nm to 500 nm, 500 nm to 700 nm, or 650 nm to 700 nm.

The state preparation unit may comprise one or more optical pumping units. For instance, the state preparation unit may comprise optical pumping unit 255. Although depicted as comprising a single optical pumping unit in FIG. 5, the state preparation may comprise any number of optical pumping units, such as at least about 1, 2, 3, 4, 5, 6, 7, 8, 9, 10, or more optical pumping units, or at most about 10, 9, 8, 7, 6, 5, 4, 3, 2, or 1 optical pumping units. The optical pumping units may be configured to emit light to optically pump the atoms from the first distribution of atomic states to a second distribution of atomic states. The second distribution of atomic states may be a non-equilibrium distribution of atomic states. For instance, the optical pumping units may be configured to emit light to optically pump the atoms from the first distribution of atomic states to a single pure or nearly pure atomic state. A pure or nearly pure atomic state may be characterized as comprising a significant probability of measuring the atoms to be in the pure or nearly pure atomic state. For instance, there may be a probability of at least about 90%, 95%, 99%, 99.5%, 99.9%, 99.95%, 99.99%, or more of measuring the atoms to be in the pure or nearly pure atomic state. There may be a probability of at most about 99.99%, 99.95%, 99.9%, 99.5%, 99%, 95%, 90%, or less of measuring the atoms to be in the pure or nearly pure atomic state. There may be a probability of measuring the atoms to be in the pure or nearly pure atomic state that is within a range defined by any two of the preceding values. The optical pumping units may be configured to emit light to optically pump the atoms to a ground atomic state or to any other atomic state. The optical pumping units may be configured to optically pump the atoms between any two atomic states. The optical pumping units may comprise one or more light sources (such as any light source described herein) configured to emit light. The light may comprise one or more wavelengths of at least about 400 nm, 410 nm, 420 nm, 430 nm, 440 nm, 450 nm, 460 nm, 470 nm, 480 nm, 490 nm, 500 nm, 510 nm, 520 nm, 530 nm, 540 nm, 550 nm, 560 nm, 570 nm, 580 nm, 590 nm, 600 nm, 610 nm, 620 nm, 630 nm, 640 nm, 650 nm, 660 nm, 670 nm, 680 nm, 690 nm, 700 nm, 710 nm, 720 nm, 730 nm, 740 nm, 750 nm, 760 nm, 770 nm, 780 nm, 790 nm, 800 nm, 810 nm, 820 nm, 830 nm, 840 nm, 850 nm, 860 nm, 870 nm, 880 nm, 890 nm, 900 nm, 910 nm, 920 nm, 930 nm, 940 nm, 950 nm, 960 nm, 970 nm, 980 nm, 990 nm, 1,000 nm, or more. The light may comprise one or more wavelengths of at most about 1,000 nm, 990 nm, 980 nm, 970 nm, 960 nm, 950 nm, 940 nm, 930 nm, 920 nm, 910 nm, 900 nm, 890 nm, 880 nm, 870 nm, 860 nm, 850 nm, 840 nm, 830 nm, 820 nm, 810 nm, 800 nm, 790 nm, 780 nm, 770 nm, 760 nm, 750 nm, 740 nm, 730 nm, 720 nm, 710 nm, 700 nm, 690 nm, 680 nm, 670 nm, 660 nm, 650 nm, 640 nm, 630 nm, 620 nm, 610 nm, 600 nm, 590 nm, 580 nm, 570 nm, 560 nm, 550 nm, 540 nm, 530 nm, 520 nm, 510 nm, 500 nm, 490 nm, 480 nm, 470 nm, 460 nm, 450 nm, 440 nm, 430 nm, 420 nm, 410 nm, 400 nm, or less. The light may comprise one or more wavelengths that are within a range defined by any two of the preceding values. For instance, the light may comprise one or more wavelengths that are within a range from 400 nm to 1,000 nm, 500 nm to 1,000 nm, 600 nm to 1,000 nm, 650 nm to 1,000 nm, 400 nm to 900 nm, 400 nm to 800 nm, 400 nm to 700 nm, 400 nm to 600 nm, 400 nm to 500 nm, 500 nm to 700 nm, or 650 nm to 700 nm.

The state preparation unit may comprise one or more coherent driving units. For instance, the state preparation unit may comprise coherent driving unit 256. Although depicted as comprising a coherent driving unit in FIG. 5, the state preparation may comprise any number of coherent driving units, such as at least about 1, 2, 3, 4, 5, 6, 7, 8, 9, 10, or more coherent driving units or at most about 10, 9, 8, 7, 6, 5, 4, 3, 2, or 1 coherent driving units. The coherent driving units may be configured to coherently drive the atoms from the non-equilibrium atomic state or the non-equilibrium distribution of atomic states to the first or second atomic states described herein. Thus, the atoms may be optically pumped to an atomic state that is convenient to access (for instance, based on availability of light sources that emit particular wavelengths or based on other factors) and then coherently driven to atomic states described herein that are useful for performing quantum computations. The coherent driving units may be configured to induce a single photon transition between the non-equilibrium state or the non-equilibrium distribution of atomic states and the first or second atomic state. The coherent driving units may be configured to induce a two-photon transition between the non-equilibrium state or the non-equilibrium distribution of atomic states and the first or second atomic state. The two-photon transition may be induced using light from two light sources described herein (such as two lasers described herein).

The coherent driving units may comprise one or more light sources (such as any light source described herein) configured to emit light. The light may comprise one or more wavelengths of at least about 400 nm, 410 nm, 420 nm, 430 nm, 440 nm, 450 nm, 460 nm, 470 nm, 480 nm, 490 nm, 500 nm, 510 nm, 520 nm, 530 nm, 540 nm, 550 nm, 560 nm, 570 nm, 580 nm, 590 nm, 600 nm, 610 nm, 620 nm, 630 nm, 640 nm, 650 nm, 660 nm, 670 nm, 680 nm, 690 nm, 700 nm, 710 nm, 720 nm, 730 nm, 740 nm, 750 nm, 760 nm, 770 nm, 780 nm, 790 nm, 800 nm, 810 nm, 820 nm, 830 nm, 840 nm, 850 nm, 860 nm, 870 nm, 880 nm, 890 nm, 900 nm, 910 nm, 920 nm, 930 nm, 940 nm, 950 nm, 960 nm, 970 nm, 980 nm, 990 nm, 1,000 nm, or more. The light may comprise one or more wavelengths of at most about 1,000 nm, 990 nm, 980 nm, 970 nm, 960 nm, 950 nm, 940 nm, 930 nm, 920 nm, 910 nm, 900 nm, 890 nm, 880 nm, 870 nm, 860 nm, 850 nm, 840 nm, 830 nm, 820 nm, 810 nm, 800 nm, 790 nm, 780 nm, 770 nm, 760 nm, 750 nm, 740 nm, 730 nm, 720 nm, 710 nm, 700 nm, 690 nm, 680 nm, 670 nm, 660 nm, 650 nm, 640 nm, 630 nm, 620 nm, 610 nm, 600 nm, 590 nm, 580 nm, 570 nm, 560 nm, 550 nm, 540 nm, 530 nm, 520 nm, 510 nm, 500 nm, 490 nm, 480 nm, 470 nm, 460 nm, 450 nm, 440 nm, 430 nm, 420 nm, 410 nm, 400 nm, or less. The light may comprise one or more wavelengths that are within a range defined by any two of the preceding values. For instance, the light may comprise one or more wavelengths that are within a range from 400 nm to 1,000 nm, 500 nm to 1,000 nm, 600 nm to 1,000 nm, 650 nm to 1,000 nm, 400 nm to 900 nm, 400 nm to 800 nm, 400 nm to 700 nm, 400 nm to 600 nm, 400 nm to 500 nm, 500 nm to 700 nm, or 650 nm to 700 nm.

The coherent driving units may be configured to induce an RF transition between the non-equilibrium state or the non-equilibrium distribution of atomic states and the first or second atomic state. The coherent driving units may comprise one or more electromagnetic radiation sources configured to emit electromagnetic radiation configured to induce the RF transition. For instance, the coherent driving units may comprise one or more RF sources (such as any RF source described herein) configured to emit RF radiation. The RF radiation may comprise one or more wavelengths of at least about 10 centimeters (cm), 20 cm, 30 cm, 40 cm, 50 cm, 60 cm, 70 cm, 80 cm, 90 cm, 1 meter (m), 2 m, 3 m, 4 m, 5 m, 6 m, 7 m, 8 m, 9 m, 10 m, or more. The RF radiation may comprise one or more wavelengths of at most about 10 m, 9 m, 8 m, 7 m, 6 m, 5 m, 4 m, 3 m, 2 m, 1 m, 90 cm, 80 cm, 70 cm, 60 cm, 50 cm, 40 cm, 30 cm, 20 cm, 10 cm, or less. The RF radiation may comprise one or more wavelengths that are within a range defined by any two of the preceding values. Alternatively or in combination, the coherent driving units may comprise one or more light sources (such as any light sources described herein) configured to induce a two-photon transition corresponding to the RF transition.

Controllers

The optical trapping units, electromagnetic delivery units, entanglement units, readout optical units, vacuum units, imaging units, spatial configuration AI units, spatial arrangement AI units, atom rearrangement units, state preparation units, sideband cooling units, optical pumping units, coherent driving units, electromagnetic energy AI units, atom reservoirs, atom movement units, or Rydberg excitation units may include one or more circuits or controllers (such as one or more electronic circuits or controllers) that is connected (for instance, by one or more electronic connections) to the optical trapping units, electromagnetic delivery units, entanglement units, readout optical units, vacuum units, imaging units, spatial configuration AI units, spatial arrangement AI units, atom rearrangement units, state preparation units, sideband cooling units, optical pumping units, coherent driving units, electromagnetic energy AI units, atom reservoirs, atom movement units, or Rydberg excitation units. The circuits or controllers may be configured to control the optical trapping units, electromagnetic delivery units, entanglement units, readout optical units, vacuum units, imaging units, spatial configuration AI units, spatial arrangement AI units, atom rearrangement units, state preparation units, sideband cooling units, optical pumping units, coherent driving units, electromagnetic energy AI units, atom reservoirs, atom movement units, or Rydberg excitation units.

Non-Classical Computers

In an aspect, the present disclosure provides a non-classical computer comprising: a plurality of qubits comprising greater than 60 atoms, each atom trapped within an optical trapping site of a plurality of spatially distinct optical trapping sites, wherein the plurality of qubits comprise at least a first qubit state and a second qubit state, wherein the first qubit state comprises a first atomic state and the second qubit state comprises a second atomic state; one or more electromagnetic delivery units configured to apply electromagnetic energy to one or more qubits of the plurality of qubits, thereby imparting a non-classical operation to the one or more qubits, which non-classical operation includes a superposition between at least the first qubit state and the second qubit state; one or more entanglement units configured to quantum mechanically entangle at least a subset of the plurality of qubits in the superposition with at least another qubit of the plurality of qubits; and one or more readout optical units configured to perform one or more measurements of the one or more qubits, thereby obtaining a non-classical computation.

In an aspect, the present disclosure provide a non-classical computer comprising a plurality of qubits comprising greater than 60 atoms each trapped within an optical trapping site of a plurality of spatially distinct optical trapping sites.

Methods for Performing a Non-Classical Computation

In an aspect, the present disclosure provides a method for performing a non-classical computation, comprising: (a) generating a plurality of spatially distinct optical trapping sites, the plurality of optical trapping sites configured to trap a plurality of atoms, the plurality of atoms comprising greater than 60 atoms; (b) applying electromagnetic energy to one or more atoms of the plurality of atoms, thereby inducing the one or more atoms to adopt one or more superposition states of a first atomic state and at least a second atomic state that is different from the first atomic state; (c) quantum mechanically entangling at least a subset of the one or more atoms in the one or more superposition states with at least another atom of the plurality of atoms; and (d) performing one or more optical measurements of the one or more superposition state to obtain the non-classical computation.

Figure 6:
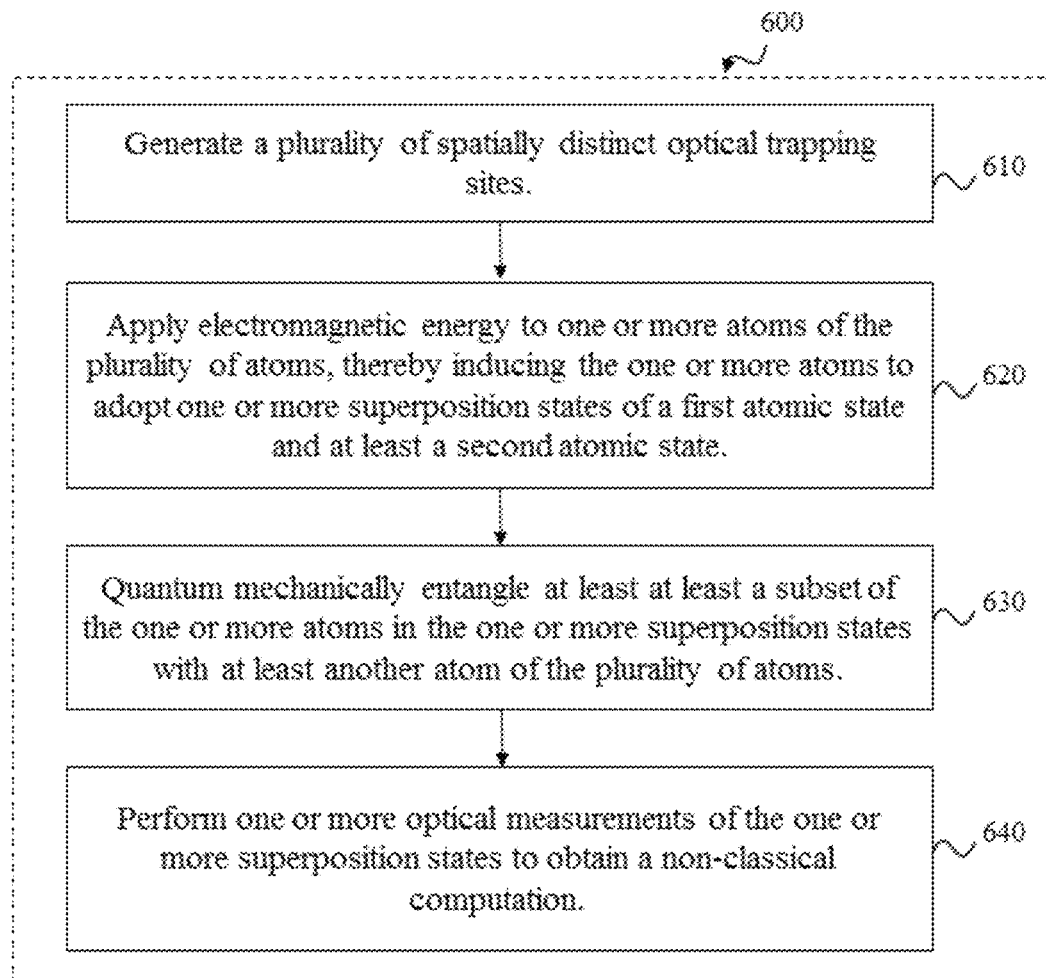
FIG. 6 shows a flowchart for an example of a first method for performing a non-classical computation.

FIG. 6 shows a flowchart for an example of a first method 600 for performing a non-classical computation.

In a first operation 610, the method 600 may comprise generating a plurality of spatially distinct optical trapping sites. The plurality of optical trapping sites may be configured to trap a plurality of atoms. The plurality of atoms may comprise greater than 60 atoms. The optical trapping sites may comprise any optical trapping sites described herein. The atoms may comprise any atoms described herein.

In a second operation 620, the method 600 may comprise applying electromagnetic energy to one or more atoms of the plurality of atoms, thereby inducing the one or more atoms to adopt one or more superposition states of a first atomic state and at least a second atomic state that is different from the first atomic state. The electromagnetic energy may comprise any electromagnetic energy described herein. The first atomic state may comprise any first atomic state described herein. The second atomic state may comprise any second atomic state described herein.

In a third operation 630, the method 600 may comprise quantum mechanically entangling at least a subset of the one or more atoms in the one or more superposition states with at least another atom of the plurality of atoms. The atoms may be quantum mechanically entangled in any manner described herein (for instance, as described herein with respect to FIG. 2).

In a fourth operation 640, the method 600 may comprise performing one or more optical measurements of the one or more superposition state to obtain the non-classical computation. The optical measurements may comprise any optical measurements described herein.

In an aspect, the present disclosure provides a method for performing a non-classical computation, comprising: (a) providing a plurality of qubits comprising greater than 60 atoms, each atom trapped within an optical trapping site of a plurality of spatially distinct optical trapping sites, wherein the plurality of qubits comprise at least a first qubit state and a second qubit state, wherein the first qubit state comprises a first atomic state and the second qubit state comprises a second atomic state; (b) applying electromagnetic energy to one or more qubits of the plurality of qubits, thereby imparting a non-classical operation to the one or more qubits, which non-classical operation includes a superposition between at least the first qubit state and the second qubit state; (c) quantum mechanically entangling at least a subset of the plurality of qubits in the superposition with at least another qubit of the plurality of qubits; and (d) performing one or more optical measurements of the one or more qubits, thereby obtaining the-classical computation.

Figure 7:
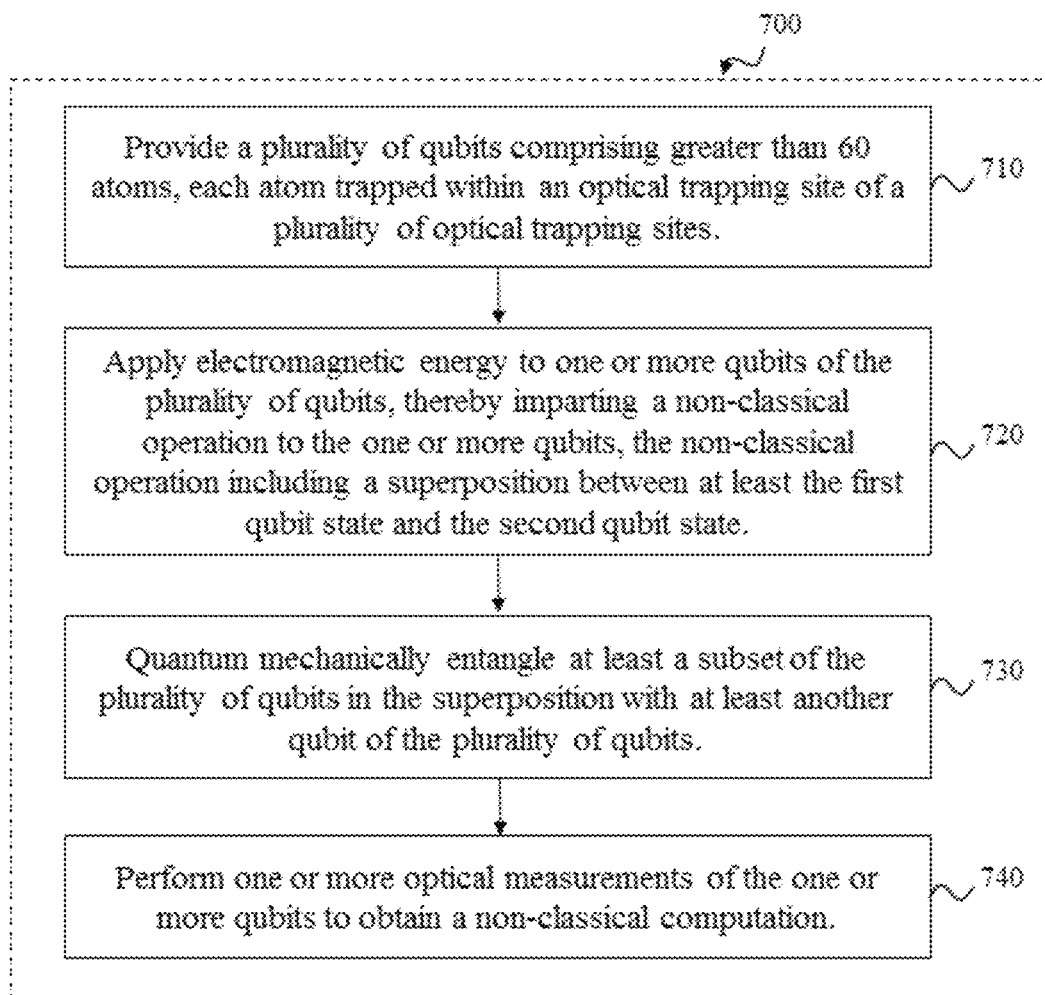
FIG. 7 shows a flowchart for an example of a second method for performing a non-classical computation.

FIG. 7 shows a flowchart for an example of a second method 700 for performing a non-classical computation.

In a first operation 710, the method 700 may comprise providing a plurality of qubits comprising greater than 60 atoms, each atom trapped within an optical trapping site of a plurality of spatially distinct optical trapping sites, wherein the plurality of qubits comprise at least a first qubit state and a second qubit state, wherein the first qubit state comprises a first atomic state and the second qubit state comprises a second atomic state. The optical trapping sites may comprise any optical trapping sites described herein. The qubits may comprise any qubits described herein. The atoms may comprise any atoms described herein. The first qubit state may comprise any first qubit state described herein. The second qubit state may comprise any second qubit state described herein. The first atomic state may comprise any first atomic state described herein. The second atomic state may comprise any second atomic state described herein.

In a second operation 720, the method 700 may comprise applying electromagnetic energy to one or more qubits of the plurality of qubits, thereby imparting a non-classical operation to the one or more qubits, which non-classical operation includes a superposition between at least the first qubit state and the second qubit state. The electromagnetic energy may comprise any electromagnetic energy described herein.

In a third operation 730, the method 700 may comprise quantum mechanically entangling at least a subset of the plurality of qubits in the superposition with at least another qubit of the plurality of qubits. The qubits may be quantum mechanically entangled in any manner described herein (for instance, as described herein with respect to FIG. 2).

In a fourth operation 740, the method 700 may comprise performing one or more optical measurements of the one or more qubits, thereby obtaining the non-classical computation. The optical measurements may comprise any optical measurements described herein.

In an aspect, the present disclosure provide a method for performing a non-classical computation, comprising: (a) providing a plurality of qubits comprising greater than 60 atoms each trapped within an optical trapping site of a plurality of spatially distinct optical trapping sites, and (b) using at least a subset of the plurality of qubits to perform the non-classical computation.

Figure 8:
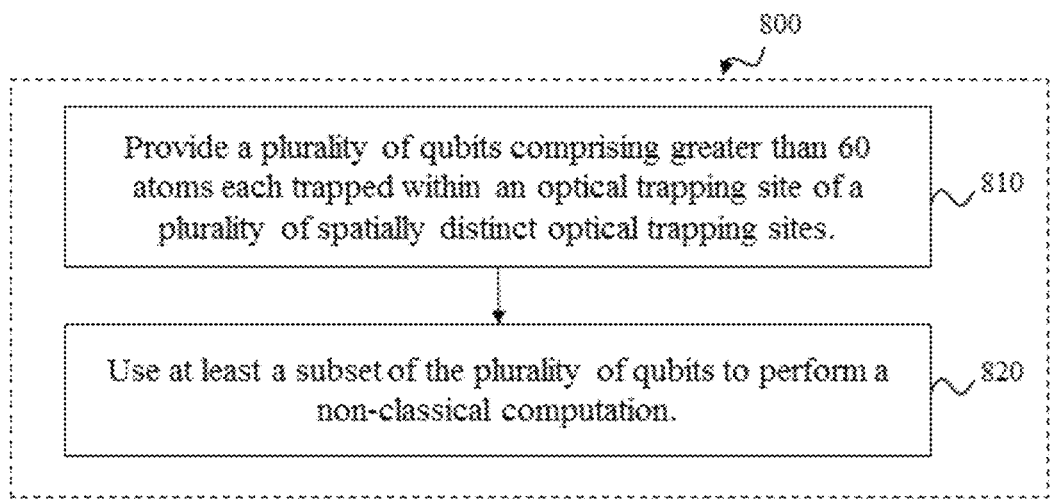
FIG. 8 shows a flowchart for an example of a third method for performing a non-classical computation.

FIG. 8 shows a flowchart for an example of a third method 800 for performing a non-classical computation.

In a first operation 810, the method 800 may comprise providing a plurality of qubits comprising greater than 60 atoms each trapped within an optical trapping site of a plurality of spatially distinct optical trapping sites. The qubits may comprise any qubits described herein. The atoms may comprise any atoms described herein. The optical trapping sites may comprise any optical trapping sites described herein.

In a second operation 820, the method 800 may comprise using at least a subset of the plurality of qubits to perform a non-classical computation.

Computer Systems

FIG. 1 shows a computer system 101 that is programmed or otherwise configured to operate any method or system described herein (such as system or method for performing a non-classical computation described herein). The computer system 101 can regulate various aspects of the present disclosure. The computer system 101 can be an electronic device of a user or a computer system that is remotely located with respect to the electronic device. The electronic device can be a mobile electronic device.

The computer system 101 includes a central processing unit (CPU, also "processor" and "computer processor" herein) 105, which can be a single core or multi core processor, or a plurality of processors for parallel processing. The computer system 101 also includes memory or memory location 110 (e.g., random-access memory, read-only memory, flash memory), electronic storage unit 115 (e.g., hard disk), communication interface 120 (e.g., network adapter) for communicating with one or more other systems, and peripheral devices 125, such as cache, other memory, data storage and/or electronic display adapters. The memory 110, storage unit 115, interface 120 and peripheral devices 125 are in communication with the CPU 105 through a communication bus (solid lines), such as a motherboard. The storage unit 115 can be a data storage unit (or data repository) for storing data. The computer system 101 can be operatively coupled to a computer network ("network") 130 with the aid of the communication interface 120. The network 130 can be the Internet, an internet and/or extranet, or an intranet and/or extranet that is in communication with the Internet. The network 130 in some cases is a telecommunication and/or data network. The network 130 can include one or more computer servers, which can enable distributed computing, such as cloud computing. The network 130, in some cases with the aid of the computer system 101, can implement a peer-to-peer network, which may enable devices coupled to the computer system 101 to behave as a client or a server.

The CPU 105 can execute a sequence of machine-readable instructions, which can be embodied in a program or software. The instructions may be stored in a memory location, such as the memory 110. The instructions can be directed to the CPU 105, which can subsequently program or otherwise configure the CPU 105 to implement methods of the present disclosure. Examples of operations performed by the CPU 105 can include fetch, decode, execute, and writeback.

The CPU 105 can be part of a circuit, such as an integrated circuit. One or more other components of the system 101 can be included in the circuit. In some cases, the circuit is an application specific integrated circuit (ASIC).

The storage unit 115 can store files, such as drivers, libraries and saved programs. The storage unit 115 can store user data, e.g., user preferences and user programs. The computer system 101 in some cases can include one or more additional data storage units that are external to the computer system 101, such as located on a remote server that is in communication with the computer system 101 through an intranet or the Internet.

The computer system 101 can communicate with one or more remote computer systems through the network 130. For instance, the computer system 101 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 101 via the network 130.

Methods as described herein can be implemented by way of machine (e.g., computer processor) executable code stored on an electronic storage location of the computer system 101, such as, for example, on the memory 110 or electronic storage unit 115. The machine executable or machine readable code can be provided in the form of software. During use, the code can be executed by the processor 105. In some cases, the code can be retrieved from the storage unit 115 and stored on the memory 110 for ready access by the processor 105. In some situations, the electronic storage unit 115 can be precluded, and machine-executable instructions are stored on memory 110.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 101, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 101 can include or be in communication with an electronic display 135 that comprises a user interface (UI) 140. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 105. The algorithm can, for example, implement methods for performing a non-classical computation described herein.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for performing a non-classical computation, comprising:
   (a) providing a plurality of optical trapping sites comprising a plurality of atoms, which plurality of atoms is a plurality of qubits, wherein said plurality of atoms comprises an atom comprising two valence electrons;
   (b) adjusting a splitting between at least a first atomic state and a second atomic state on a ground state manifold of said atom of said plurality of atoms using a magnetic field;
   (c) applying electromagnetic energy to one or more atoms of said plurality of atoms to perform a sequence of qubit gate operations, wherein a qubit gate operation within said sequence of qubit gate operations comprises:
      (i) inducing said one or more atoms to adopt one or more superposition states of said first atomic state and at least said second atomic state that is different from said first atomic state; or
      (ii) inducing said one or more atoms to adopt one or more superposition states of said first atomic state and at least said second atomic state that is different from said first atomic state, and quantum mechanically entangling an atom of said one or more atoms in said one or more superposition states with another atom of said plurality of atoms; and
   (d) performing one or more measurements of said one or more superposition states to perform said non-classical computation, wherein said non-classical computation is encoded in said sequence of qubit gate operations.

2. The method of claim 1, wherein said plurality of optical trapping sites comprises a plurality of spatially distinct optical trapping sites.

3. The method of claim 1, further comprising, prior to (b), obtaining one or more images of an initial spatial arrangement of said plurality of atoms.

4. The method of claim 3, further comprising, prior to (b), performing one or more spatial arrangement artificial intelligence (AI) operations to determine said initial spatial arrangement of said plurality of atoms based on said one or more images.

5. The method of claim 4, wherein said one or more spatial arrangement AI operations comprise one or more machine learning (ML) operations or reinforcement learning (RL) operations.

6. The method of claim 4, further comprising, prior to (b), performing one or more spatial re-arrangement AI operations to determine an altered spatial arrangement of said plurality of atoms based on said one or more images.

7. The method of claim 6, wherein said one or more spatial re-arrangement AI operations comprise one or more ML operations or RL operations.

8. The method of claim 6, wherein (b) comprises moving said one or more atoms of said plurality of atoms based on said altered spatial arrangement.

9. The method of claim 1, wherein (b) comprises using one or more electrically tunable lenses, acousto-optic deflectors (AODs), acousto-optic modulators (AOMs), spatial light modulators (SLMs), electro-optic deflectors (EODs), electro-optic modulators (EOMs), digital micromirror devices (DMDs), liquid crystal devices, or liquid crystal on silicon (LCoS) devices to move said one or more atoms of said plurality of atoms.

10. The method of claim 1, wherein moving said one or more atoms of said plurality of atoms increases a filling factor of said plurality of optical trapping sites.

11. The method of claim 10, wherein said filling factor comprises a value of at least 70%.

12. The method of claim 1, wherein said plurality of qubits comprises at least 10 qubits.

13. The method of claim 1, wherein (c) comprises using one or more optical modulators to apply said electromagnetic energy to said one or more atoms of said plurality of atoms.

14. The method of claim 13, wherein said one or more optical modulators comprise one or more members selected from the group consisting of: spatial light modulators (SLMs), acousto-optic deflectors (AODs), acousto-optic modulators (AOMs), electro-optic deflectors (EODs), electro-optic modulators (EOMs), digital micromirror devices (DMDs), liquid crystal devices, and liquid crystal on silicon (LCoS) devices.

15. The method of claim 13, wherein (c) comprises using said one or more optical modulators to selectively apply said electromagnetic energy to said one or more atoms of said plurality of atoms.

16. The method of claim 15, wherein (c) further comprises performing one or more electromagnetic energy AI operations to selectively apply said electromagnetic energy to said one or more atoms of said plurality of atoms.

17. The method of claim 16, wherein said one or more electromagnetic energy AI operations comprise one or more ML operations or RL operations.

18. The method of claim 1, further comprising, prior to (c), selecting an individual atom of said one or more atoms from said plurality of atoms upon which to perform a gate operation of said sequence of qubit gate operations.

19. The method of claim 18, wherein said gate operation of said sequence of qubit gate operations comprises said applying said electromagnetic energy to said one or more atoms.

20. The method of claim 1, wherein said atom of said plurality of atoms is an alkaline earth atom.

21. The method of claim 1, wherein said atom of said plurality of atoms is strontium or ytterbium.

22. The method of claim 1, wherein said atom of said plurality of atoms is a neutral atom.

* * * * *